(12) United States Patent
Miller et al.

(10) Patent No.: US 12,482,125 B1
(45) Date of Patent: Nov. 25, 2025

(54) SYSTEM AND METHOD FOR BOX SEGMENTATION AND MEASUREMENT

(71) Applicant: 4DMobile, LLC, Hiawatha, IA (US)

(72) Inventors: Matthew D. Miller, Cedar Rapids, IA (US); Josh Berry, Cedar Rapids, IA (US); Mark Boyer, Cedar Rapids, IA (US); Craig M. Miller, Marion, IA (US)

(73) Assignee: 4DMobile, LLC, Hiawatha, IA (US)

( * ) Notice: Subject to any disclaimer, the term of this patent is extended or adjusted under 35 U.S.C. 154(b) by 238 days.

(21) Appl. No.: 18/139,248

(22) Filed: Apr. 25, 2023

Related U.S. Application Data

(63) Continuation-in-part of application No. 17/114,066, filed on Dec. 7, 2020, now Pat. No. 11,669,988,
(Continued)

(51) Int. Cl.
| | |
|---|---|
| *G06T 7/62* | (2017.01) |
| *G06F 3/01* | (2006.01) |
| *G06F 3/04815* | (2022.01) |
| *G06F 3/04845* | (2022.01) |
| *G06F 3/0488* | (2022.01) |
| *G06F 3/16* | (2006.01) |
| *G06K 7/14* | (2006.01) |
| *G06T 7/593* | (2017.01) |

(Continued)

(52) U.S. Cl.
CPC .............. *G06T 7/62* (2017.01); *G06F 3/017* (2013.01); *G06F 3/04815* (2013.01); *G06F 3/04845* (2013.01); *G06F 3/0488* (2013.01); *G06F 3/167* (2013.01); *G06K 7/1408* (2013.01); *G06T 7/593* (2017.01); *G06T 19/006* (2013.01); *H04N 5/44504* (2013.01); *H04N 23/45* (2023.01); *G06T 2200/04* (2013.01); *G06T 2200/08* (2013.01)

(58) Field of Classification Search
CPC ......... G06T 7/62; G06T 7/593; G06T 19/006; G06T 2200/04; G06T 2200/08; G06F 3/017; G06F 3/04815; G06F 3/04845; G06F 3/0488; G06F 3/167; H04N 5/44504; H04N 23/45
See application file for complete search history.

(56) References Cited

U.S. PATENT DOCUMENTS

| | | |
|---|---|---|
| 5,117,098 A | 5/1992 | Swartz |
| 5,329,106 A | 7/1994 | Hone et al. |

(Continued)

OTHER PUBLICATIONS

Google Internet NPL search log (Year: 2019).
(Continued)

*Primary Examiner* — Jin Cheng Wang
(74) *Attorney, Agent, or Firm* — Suiter Swantz IP

(57) ABSTRACT

A mobile device is capable of being carried by a user and directed at a target object. The mobile device may implement a system to dimension the target object. The system, by way of the mobile device, may image the target object to and receive a 3D image stream, including one or more frames. Each frame may include a plurality of points, where each point has an associated depth value. Based on the depth value of the plurality of points, the system, by way of the mobile device, may determine one or more dimensions of the target object.

18 Claims, 64 Drawing Sheets

Related U.S. Application Data which is a continuation-in-part of application No. 16/786,268, filed on Feb. 10, 2020, now abandoned, which is a continuation of application No. 16/390,562, filed on Apr. 22, 2019, now Pat. No. 10,559,086, which is a continuation-in-part of application No. 15/156,149, filed on May 16, 2016, now Pat. No. 10,268,892.

(60) Provisional application No. 63/113,658, filed on Nov. 13, 2020, provisional application No. 62/694,764, filed on Jul. 6, 2018, provisional application No. 62/162,480, filed on May 15, 2015.

(51) Int. Cl.
*G06T 19/00* (2011.01)
*H04N 5/445* (2011.01)
*H04N 23/45* (2023.01)

(56) References Cited

U.S. PATENT DOCUMENTS

| | | | |
|---|---|---|---|
| 6,256,595 B1* | 7/2001 | Schwalb | G06T 19/00 715/252 |
| 6,947,571 B1 | 9/2005 | Rhoads et al. | |
| 8,239,229 B1 | 8/2012 | Paiz | |
| 8,755,837 B2 | 6/2014 | Rhoads et al. | |
| 8,775,710 B1 | 7/2014 | Miller et al. | |
| 9,332,243 B2 | 5/2016 | Klusza et al. | |
| 9,344,612 B2 | 5/2016 | Ritchey et al. | |
| 9,464,885 B2 | 10/2016 | Lloyd et al. | |
| 9,922,437 B1* | 3/2018 | Baron | G06T 11/60 |
| 10,008,005 B2 | 6/2018 | Lai et al. | |
| 10,268,892 B1 | 4/2019 | Miller et al. | |
| 10,290,115 B2 | 5/2019 | Baumgartner | |
| 10,366,276 B2 | 7/2019 | Levinshtein et al. | |
| 10,448,000 B2 | 10/2019 | Klusza et al. | |
| 10,559,086 B1 | 2/2020 | Miller et al. | |
| 10,699,421 B1 | 6/2020 | Cherevatsky et al. | |
| 10,994,419 B2 | 5/2021 | Kikkeri et al. | |
| 2002/0014533 A1 | 2/2002 | Zhu et al. | |
| 2004/0023444 A1 | 2/2004 | Takano | |
| 2004/0190092 A1 | 9/2004 | Silverbrook et al. | |
| 2009/0267895 A1 | 10/2009 | Bunch | |
| 2012/0268606 A1 | 10/2012 | Liu | |
| 2013/0016070 A1 | 1/2013 | Starner et al. | |
| 2013/0083173 A1 | 4/2013 | Geisner et al. | |
| 2013/0273968 A1 | 10/2013 | Rhoads et al. | |
| 2014/0225985 A1 | 8/2014 | Klusza et al. | |
| 2014/0239071 A1* | 8/2014 | Hennick | G06K 7/1439 235/455 |
| 2014/0306993 A1 | 10/2014 | Poulos et al. | |
| 2014/0333666 A1 | 11/2014 | Poulos et al. | |
| 2015/0170378 A1* | 6/2015 | Moran | G06V 10/44 348/135 |
| 2015/0332474 A1* | 11/2015 | El Dokor | G06T 7/593 382/154 |

OTHER PUBLICATIONS

Hu, Han et al., "Toward Scalable Systems for Big Data Analytics: A Technology Tutorial", IEEE Access, vol. 2, Published Jun. 24, 2014, Digital Object Identifier 10.1109/Access 2014.2332453, pp. 652-687.

Izabela Naydenova; Advanced Holography—Metrology and Imaging; intechweb.org; Apr. 2011; (Year 2011).

Jesse Schell, The Art of Game Design; Apr. 2015; (Year: 2015).

NPL Google Search; 2020; (Year: 2020).

Sanni Siltanen, Theory and applications of marker based AR; VTT 2012; (Year: 2012).

T. Okoshi et al., Three-dimensional imaging from a unidirectional hologram; 1976; (Year: 1976).

* cited by examiner

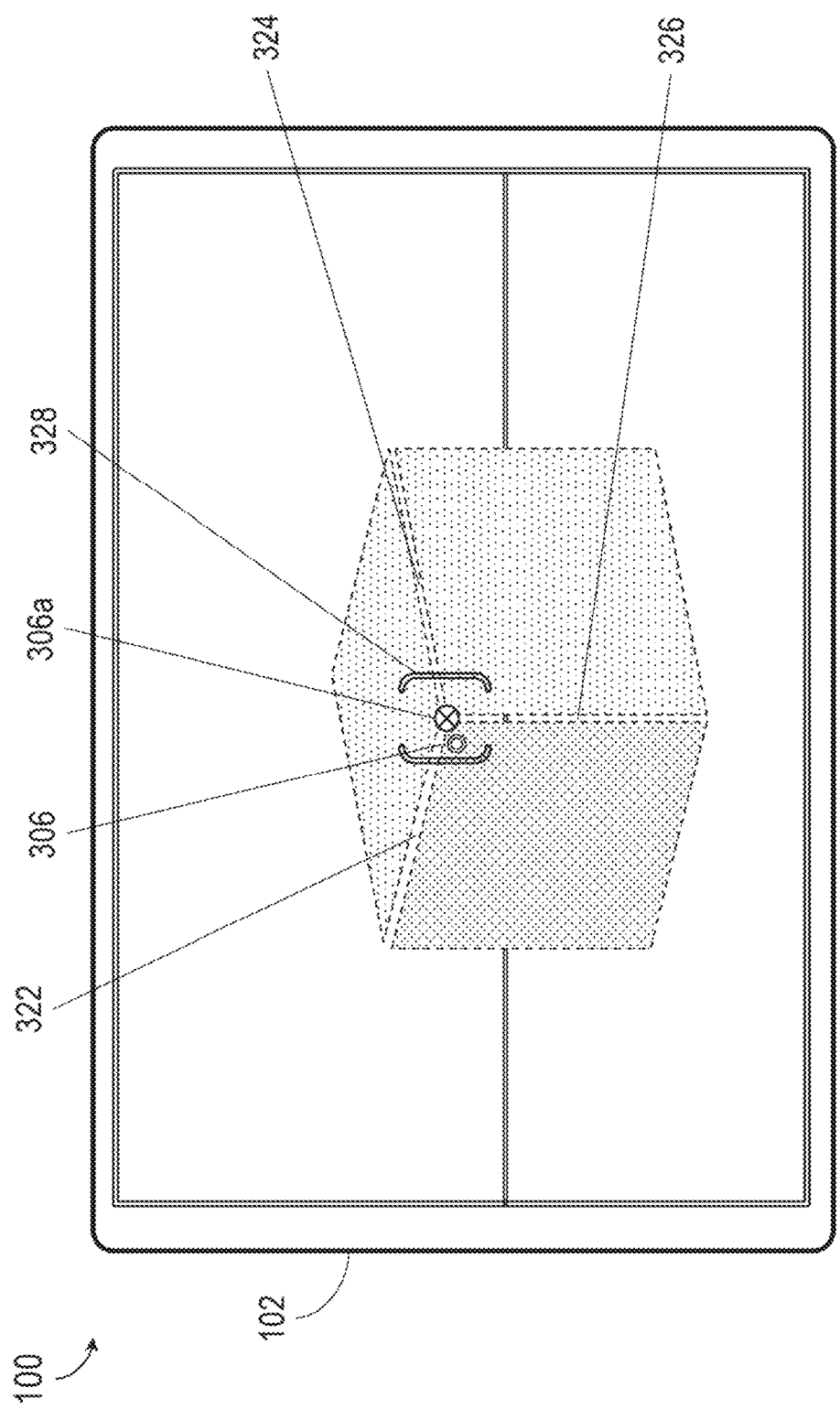

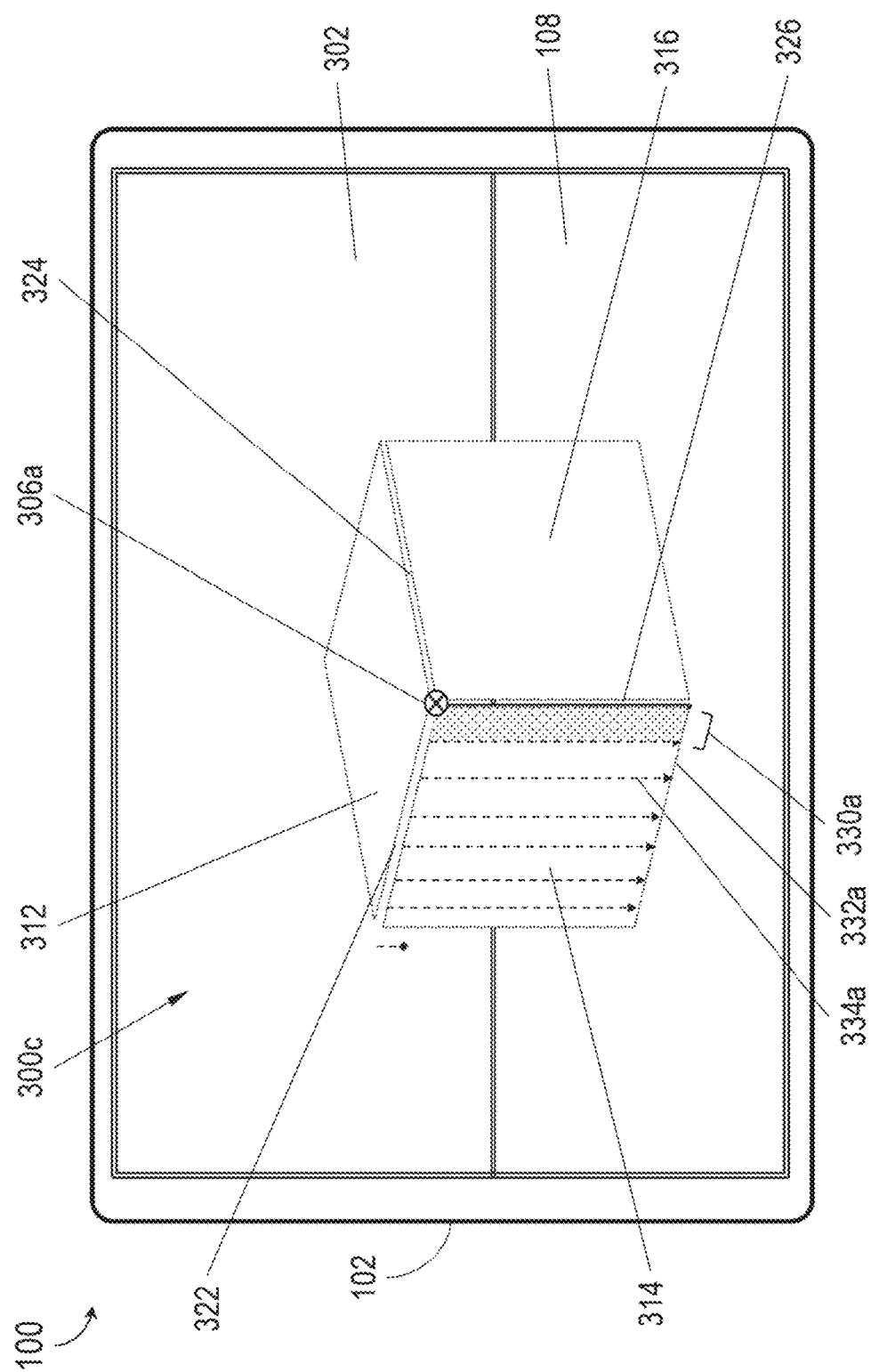

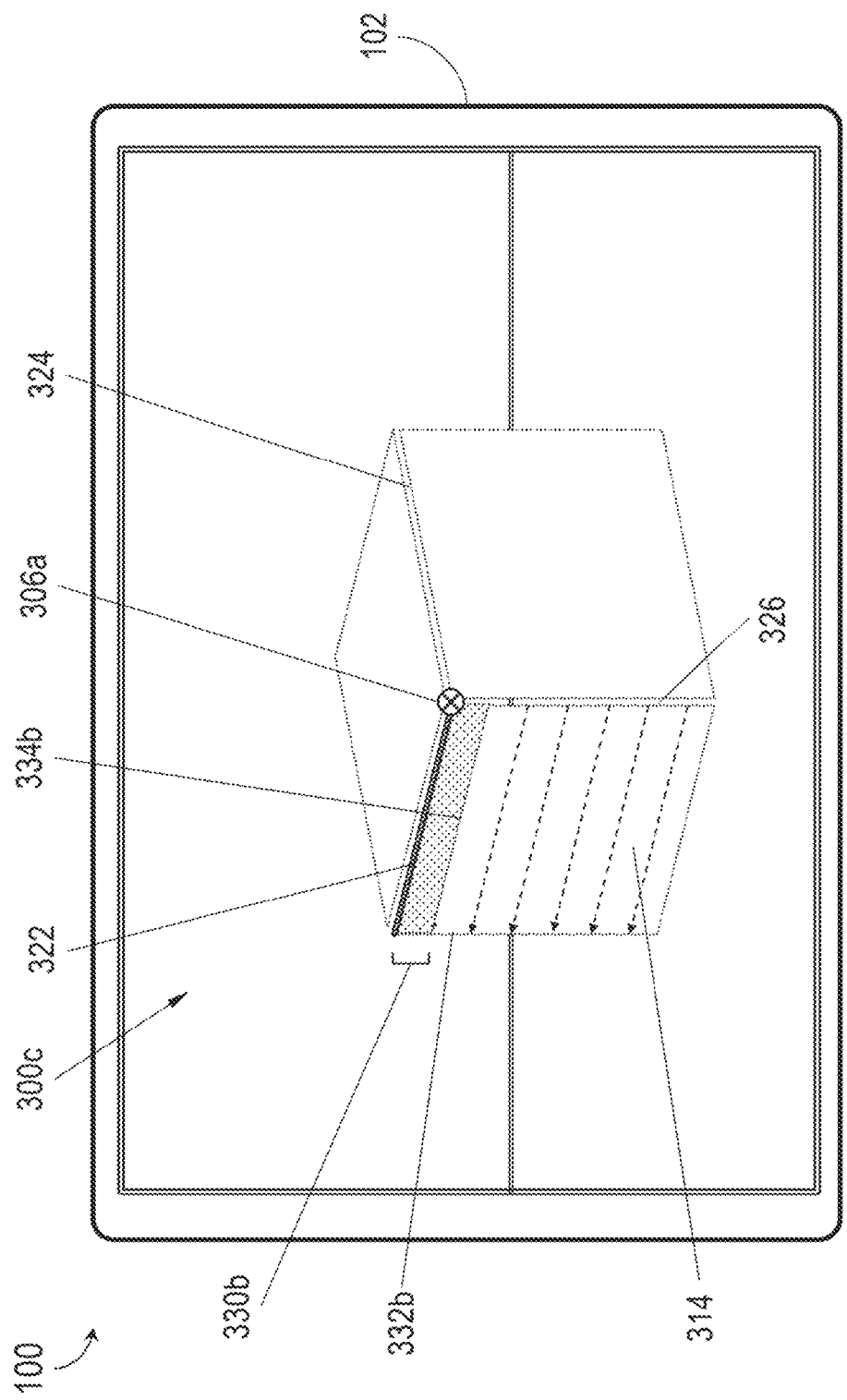

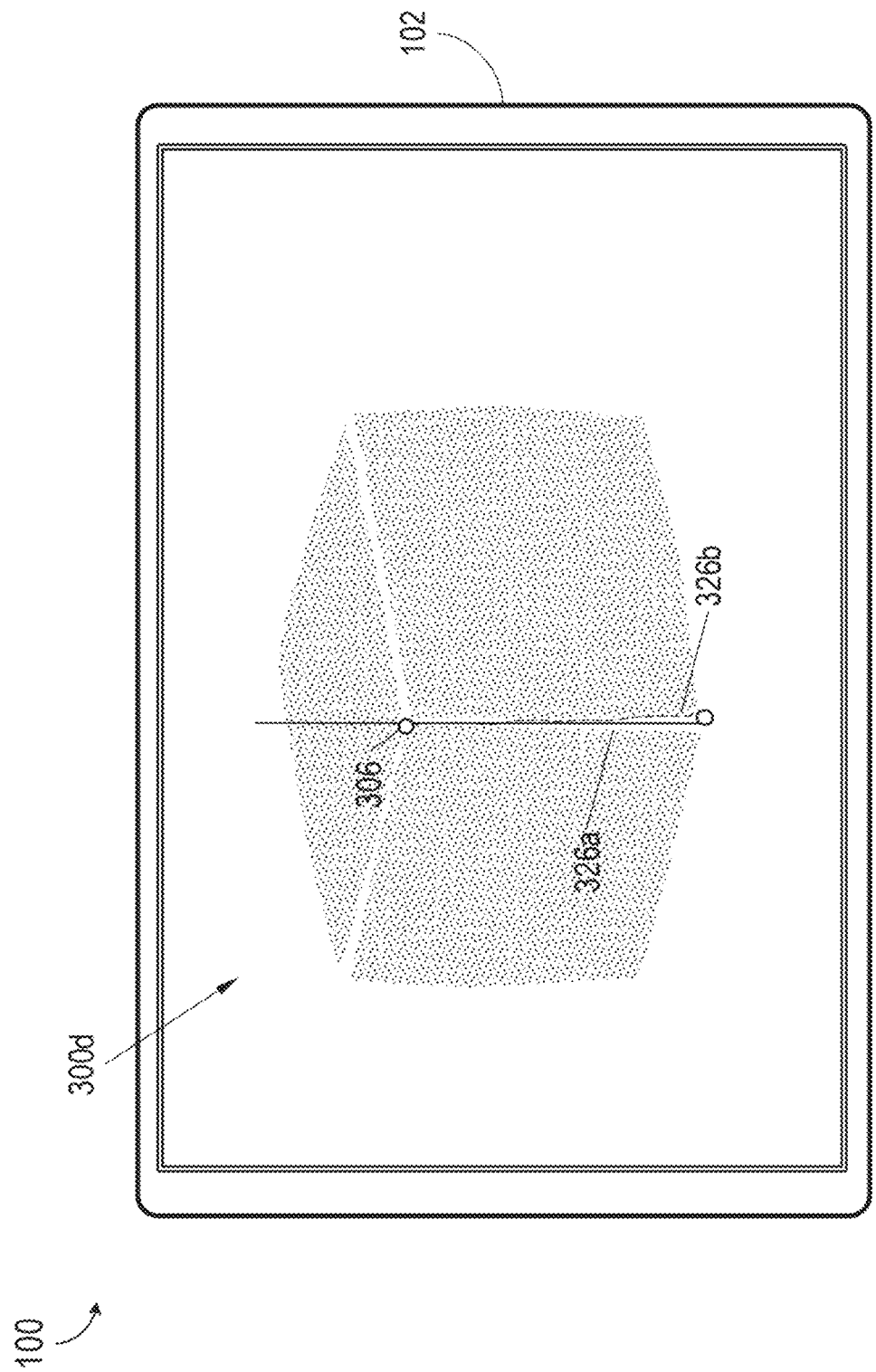

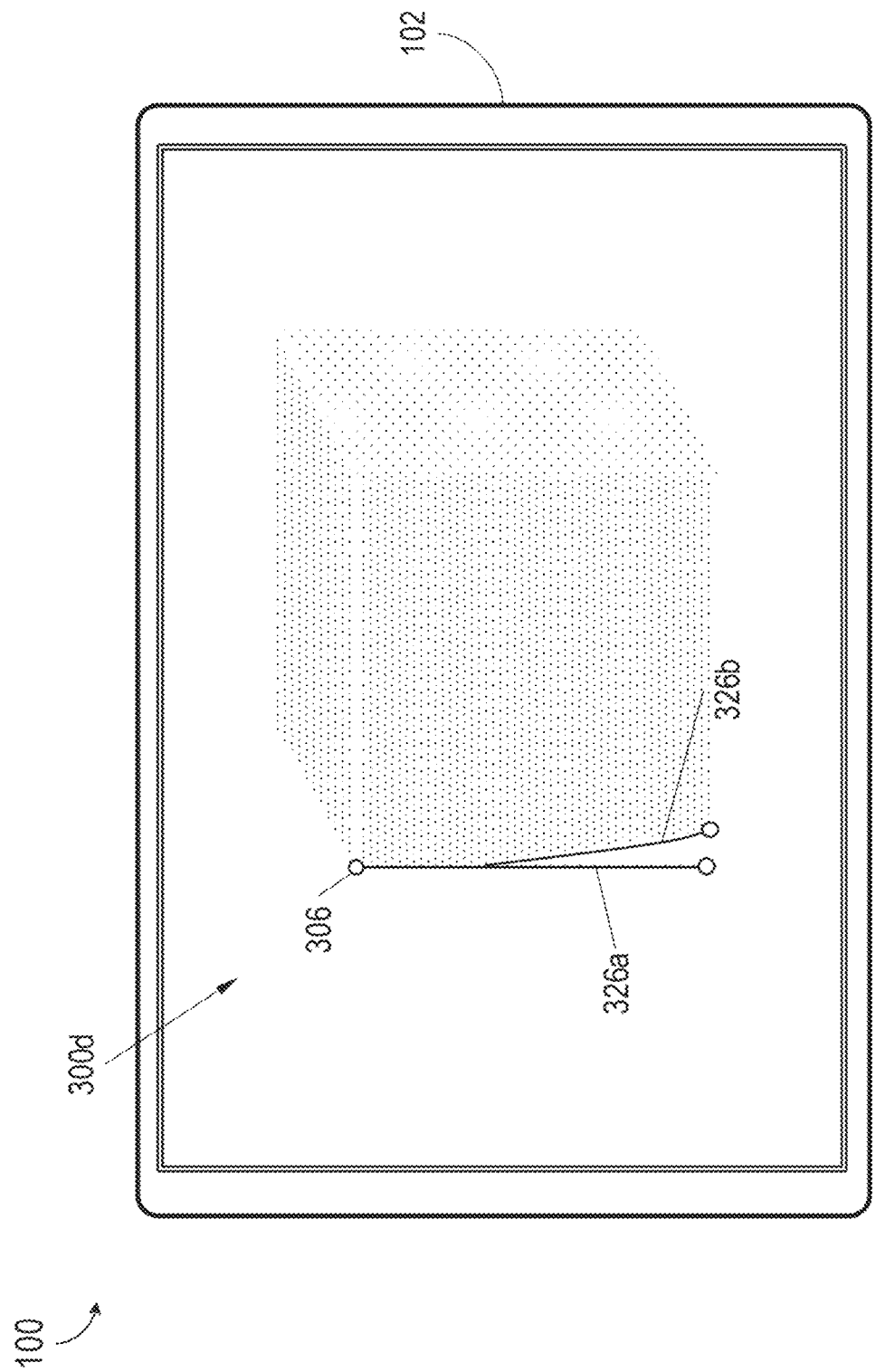

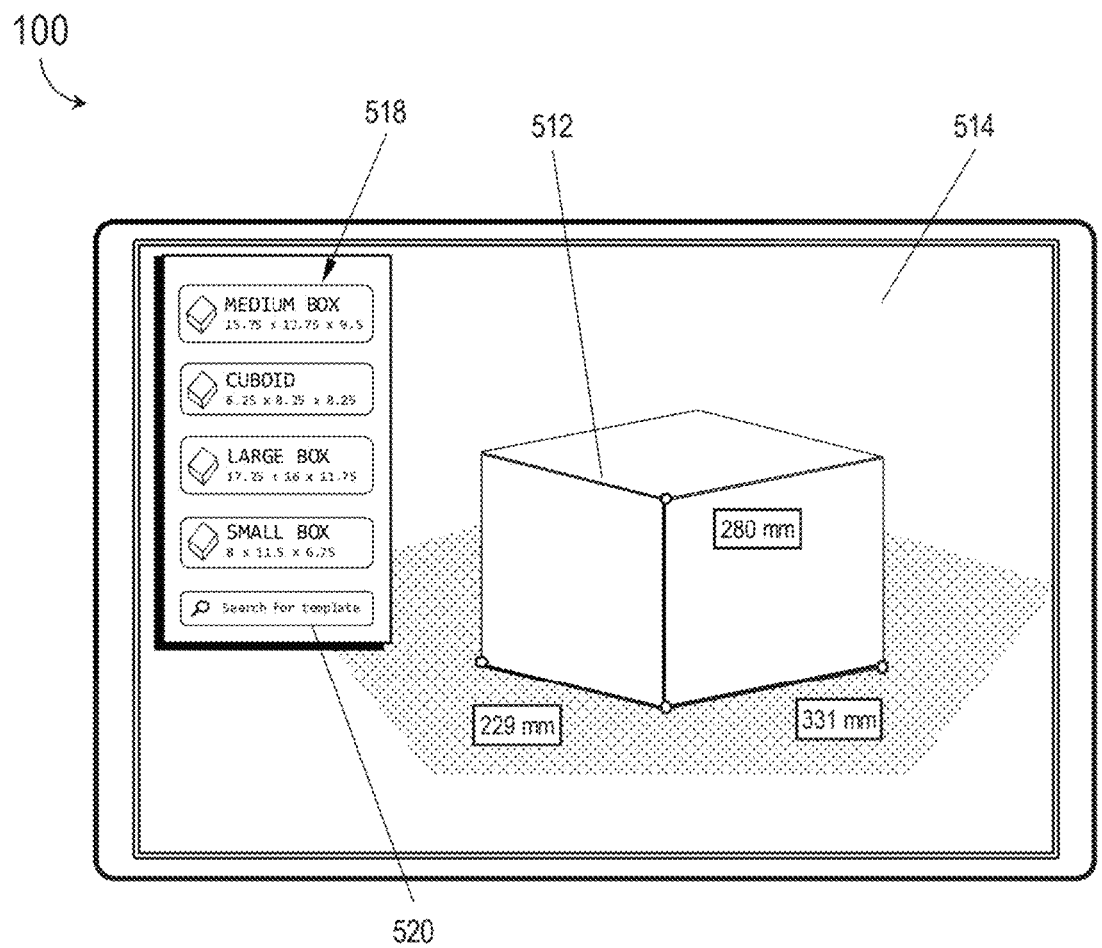
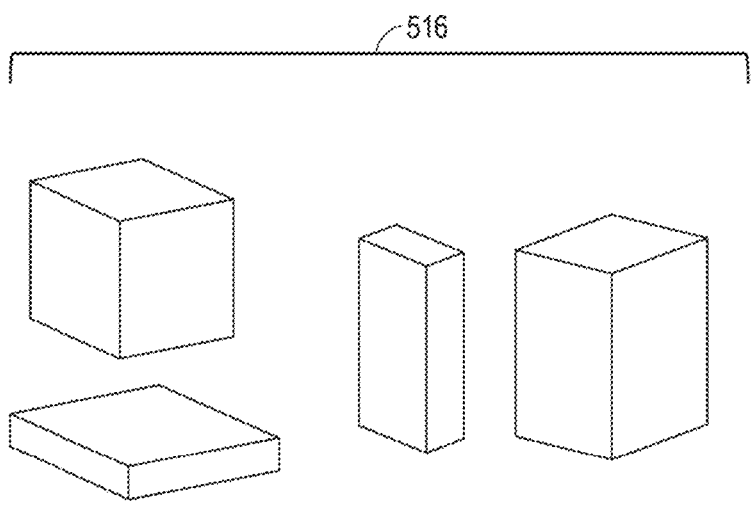
FIG. 5B

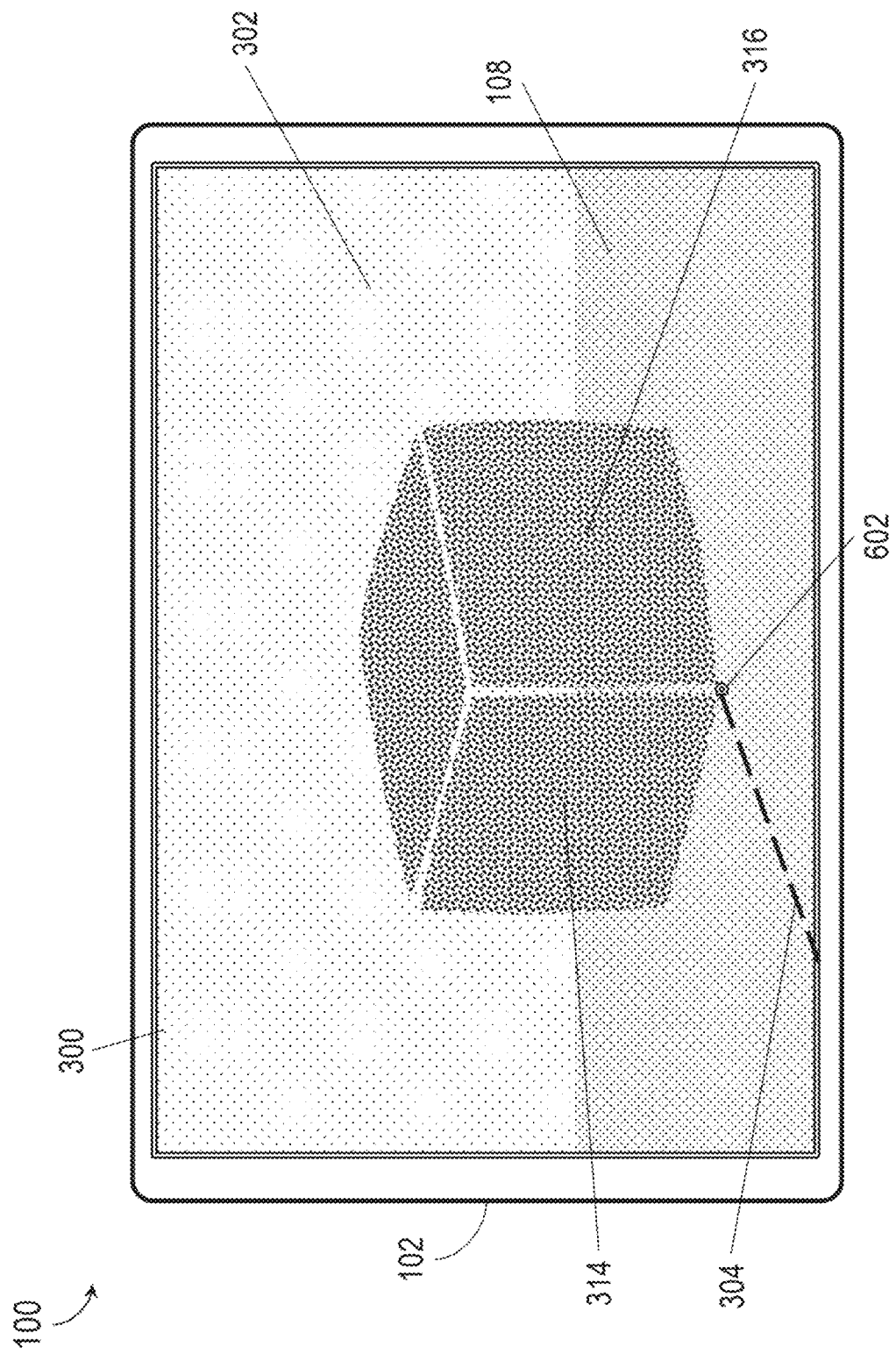

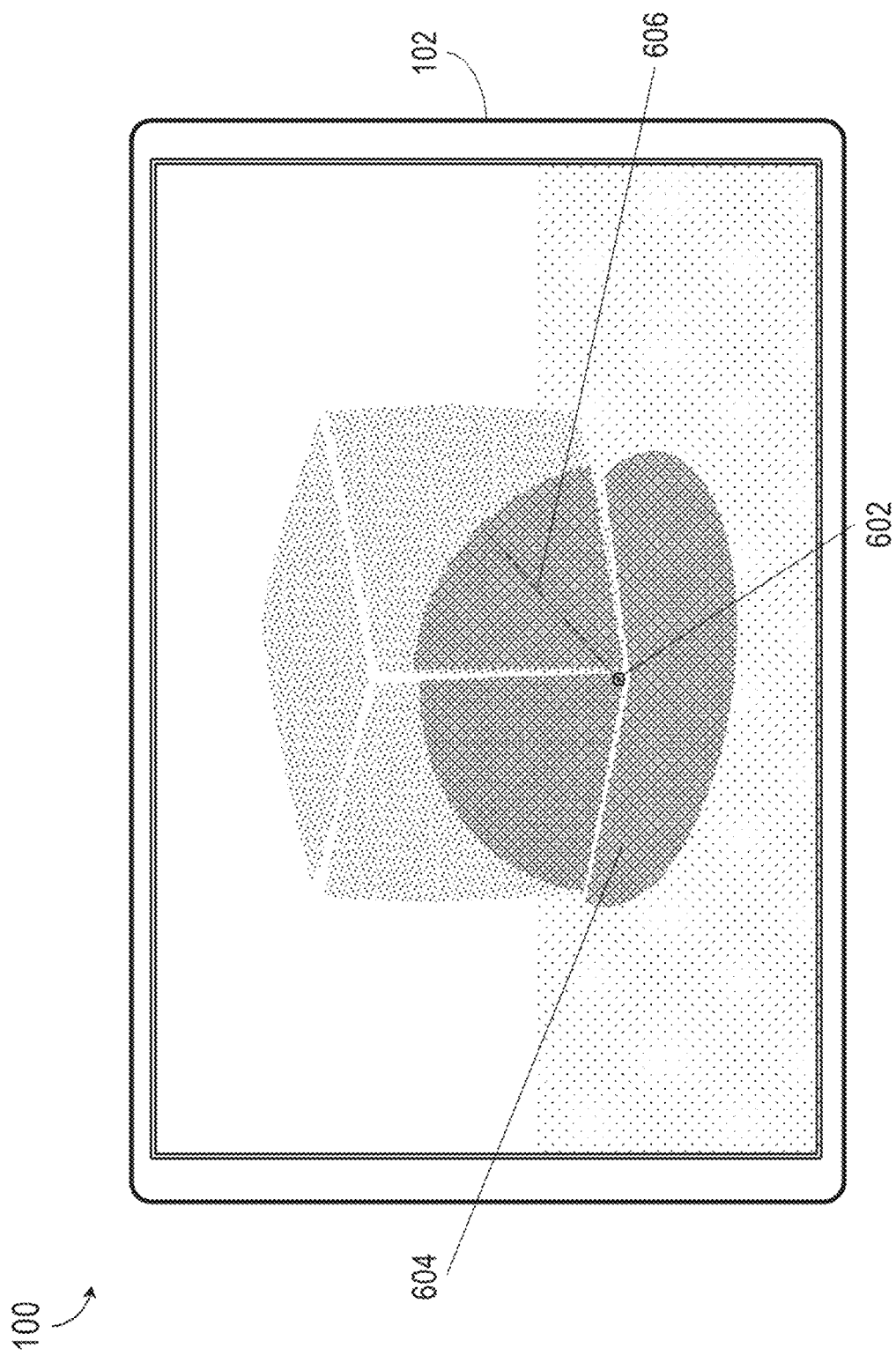

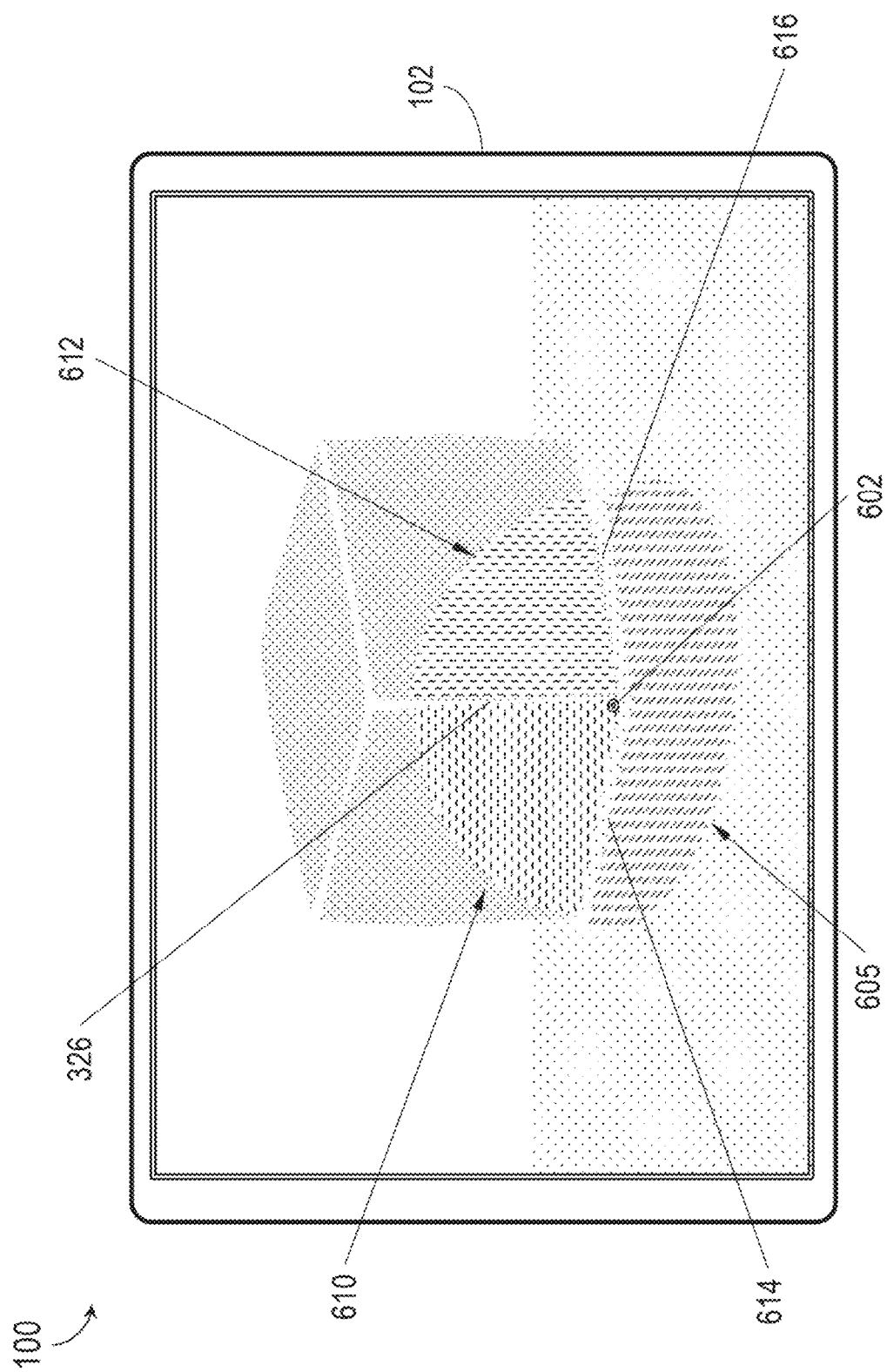

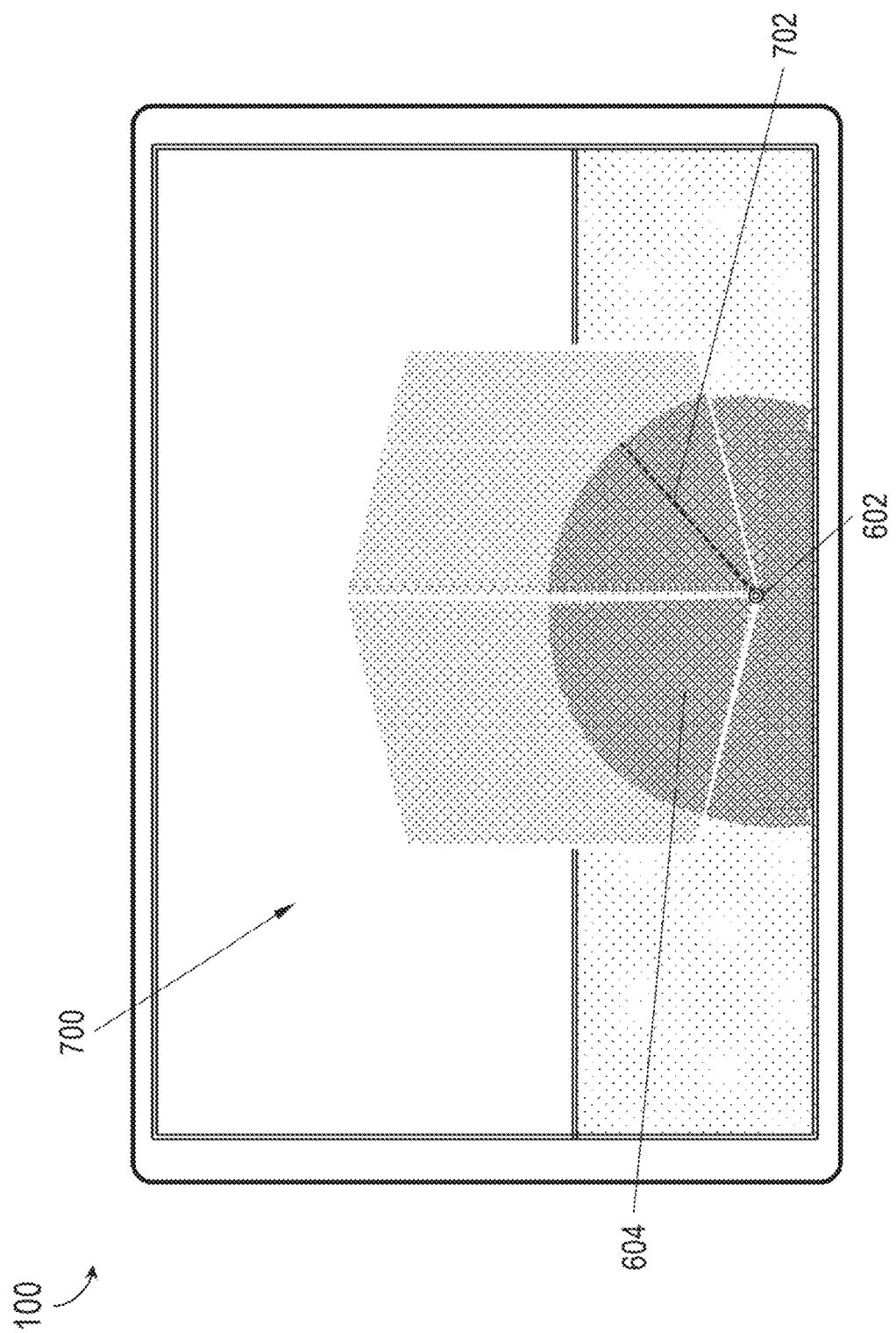

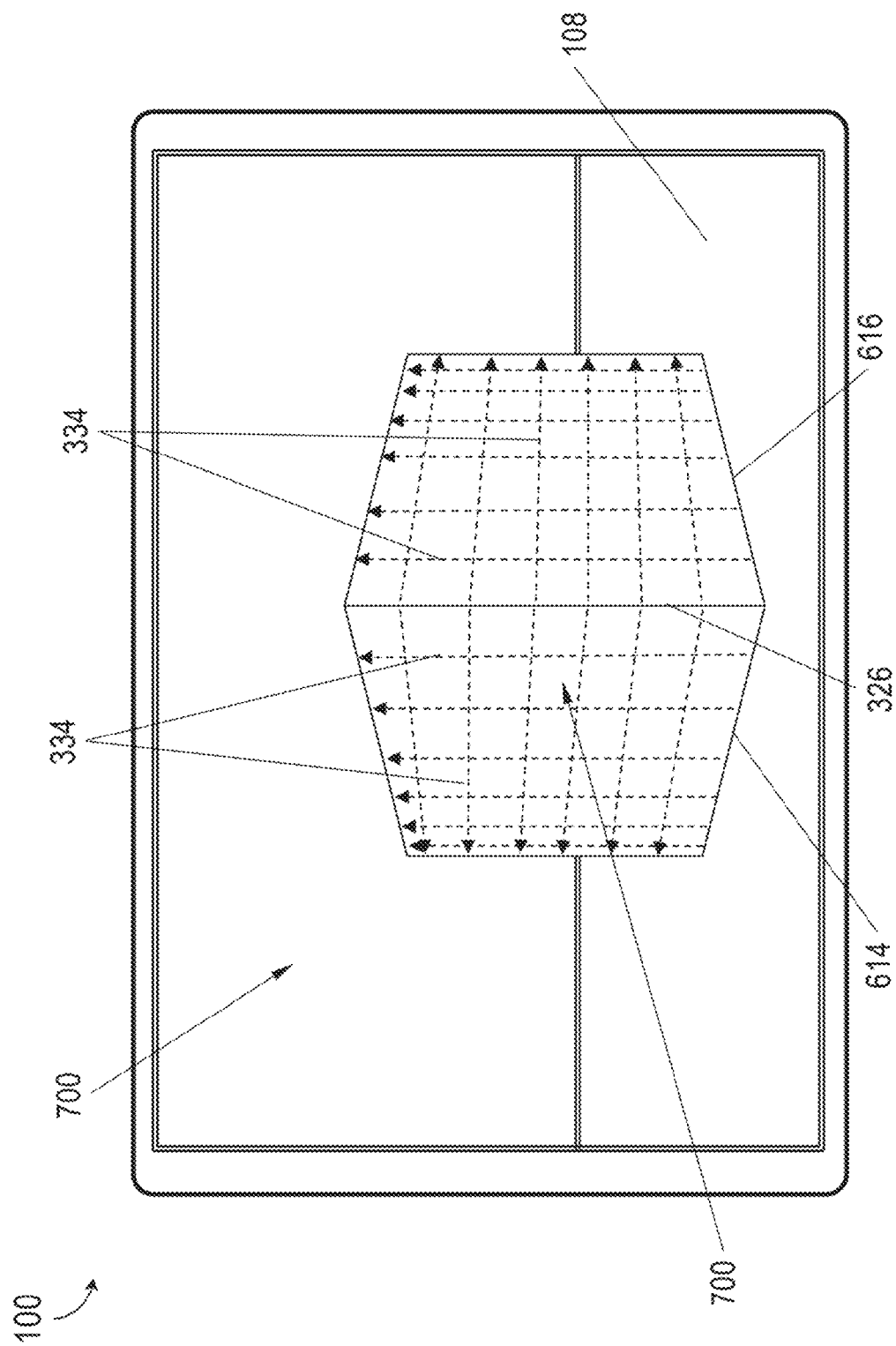

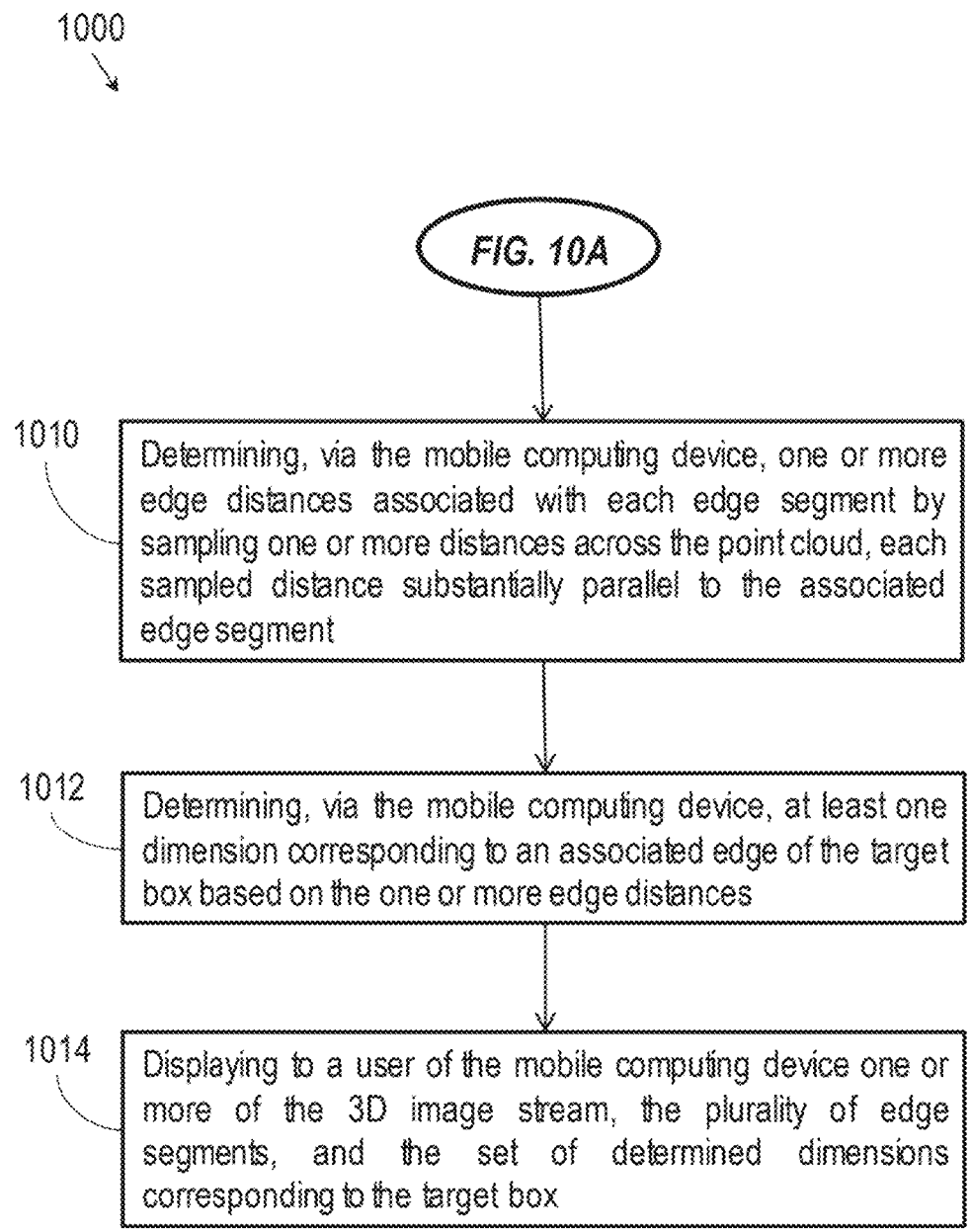

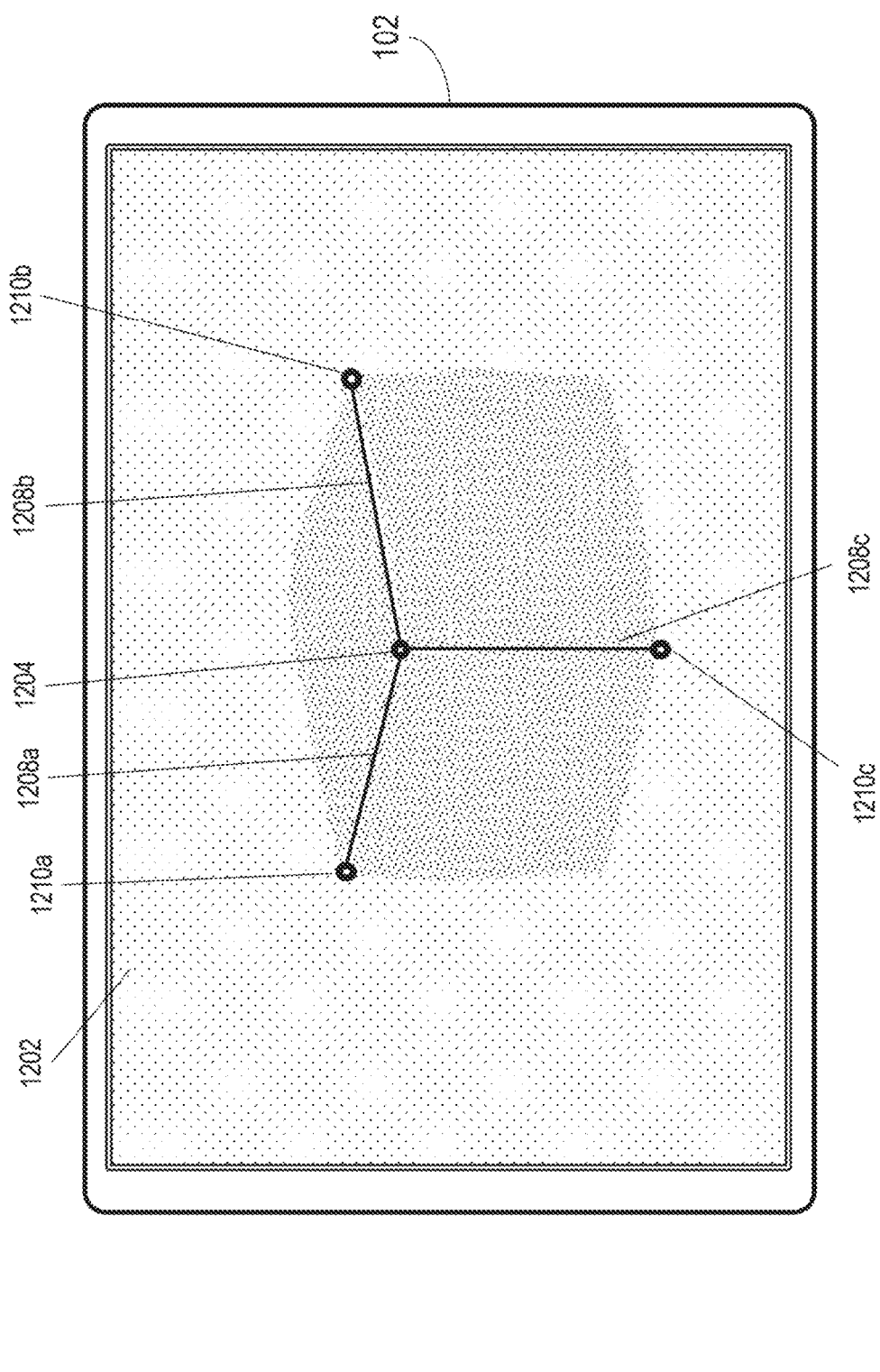

1130

Step Vector 1212: ← (-1, 0)
Test Vector 1214: ↑ (0, 1)

1202

1218

| 1300 | 1300 | 1300 | 1300 | 1300 | 1300 | 1300 | 1300 |
|------|------|------|------|------|------|------|------|
| 1300 | 1300 | 1300 | 1300 | 933  | 932  | 931  | 929  |
| 1300 | 1300 | 1300 | 932  | 931  | 929  | 929  | 928  |
| 1300 | 1300 | 932  | 930  | 929  | 928  | 928  | 927  |
| 1300 | 1300 | 931  | 929  | 928  | 927  | 926  | 925  |
| 1300 | 1300 | 928  | 927  | 927  | 925  | 924  | 921  |
| 1300 | 1300 | 929  | 928  | 926  | 923  | 922  | 919  |
| 1300 | 1300 | 930  | 928  | 926  | 923  | 920  | 917  |
| 1300 | 1300 | 930  | 928  | 926  | 920  | 917  | 915  |
| 1300 | 1300 | 930  | 928  | 926  | 922  | 917  | 914  |

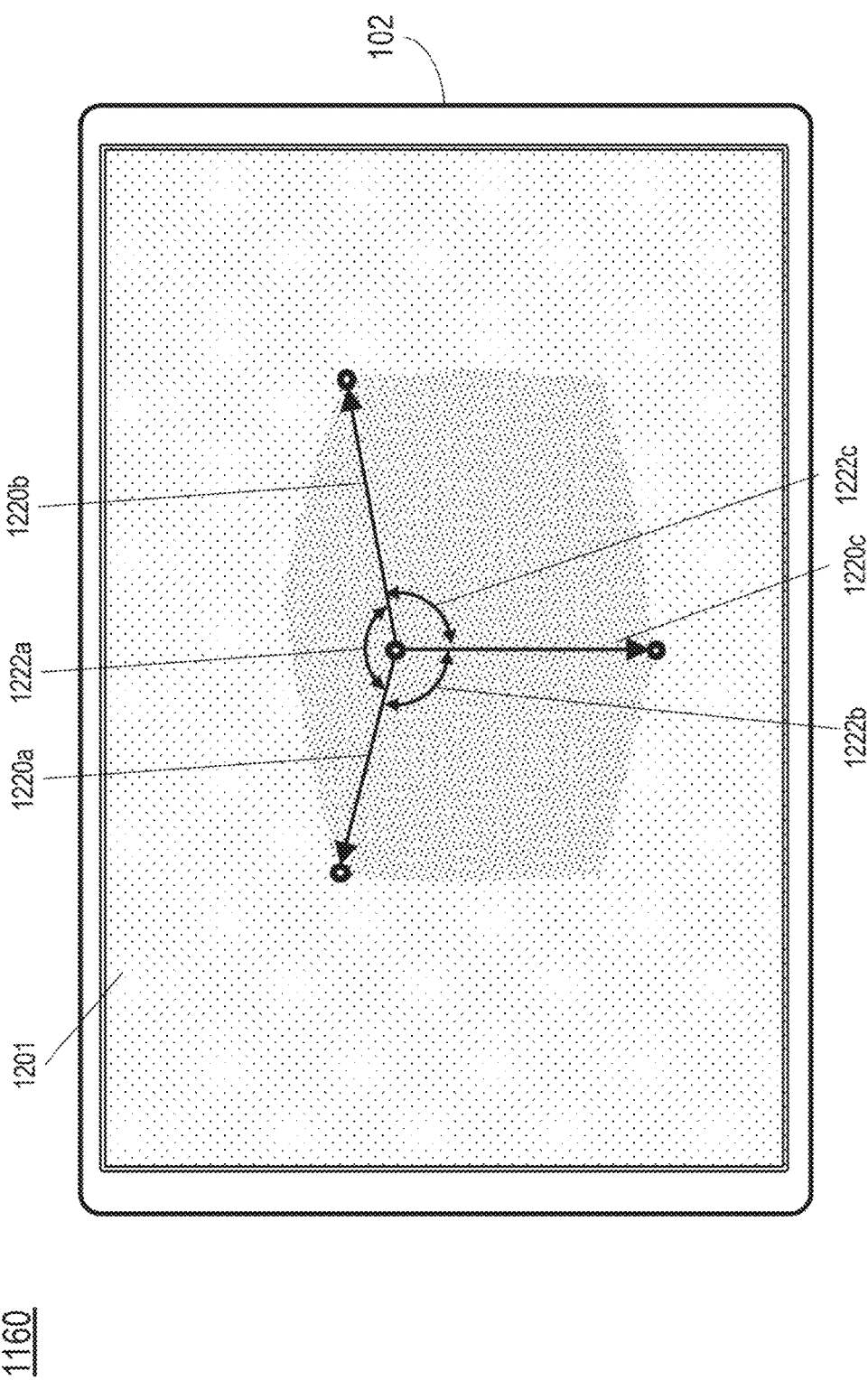

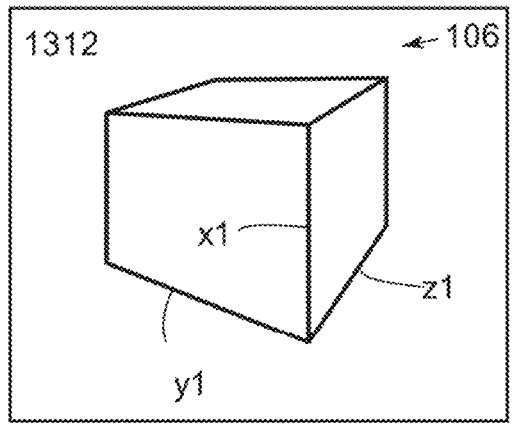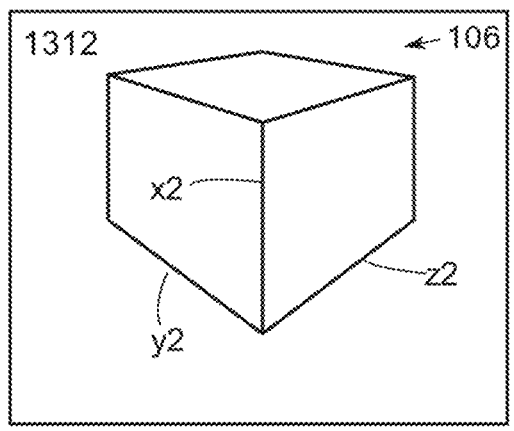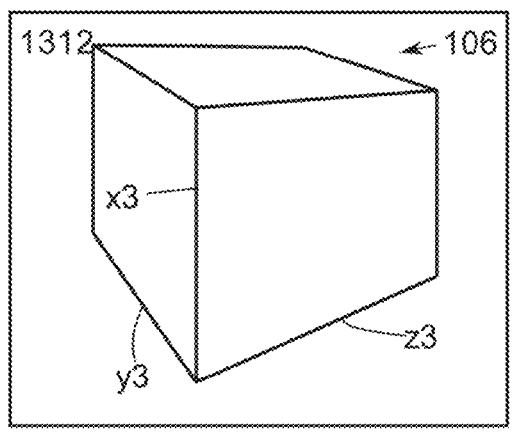
FIG. 14

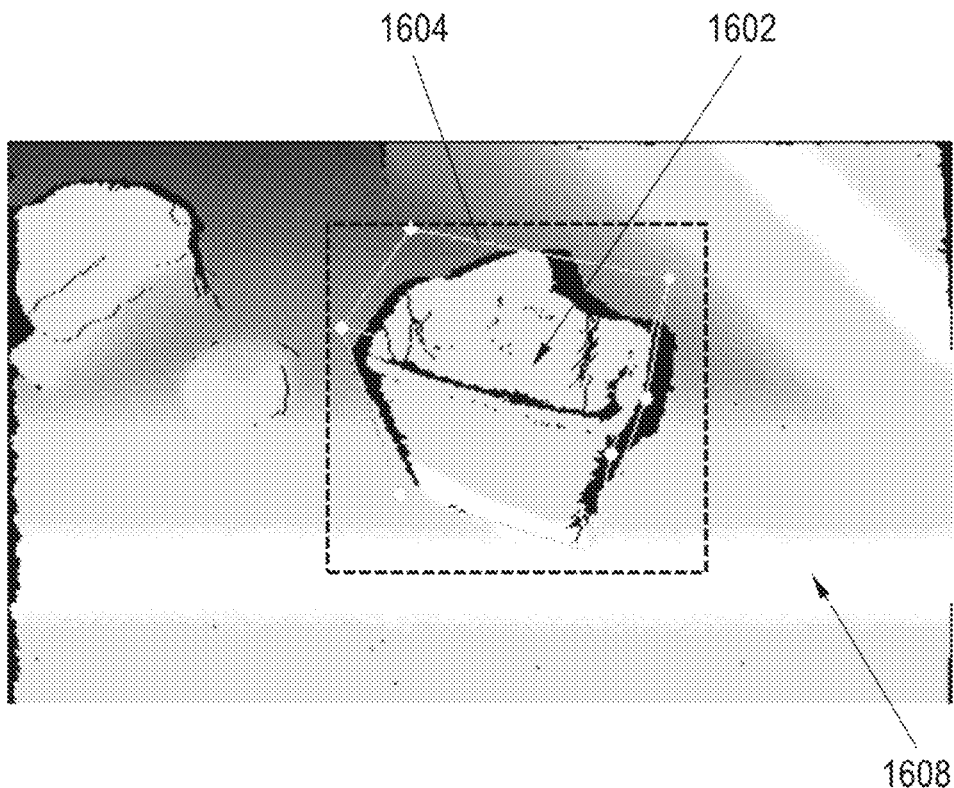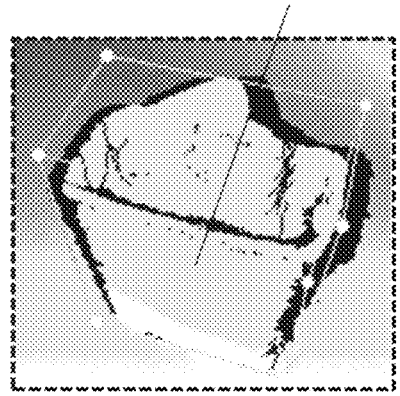
FIG. 16A 1600
1606   1612
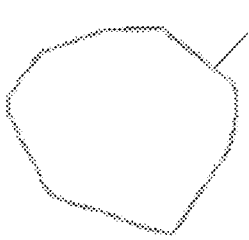
1606
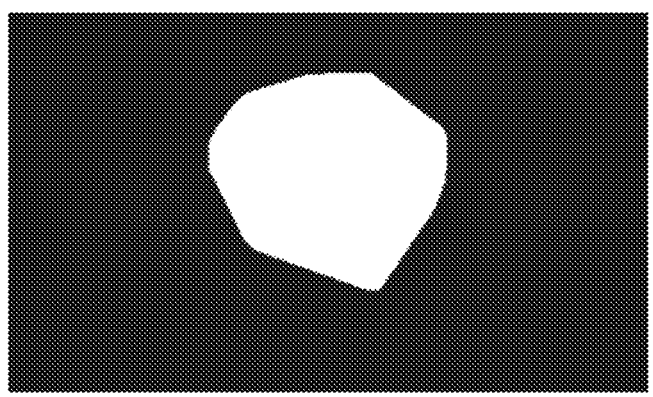
1614
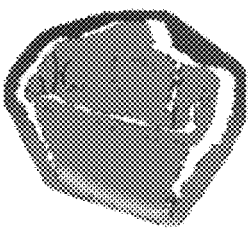
*FIG. 16B*

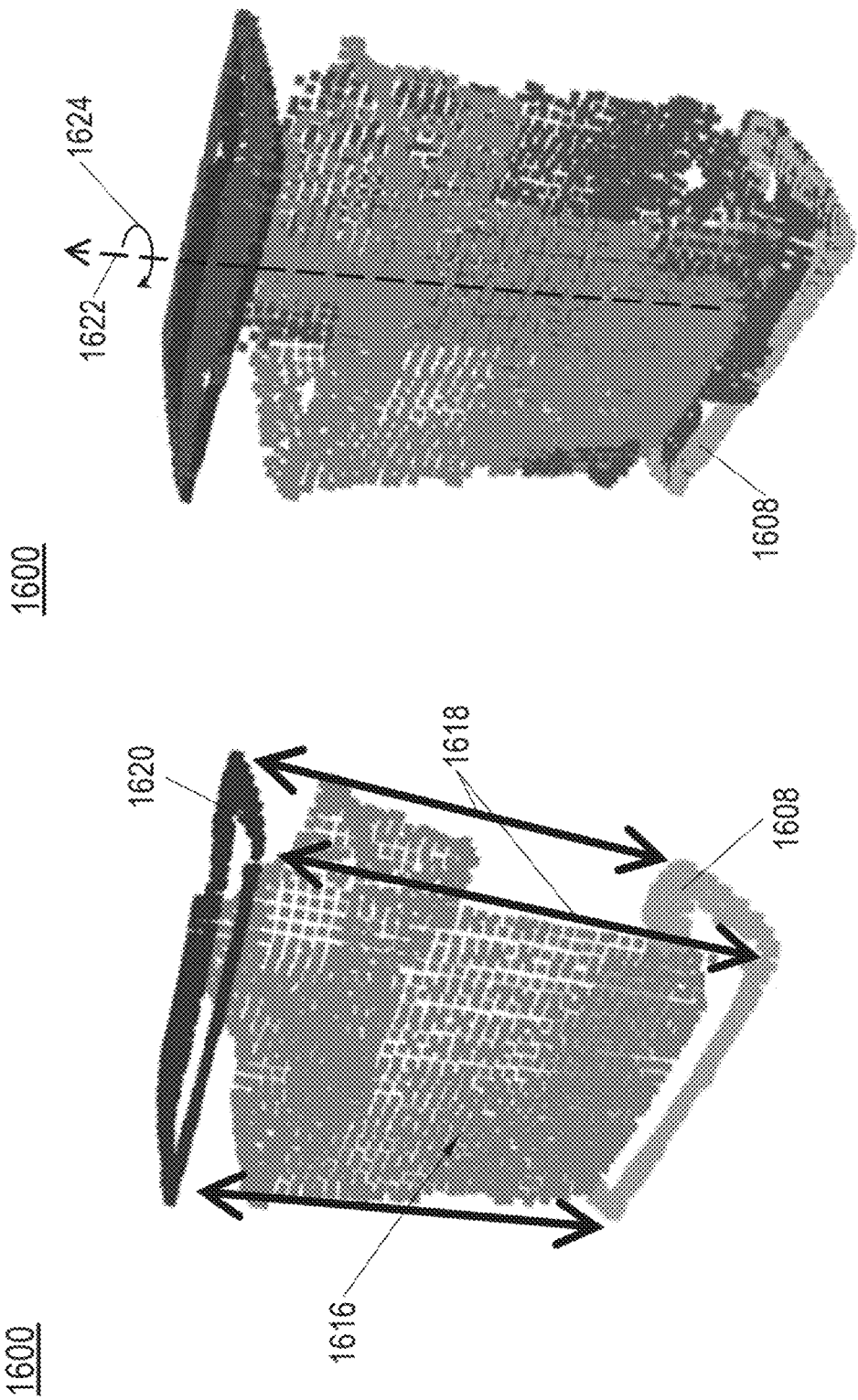

SYSTEM AND METHOD FOR BOX SEGMENTATION AND MEASUREMENT

CROSS-REFERENCE TO RELATED APPLICATION

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims the benefit under 35 USC § 119(e) for provisional applications, for any and all parent, grandparent, great-grandparent, etc. applications of the Related Applications).

RELATED APPLICATIONS

U.S. patent application Ser. No. 17/114,066 entitled SYSTEM AND METHOD FOR THREE-DIMENSIONAL BOX SEGMENTATION AND MEASUREMENT, filed Jul. 10, 2020.

U.S. patent application Ser. No. 16/786,268 entitled SYSTEM FOR VOLUME DIMENSIONING VIA HOLOGRAPHIC SENSOR FUSION, filed Feb. 10, 2020.

U.S. patent application Ser. No. 16/390,562 entitled SYSTEM FOR VOLUME DIMENSIONING VIA HOLOGRAPHIC SENSOR FUSION, filed Apr. 22, 2019, which issued Feb. 11, 2020 as U.S. Pat. No. 10,559,086;

U.S. patent application Ser. No. 15/156,149 entitled SYSTEM AND METHODS FOR VOLUME DIMENSIONING FOR SUPPLY CHAINS AND SHELF SETS, filed May 16, 2016, which issued Apr. 23, 2019 as U.S. Pat. No. 10,268,892;

U.S. Provisional Patent Application Ser. No. 63/113,658 entitled SYSTEM AND METHOD FOR THREE-DIMENSIONAL BOX SEGMENTATION AND MEASUREMENT, filed Nov. 13, 2020;

U.S. Provisional Patent Application Ser. No. 62/694,764 entitled SYSTEM FOR VOLUME DIMENSIONING VIA 2D/3D SENSOR FUSION, filed Jul. 6, 2018;

and U.S. Provisional Patent Application Ser. No. 62/162,480 entitled SYSTEMS AND METHODS FOR COMPREHENSIVE SUPPLY CHAIN MANAGEMENT VIA MOBILE DEVICE, filed May 15, 2015.

Said U.S. patent application Ser. Nos. 17/114,066; 16/786,268; 16/390,562; 15/156,149; 63/113,658; 62/162,480; and 62/694,764 are herein incorporated by reference in their entirety.

The chain of priority is now described: The present application is a continuation-in-part of U.S. Ser. No. 17/114,066; said U.S. Ser. No. 17/114,066 claims the benefit of provisional U.S. 63/113,658 and is a continuation-in-part of U.S. Ser. No. 16/786,268; said U.S. Ser. No. 16/786,268 is a continuation of U.S. Ser. No. 16/390,562; said U.S. Ser. No. 16/390,562 claims the benefit of provisional U.S. 62/694,764 and is a continuation-in-part of U.S. Ser. No. 15/156,149; said U.S. Ser. No. 15/156,149 claims the benefit of provisional U.S. 62/162,480.

BACKGROUND

While many smartphones, pads, tablets, and other mobile computing devices are equipped with front-facing or rear-facing cameras, these devices may now be equipped with three-dimensional imaging systems incorporating cameras configured to detect infrared radiation combined with infrared or laser illuminators (e.g., light detection and ranging (LIDAR) systems) to enable the camera to derive depth information. It may be desirable for a mobile device to capture three-dimensional (3D) images of objects, or two-dimensional (2D) images with depth information, and derive from the captured imagery additional information about the objects portrayed, such as the dimensions of the objects or other details otherwise accessible through visual comprehension, such as significant markings, encoded information, or visible damage.

However, elegant sensor fusion of 2D and 3D imagery may not always be possible. For example, 3D point clouds may not always map optimally to 2D imagery due to inconsistencies in the image streams; sunlight may interfere with infrared imaging systems, or target surfaces may be highly reflective, confounding accurate 2D imagery of planes or edges.

SUMMARY

A method is described, in accordance with one or more embodiments of the present disclosure. The method may be implemented by one or more processors of a mobile device. The method includes obtaining, via an image sensor of a mobile device, imaging data associated with a target object positioned on a surface, the imaging data comprising a sequence of frames, each frame comprising a depth map with two-dimensional (2D) pixel coordinates and a plurality of depth values. The method includes identifying, via one or more processors, an origin point within the plurality of depth values. The origin point is associated with a top corner of the target object. The method includes crawling, via the one or more processors, from the origin point along a first edge to a first corner, along a second edge to a second corner, and along a third edge to a third corner of the target object using an edge crawling algorithm. The method includes deprojecting, via the one or more processors, the depth map into three-dimensional (3D) points. The method includes constructing, via the one or more processors, a first edge vector representing the first edge from the origin point to the first corner, a second edge vector representing the second edge from the origin point to the second corner point, and a third edge vector representing the third edge from the origin point to the third corner point using the 3D points. The method includes determining, via the one or more processors, the target object is a cuboid by examining a first angle between the first edge vector and the second edge vector, a second angle between the first edge vector and the third edge vector, and a third angle between the second edge vector and the third edge vector. The method includes estimating, via the one or more processors, a first distance of the first edge using the first edge vector, a second distance of the second edge using the second edge vector, and a third distance of the third edge using the third edge vector.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 3A through 3I are diagrammatic illustrations of the mobile device of the volume dimensioning system of FIG. 1.

FIGS. 5A and 5B are diagrammatic illustrations of the mobile device of the volume dimensioning system of FIG. 1.

FIGS. 6A through 6C are diagrammatic illustrations of the mobile device of the volume dimensioning system of FIG. 1.

FIGS. 7A through 7E are diagrammatic illustrations of the mobile device of the volume dimensioning system of FIG. 1.

FIGS. 10A and 10B are a flow diagram illustrating a method for volume dimensioning, in accordance with one or more embodiments of the present disclosure.

FIGS. 12A through 12C are diagrammatic illustrations of the mobile device of the volume dimensioning system of FIG. 1.

FIGS. 12D and 12E are views of a depth map, in accordance with one or more embodiments of the present disclosure.

FIG. 12F is a view of a three-dimensional image data including edge vectors, in accordance with one or more embodiments of the present disclosure.

FIG. 14 depicts sets of image data of a target object generated by a volume dimensioning system including three image sensors, in accordance with one or more embodiments of the present disclosure.

FIGS. 16A through 16G depict a volume dimensioning system for irregular (e.g., non-cuboid, non-hexahedral) target objects, in accordance with one or more embodiments of the present disclosure.

DETAILED DESCRIPTION

Figure 1:
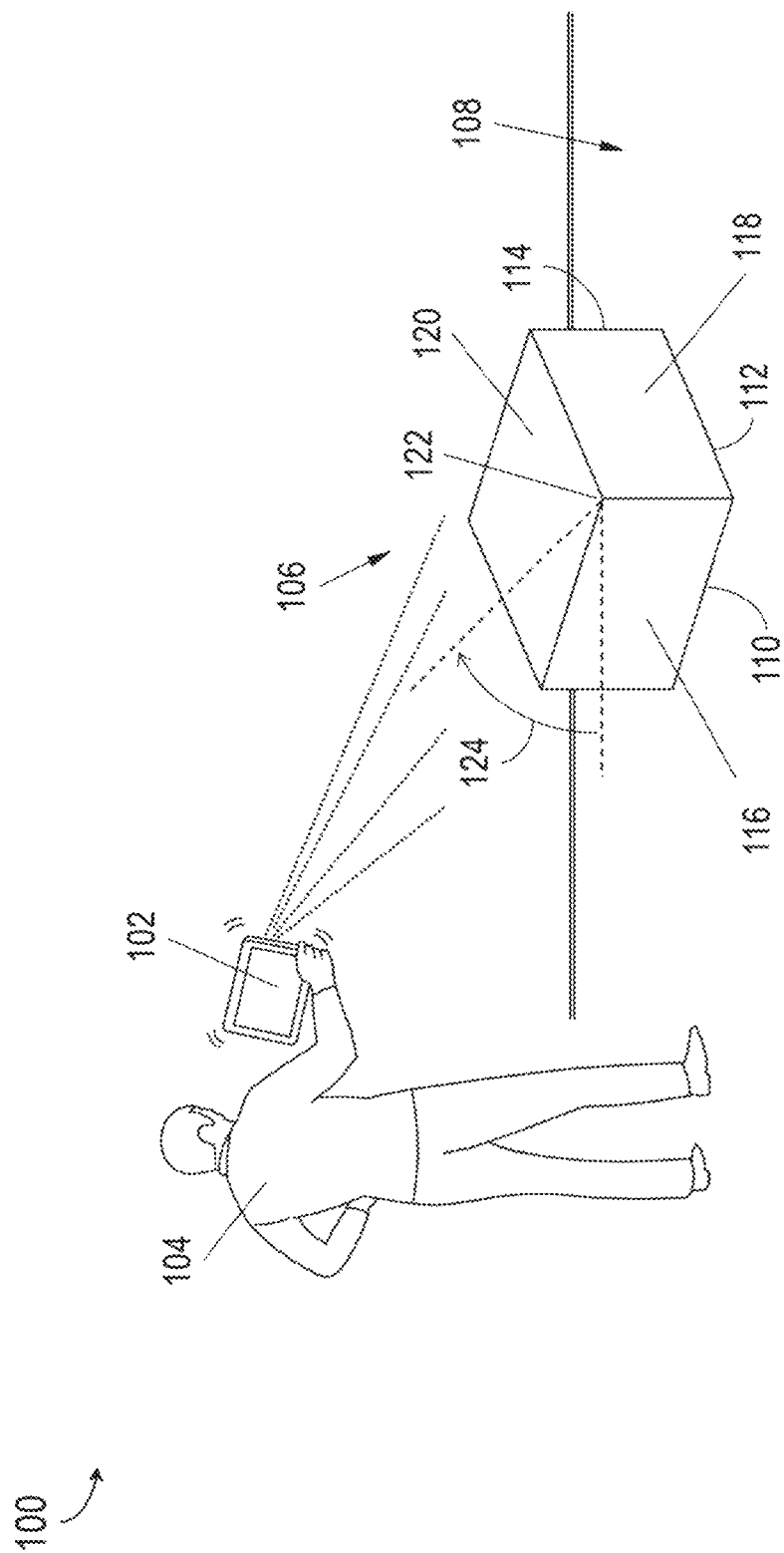
FIG. 1 is a diagrammatic illustration a volume dimensioning system including a user aiming a mobile device at a target object, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system for segmentation and dimensional measurement of a target object based on three-dimensional (3D) imaging is disclosed. In embodiments, the segmentation and measurement system comprises 3D image sensors incorporated into or attached to a mobile computing device e.g., a smartphone, tablet, phablet, or like portable processor-enabled device. The segmentation captures 3D imaging data of a rectangular cuboid solid (e.g., "box") or like target object positioned in front of the mobile device and identifies planes, edges and corners of the target object, measuring precise dimensions (e.g., length, width, depth) of the object.

Referring to FIG. 1, a system 100 for 3D box segmentation and measurement is disclosed. The system 100 may also be referred to as a volume dimensioning system. The system 100 may include a mobile device 102 (e.g., tablet, smartphone, phablet) capable of being carried by a user 104 (e.g., operator) and aimed at a target object 106 (e.g., a rectangular cuboid solid ("target box") or like object the user wishes to measure in three dimensions, the object positioned on a floor 108 or flat surface. For example, the system 100 may return dimensional information of the target object 106, e.g., a length 110, width 112, and depth 114 of the target object. In some embodiments, the system 100 will characterize the greatest of the length 110, width 112, and depth 114 as the length of the target object 106; in some embodiments, the system 100 may derive additional information corresponding to the target object 106 based on the determined length 110, width 112, and depth 114 (or as disclosed in greater detail below). In embodiments, the mobile device 102 may be optimally oriented to the target object 106 such that three mutually intersecting planes of the target object, e.g., a left-side plane 116, a right-side plane 118, and a top plane 120, are clearly visible, and such that the mobile device 102 is positioned nearest a top corner 122 of the target object (e.g., where the three planes 116, 118, 120 intersect) at an angle 124 (e.g., a 45-degree angle). For example, the system 100 may prompt the user 104 to reposition or reorient the mobile device 102 to achieve the optimal orientation described above.

Figure 2:
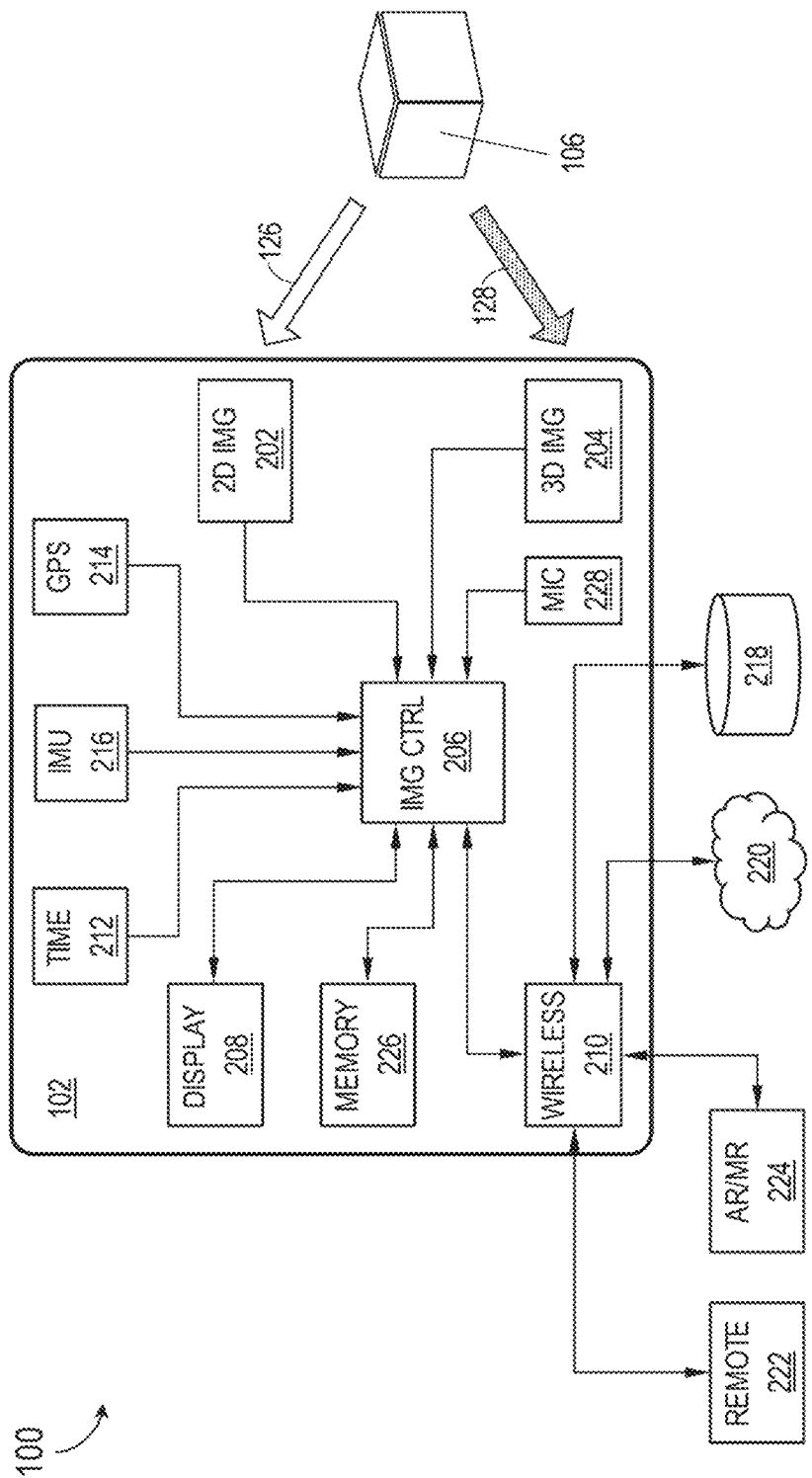
FIG. 2 is a block diagram illustrating the mobile device of the volume dimensioning system of FIG. 1.

Referring also to FIG. 2, the mobile device 102 may include 2D image sensors 202 (e.g., a visible-light camera), 3D image sensors 204 (e.g., a 3D imager), image and control processors 206, a touch-sensitive display surface 208, and a wireless transceiver 210. The mobile device 102 may additionally include a clock 212 or time sensor, a Global Positioning System (GPS) receiver 214 or similar position sensor for determining a current position of the mobile device, and an inertial measurement unit 216 (IMU) or similar inertial sensor (e.g., accelerometer, magnetometer, gyro-meter, compass) for determining a current orientation of the mobile device (or for tracking the orientation, and the rate of change thereof, over time). Instead of, or in addition to, onboard IMUs 216 of the mobile device 102, the system 100 may incorporate IMUs integrated into the 2D image sensors 202 or into the 3D image sensors 204. The 3D image sensors 204 may include imaging systems including infrared illuminators combined with multiple embedded cameras (e.g., Intel RealSense or other like triangulating systems), laser-based light detection and ranging (LIDAR) systems incorporating onboard photodetectors to track reflected beams and return distance information of the target object 106, time of flight (ToF) camera systems, or any other like sensor system capable of producing 3D spatial information of proximate objects. As noted above, the 3D image sensors 204 may incorporate inertial or orientation sensors or combinations thereof, e.g., accelerometers, gyroscopes, and compasses. The 3D image sensors may include any suitable sensors for determining depth data of the target object, such as, but not limited to, distance sensors. For example, distance sensors may include sensors equipped to detect infrared radiation together with infrared or laser illuminators (e.g., light detection and ranging (LIDAR) systems.

In embodiments, the mobile device 102 may be oriented toward the target object 106 in such a way that the 3D image sensors 204 capture 3D imaging data from a field of view in which the target object 106 is situated. For example, the target object 106 may include a shipping box or container currently traveling through a supply chain, e.g., from a known origin to a known destination. The target object 106 may be freestanding on a floor 108, table, or other flat surface; in some embodiments the target object 106 may be secured to a pallet or similar structural foundation, either individually or in a group of such objects, for storage or transport (as disclosed below in greater detail). The target object 106 may be preferably substantially cuboid (e.g., cubical or rectangular cuboid) in shape, e.g., having six rectangular planar surfaces intersecting at right angles. In embodiments, the target object 106 may not itself be perfectly cuboid but may fit perfectly within a minimum cuboid volume of determinable dimensions (e.g., the minimum cuboid volume necessary to fully surround or encompass the target object) as disclosed in greater detail below.

In embodiments, the system 100 may detect the target object 106 via 3D imaging data captured by the 3D image sensors 204, e.g., a point cloud (see FIG. 3A, point cloud 300) comprising every point in the field of view of the 3D image sensors. For example, the point cloud 300 may correspond to an array of XY points (where XY corresponds to an imaging resolution, e.g., X vertical arrays of Y pixels each), each point within the point cloud having a depth value corresponding to a distance of the point (e.g., in millimeters) from the 3D image sensors 204 (or, e.g., a distance from the mobile device 102).

3D image data 128 may include a stream of pixel sets, each pixel set substantially corresponding to a frame of 2D image stream 126. Accordingly, the pixel set may include a point cloud 300 substantially corresponding to the target object 106. Each point of the point cloud 300 may include a coordinate set (e.g., XY) locating the point relative to the field of view (e.g., to the frame, to the pixel set) as well as plane angle and depth data of the point, e.g., the distance of the point from the mobile device 102.

The system 100 may analyze depth information about the target object 106 and its environment as shown within its field of view. For example, the system 100 may identify the floor (108, FIG. 1) as a plane of gradually increasing depth that meets an intersecting plane (e.g., left-side plane 116, a right-side plane 118, a top-side plane 120, FIG. 1) of the target object 106. Based on the intersections of the plane of the target object 106 (e.g., with each other or with the floor 108), the system 100 may identify candidate edges. Similarly, the intersection of three plane surfaces, or the intersection of two candidate edges, may indicate a candidate corner (e.g., vertex).

In embodiments, the wireless transceiver 210 may enable the establishment of wireless links to remote sources, e.g., physical servers 218 and cloud-based storage 220. For example, the wireless transceiver 210 may establish a wireless link 210a to a remote operator 222 situated at a physical distance from the mobile device 102 and the target object 106, such that the remote operator may visually interact with the target object 106 and submit control input to the mobile device 102. Similarly, the wireless transceiver 210 may establish a wireless link 210*a* to an augmented reality (AR) viewing device 224 (e.g., a virtual reality (VR) or mixed reality (MR) device worn on the head of a viewer, or proximate to the viewer's eyes, and capable of displaying to the viewer real-world objects and environments, synthetic objects and environments, or combinations thereof). For example, the AR viewing device 224 may allow the user 104 to interact with the target object 106 and/or the mobile device 102 (e.g., submitting control input to manipulate the field of view, or a representation of the target object situated therein) via physical, ocular, or aural control input detected by the AR viewing device.

In embodiments, the mobile device 102 may include a memory 226 or other like means of data storage accessible to the image and control processors 206, the memory capable of storing reference data accessible to the system 100 to make additional determinations with respect to the target object 106. For example, the memory 226 may store a knowledge base comprising reference boxes or objects to which the target object 106 may be compared, e.g., to calibrate the system 100. For example, the system 100 may identify the target object 106 as a specific reference box (e.g., based on encoded information detected on an exterior surface of the target object and decoded by the system) and calibrate the system by comparing the actual dimensions of the target object (e.g., as derived from 3D imaging data) with the known dimensions of the corresponding reference box, as described in greater detail below.

In embodiments, the mobile device 102 may include a microphone 228 for receiving aural control input from the user/operator, e.g., verbal commands to the volume dimensioning system 100.

Figure 3A:
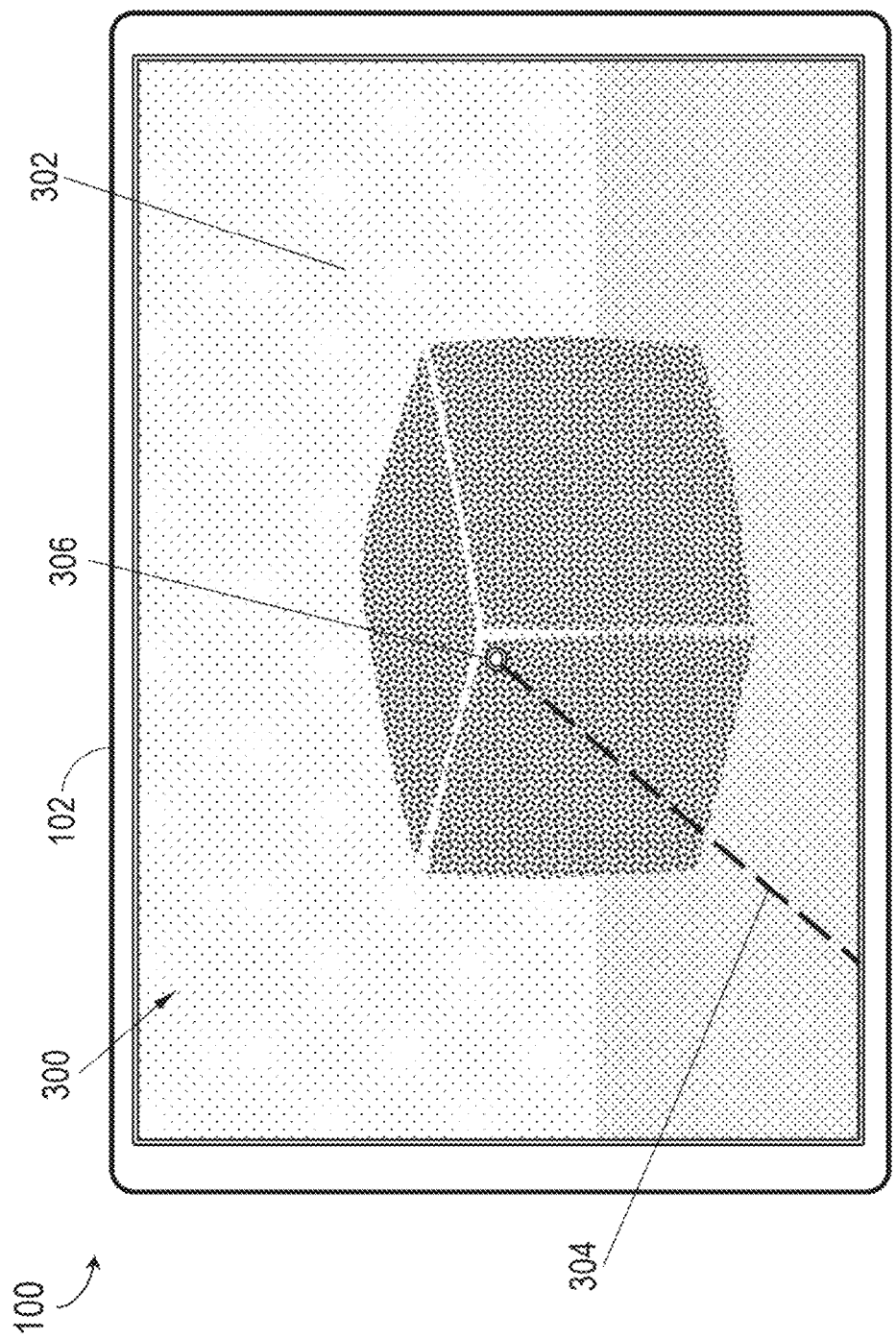

Referring to FIG. 3A, a point cloud 300 within the field of view of, and captured by, the mobile device 102, is disclosed.

In embodiments, the system 100 may determine the dimensions of the target object (106, FIG. 1) (e.g., length 110, width 112, depth 114; FIG. 1) by capturing and analyzing 3D imaging data of the target object via the 3D image sensors (204, FIG. 2) of the mobile device 102. For example, the 3D image sensors 204 may, for each frame captured, generate a point cloud including the target object 106 and its immediate environment (e.g., including the floor 108, FIG. 1) on which the target object is disposed and a wall 302 (or other background) in front of which the target object is disposed). The point cloud 300 may be generated based on a depth map (not depicted) captured by the 3D image sensors 204.

For example, the 3D image sensors 204 may ray cast (304) directly ahead of the image sensors to identify a corner point 306 closest to the image sensors (e.g., closest to the mobile device 102). In embodiments, the corner point 306 should be near the intersection of the left-side, right-side, and top planes (116, 118, 120; FIG. 1) and should, relative to the point cloud 300, have among the lowest depth values (representing a position closest to the 3D image sensors 204), corresponding to the top center corner (122, FIG. 1) of the target object 106. Any discrepancies between the identified corner point 306 and the actual top center corner 122 may be resolved as described below.

Figure 3B:
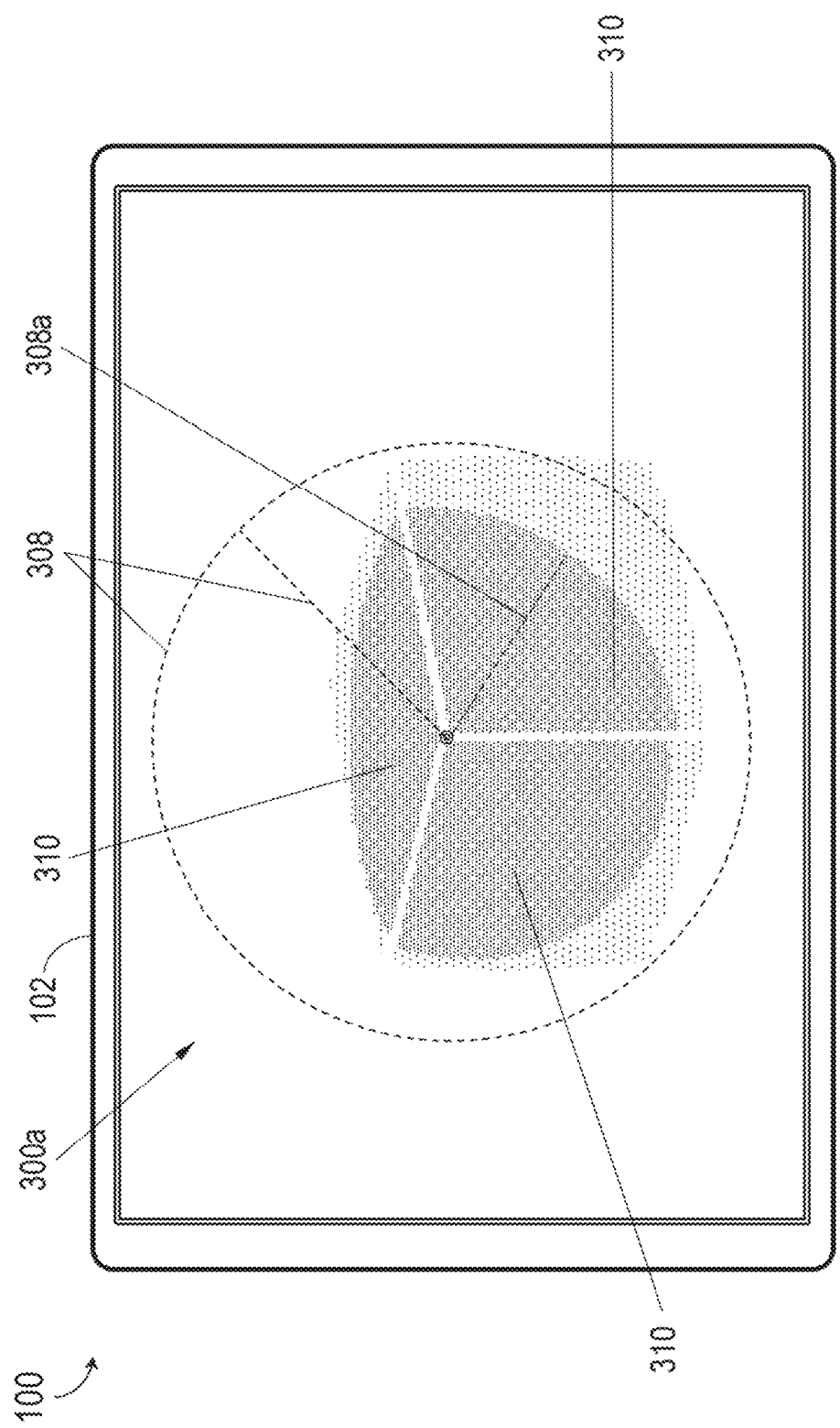

Referring also to FIG. 3B, the point cloud 300*a* may be implemented similarly to the point cloud 300 of FIG. 3A, except that the system 100 may identify points within the point cloud 300*a* corresponding to the target object (FIG. 1, 106).

In embodiments, the system 100 may perform radius searching within the point cloud 300*a* to segment all points within a predetermined radius 308 (e.g., distance threshold) of the corner point 306. For example, the predetermined radius 308 may be set according to, or may be adjusted (308*a*) based on, prior target objects dimensioned by the system 100 (or, e.g., based on reference boxes and objects stored to memory (FIG. 2, 226)). In embodiments, the system 100 may perform nearest-neighbors searches (e.g., k-NN) of the point cloud 300*a* to identify a set of neighboring points 310 likely corresponding to the target object 106.

Figure 3C:
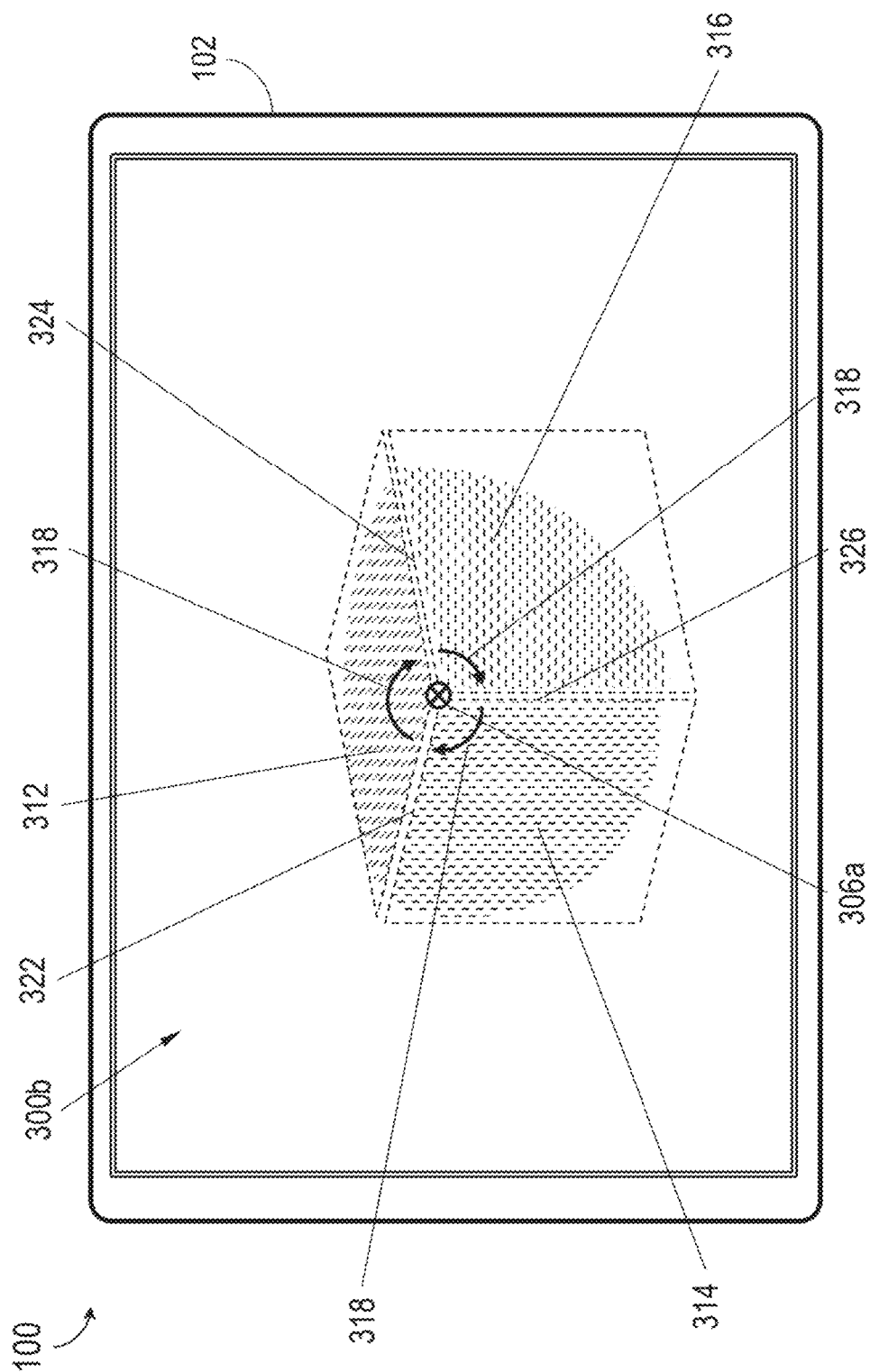

Referring also to FIG. 3C, the point cloud 300*b* may be implemented similarly to the point cloud 300*a* of FIG. 3B, except that the system 100 may perform within the point cloud 300*b* plane segmentation on the set of neighboring points (310, FIG. 3B) identified within the point cloud 300*a*.

In embodiments, the system 100 may algorithmically identify the three most prominent planes 312, 314, 316 from within the set of neighboring points 310 (e.g., via random sample consensus (RANSAC) and other like algorithms). For example, the prominent planes 312, 314, 316 may correspond to the left-side, right-side, and top planes (116, 118, 120; FIG. 1) of the target object (106, FIG. 1) (e.g., provided the target object 106 is in or near an optimal orientation to the mobile device (102, as best shown by FIG. 1) and may be fit to the left-side, right-side, and top planes 116, 118, 120.

In embodiments, the system 100 may further analyze the angles 318 at which the prominent planes 312, 314, 316 mutually intersect to ensure that the intersections correspond to right angles (e.g., 90°) and therefore to edges 322, 324, 326 of the target object 106. The system 100 may identify an intersection point (306*a*) where the prominent planes 312, 314, 316 mutually intersect, for example, the intersection point 306*a* should substantially correspond to the actual top center corner (122, FIG. 1) of the target object 106. Furthermore, the system 100 may identify edge segments (e.g., edge segment 326*a*, FIG. 3H) associated with an intersection of two adjacent planes of the prominent planes 312, 314, 316.

Referring also to FIG. 3D, the identified intersection point 306*a* may differ from the previously identified corner point 306. In embodiments, the system may repeat the radius searching and plane segmentation operations shown above by FIGS. 3B and 3C based on the identified intersection point 306*a*, e.g., to more accurately identify the left-side, right-side, and top planes 116, 118, 120 of the target object 106. Such refinement of radius searching and plane segmentation operations may be performed iteratively until some criterion is satisfied (e.g., a number of iterations); in some embodiments, the criterion may be adjusted based on user priorities (e.g., speed vs. precision). In some embodiments, the system 100 may display (e.g., via the display surface (208, FIG. 2)) to the user (104, FIG. 1) a positionable cursor 328. For example, the user 104 may position the cursor 328 to assist the system 100 in selecting, e.g., an edge 322, 324, 326 or intersection point of the target object 106. In some embodiments, the system 100 may be trained according to machine learning techniques, e.g., via a series of reference boxes of known dimensions as described below, to more quickly find an accurate intersection point 306*a*; prominent planes 312, 314, 316; and edges 322, 324, 326.

Figure 3G:
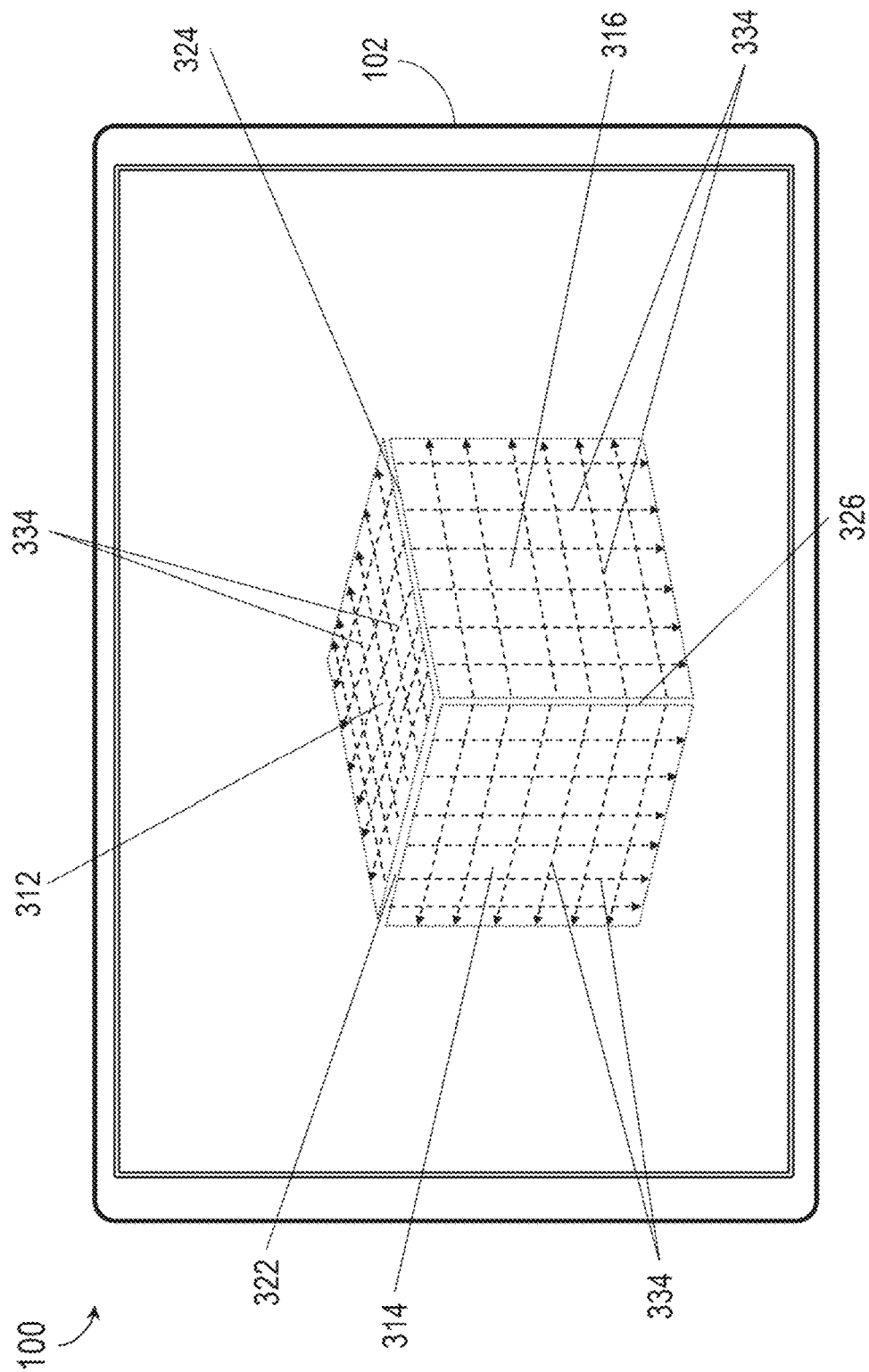

Referring also to FIGS. 3E-3G, the point cloud 300c may be implemented similarly to the point cloud of 300b of FIG. 3C, except that the system 100 may perform distance sampling of edge segments associated with the edges 322, 324, 326 identified by the prominent planes 312, 314, 316 of the point cloud 300b.

In embodiments, the system 100 may determine lengths of the edges 322, 324, 326 by measuring from the identified intersection point 306a along edge segments associated with the edges 322, 324, 326. The measurement of edge segment associated with edges 322, 324, 326 may be performed until a number of points are found in the point cloud 300c having a depth value indicating the points are not representative of the target object (106, FIG. 1), said non-representative points instead associated with, e.g., the floor 108 or the wall 302. The system 100 may then perform a calculation (e.g., a Euclidean distance calculation) between the corner point 306 and one or more measured points along the edge segment to determine a distance associated with the corresponding edge.

In embodiments, the system 100 may then perform a search at intervals 330a-c along the edges 322, 324, 326 to verify the previously measured edges 322, 324, 326. For example, the intervals 330a-c may be set based on the measured length of edge segments associated with edges 322, 324, 326. Additionally or alternatively, the intervals 330a-c may also be set according to, or may be adjusted, based on prior target objects dimensioned by the system 100 (or, e.g., based on reference boxes and objects stored to memory (226, FIG. 2)). In embodiments, the system 100 may perform nearest-neighbors searches (e.g., k-NN) of the point cloud 300c to identify a set of neighboring points 332a-c likely corresponding to the target object 106 within the intervals 330a-c. Based on the neighboring points 332, the system 100 may determine a plurality of distances 334a-c associated with the edges 322, 324, 326. Similar to determining the distance associated with the edge 322, 324, 326, the system 100 may then perform a calculation (e.g., a Euclidean distance calculation) between two furthest points among each of the intervals 330a-c to determine the plurality of distances 334a-c.

In embodiments, as shown by FIG. 3E, the search is performed on an identified prominent plane 314 (e.g., a candidate match for the left-side plane (116, FIG. 1)) to determine a distance 334a associated with the edge 326. For example, the edge 322, which has been previously measured from the corner point 306a, may be segmented into an interval 330a. The interval 330a may be searched from the edge 322 along the plane 314 to identify neighboring points 332a of the point cloud 300c. Based on the neighboring points 332a, the distance 334a may be determined. The search may then be repeated along the remaining intervals 330 of the edge 322 to determine a sample set of distances 334 associated with the edge 326. Based on the sample set, a length of the edge 326 may be determined (e.g., via a mean or median value of the sample set of distances 334).

In embodiments, as shown by FIG. 3F, the search may also be performed across the prominent plane 314 to determine a length 334b associated with the edge 322. For example, the edge 326, which had been previously measured from the corner point 306a, is segmented into intervals 330b. The interval 330b may be searched from the edge 326 to identify neighboring points 332b of the point cloud 300c. Based on the neighboring points 332a, the distance 334b may be determined. The search may then be repeated along one or more intervals 330b of the edge 326 to determine a sample set of distances 334b associated with the edge 322. Based on the sample set of distances 334b, a length of the edge 322 may be determined (e.g., via a mean value of the sample set of distances).

In embodiments, as shown by FIG. 3G, the search depicted in FIG. 3E-3F may also be performed on the identified prominent planes 312, 316 (e.g., candidate matches for, respectively, the right-side plane 118 and the top plane 120) to determine a sample set of distances 334, each distance 334 associated with the edge 324 (and, e.g., the edges 322, 326).

For example, each of the edges 322, 324, 326 may include distances 334 taken from multiple prominent planes 312, 314, 316. The edge 322 may have sample sets of distances 334 taken from the identified prominent planes 314, 316. By way of another example, the edge 324 may have a sample set of distances 334 taken from the identified prominent planes 312, 316. By way of another example, the edge 326 may have a sample set of distances 334 taken from the identified prominent planes 314, 316. By sampling multiple sets of distances 334 for each edge 322, 324, 326, the system 100 may account for general model or technology variations, errors, or holes (e.g., incompletions, gaps) in the 3D point cloud 300 which may skew individual edge measurements (particularly if the hole coincides with a corner (e.g., vertex, an endpoint of the edge).

In embodiments, the number and width of intervals 330 used to determine edge distances 334 is not intended to be limiting. For example, the interval 330 may be a fixed width for each plane. By way of another example, the interval 330 may be a percentage of the width of a measured edge. By way of another example, the interval 330 may be configured to vary according to a depth value of the points in the point cloud 300 (e.g., as the depth value indicates a further away point, the interval may be decreased). In this regard, a sensitivity of the interval may be increased.

In embodiments, the user (104, FIG. 1) may select a setting which indicates the target object 106 has an oblong shape (not depicted). Upon the selection by the user, a width of the interval 330 may be adjusted accordingly. In the case of a target object 106 with an extra-long plane, the width of the interval for the extra-long plane may be increased relative to the other planes. Similarly, in the case of a target object 106 with an extra-short plane, the width of the interval 330 for the extra-short plane may be decreased relative to the other planes.

Referring also to FIGS. 3H and 3I, the point cloud 300d may be implemented similarly to the point cloud 300c of FIGS. 3E-3G, except that the system 100 may be configured to account for divergences of the point cloud 300d from one or more edge segments.

In embodiments, the system 100 may be configured to account for points in the point cloud 300d which diverge from identified edge segments. For example, the system 100 may segment prominent planes (312, 314, 316; FIG. 3G) and edges (322, 324, 326, FIG. 3G). The system 100 may establish edge vectors 336 along which the system may sample at intervals to establish distances of the edge 322, 324, 326 segments (and, e.g., refine each distance by sampling at intervals across each prominent plane 312, 314, 316, as shown by FIGS. 3E through 3G). However, as the system 100 samples along an edge vector 336 (e.g., associated with the edge segment 326) from the origin point 306 (or, e.g., from a refined intersection point (306a, FIGS. 3C/D)), the component points of the point cloud 300d may diverge from the edge vector. For example, the system 100 may begin by searching for points in the point cloud 300d within a radius 338 of the edge vector 336. As the component points of the point cloud 300*d* corresponding to the edge segment 326 diverge (326*a*) from the edge vector 336 (e.g., due to a reflectivity of the floor 108), the system 100 may need to enlarge the radius (338*a*) within which it searches for points corresponding to the edge 326. A significant divergence (326*a*) from the edge vector 336 may affect distance measuring.

In embodiments, the system 100 may account and/or compensate for the divergence by searching within the radius 338 of a previous point 340 (as opposed to, e.g., searching at intervals (330*a-b*, FIGS. 3E/F)) for the next point 340*a* of the edge segment 326*a*. For example, the edge vector 336 may be updated based on a weighted average of the initial or current vector and the vector from the previous point 340 to the next point 340*a*, updating the edge vector to account for the actual contour of the divergent edge segment (326*a*) as a component of the point cloud 300*d*.

In this regard, the system 100 may determine an updated edge segment 326*b* consistent with the point cloud 300*d*. The system 100 may then determine a distance of the edge 326 associated with the updated edge segment 326*b*, as discussed previously (e.g., by a Euclidean distance calculation). In some embodiments, the system 100 may generate a "true edge" 326*c* based on, e.g., weighted averages of the original edge vector 336 and the divergent edge segment 326*a*.

The ability to determine an updated edge segment 326*b* based on diverging points in the point cloud 300*d* may allow the system 100 to more accurately determine a dimension of the target object 106. In this regard, where the points diverge from the initial edge vector 336 (e.g., edge segment 326*a*) a search may prematurely determine that an end of the edge segment has been reached (e.g., because no close points are found within the radius 338), unless the system 100 is configured to account for the divergence. This may be true even if there are additional neighboring points (310, FIG. 3B) associated with the target object 106. Furthermore, where the target object 106 includes elongated planes and/or edges (see, e.g., FIGS. 4A/B below), any divergence of points from an edge segment 326 may be magnified through a crawl of the edge segment (e.g., from the origin point 306 to an endpoint 342), as compared to a shorter plane.

In embodiments, the system 100 is configured to capture and analyze 3D imaging data of the target object 106 at a plurality of orientations. For example, it may be impossible or impractical to capture the left-side plane, right-side plane, and top plane (116, 118, 12-0; FIG. 1) within the field of view of the mobile device 102, e.g., the target object 106 may be a cuboid having one or more highly elongated edges (402) and/or surfaces which may complicate radius searching and plane segmentation operations from a single perspective. Accordingly, in embodiments the system 100 may combine 3D imaging data from multiple perspectives to determine the dimensions of the target object 106.

Figure 4A:
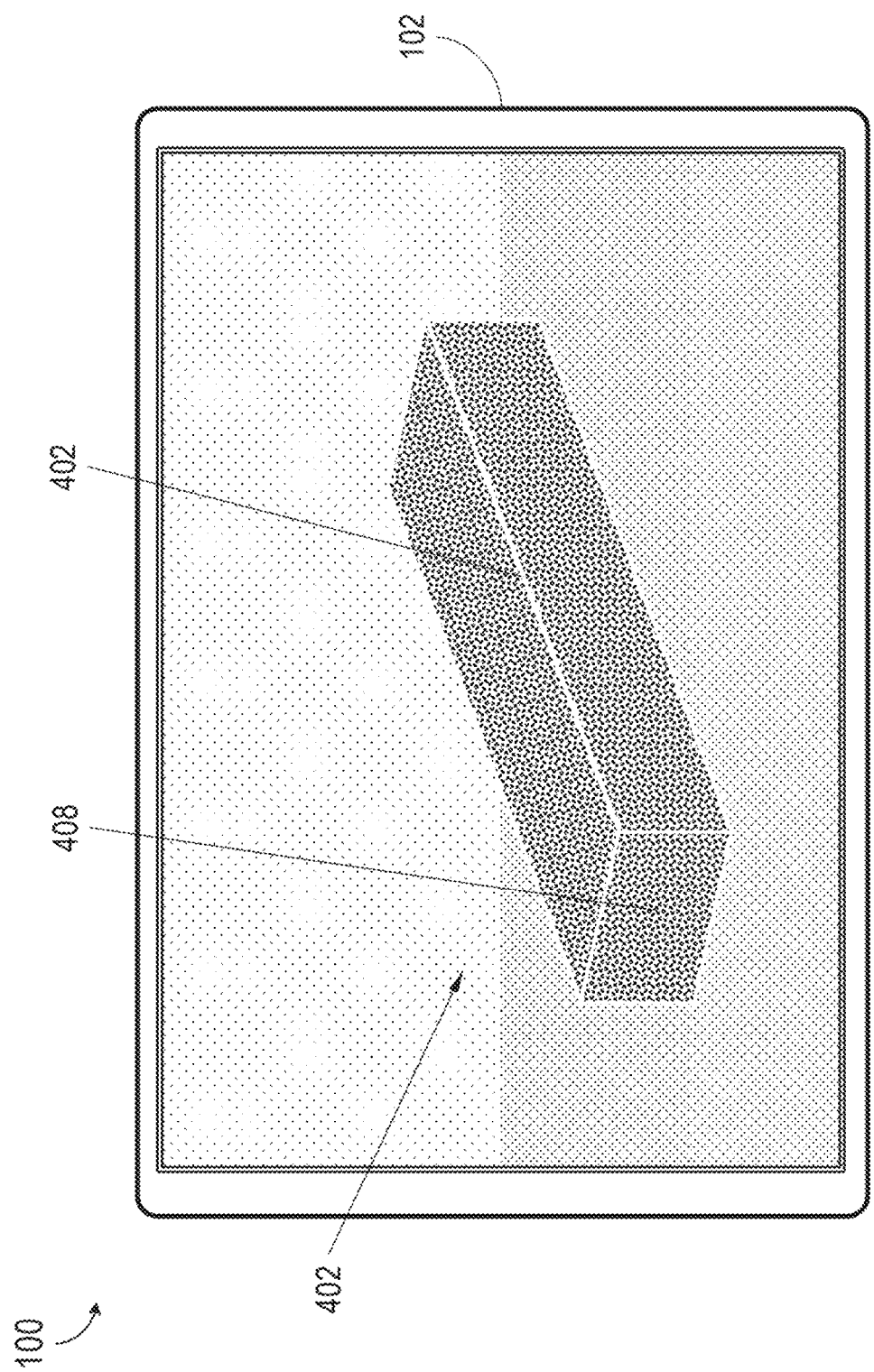
FIGS. 4A and 4B are diagrammatic illustrations of the mobile device of the volume dimensioning system of FIG. 1.
Figure 4B:
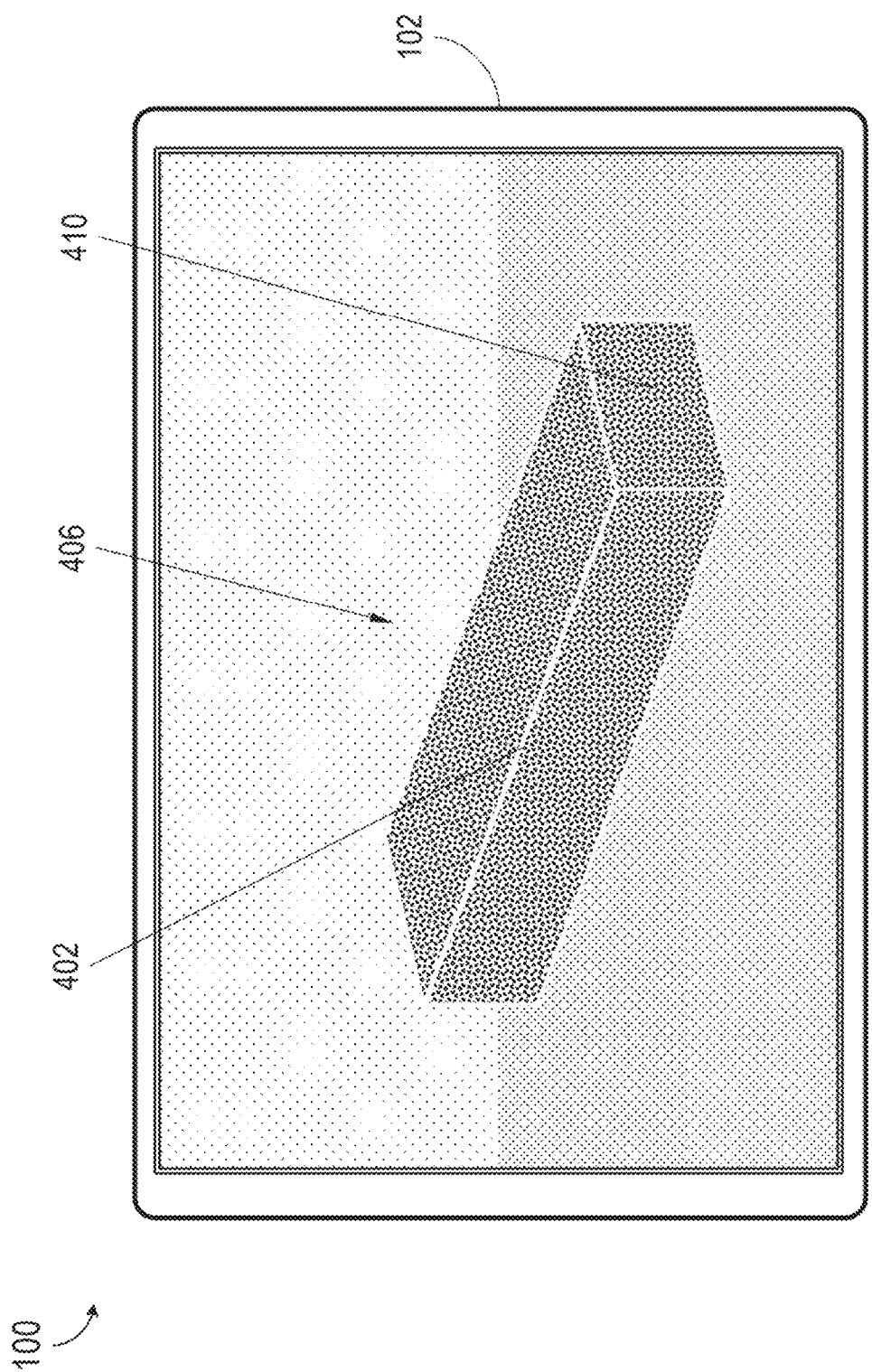

Referring to FIG. 4A, the system 100 may image the target object 106 at a first orientation to determine a first point cloud 404 (e.g., first frame dataset). As depicted in FIG. 4B, the system 100 may image the target object 106 at a second orientation to determine a second point cloud 406 (e.g., second frame dataset). The system 100 may further be configured for 3D reconstruction. Based on the first point cloud 404 and the second point cloud 406, the system 100 may construct a 3D reconstruction of the target object 106, e.g., matching the prominent plane 408 identified within the first point cloud 404 and the prominent plane 410 identified within the second point cloud 406 to a common prominent plane within the 3D reconstruction (e.g., 314, FIGS. 3A-F).

The system 100 may then store the 3D reconstruction in a frame dataset (e.g., for determining one or more dimensions of the target object 106).

Figure 5A:
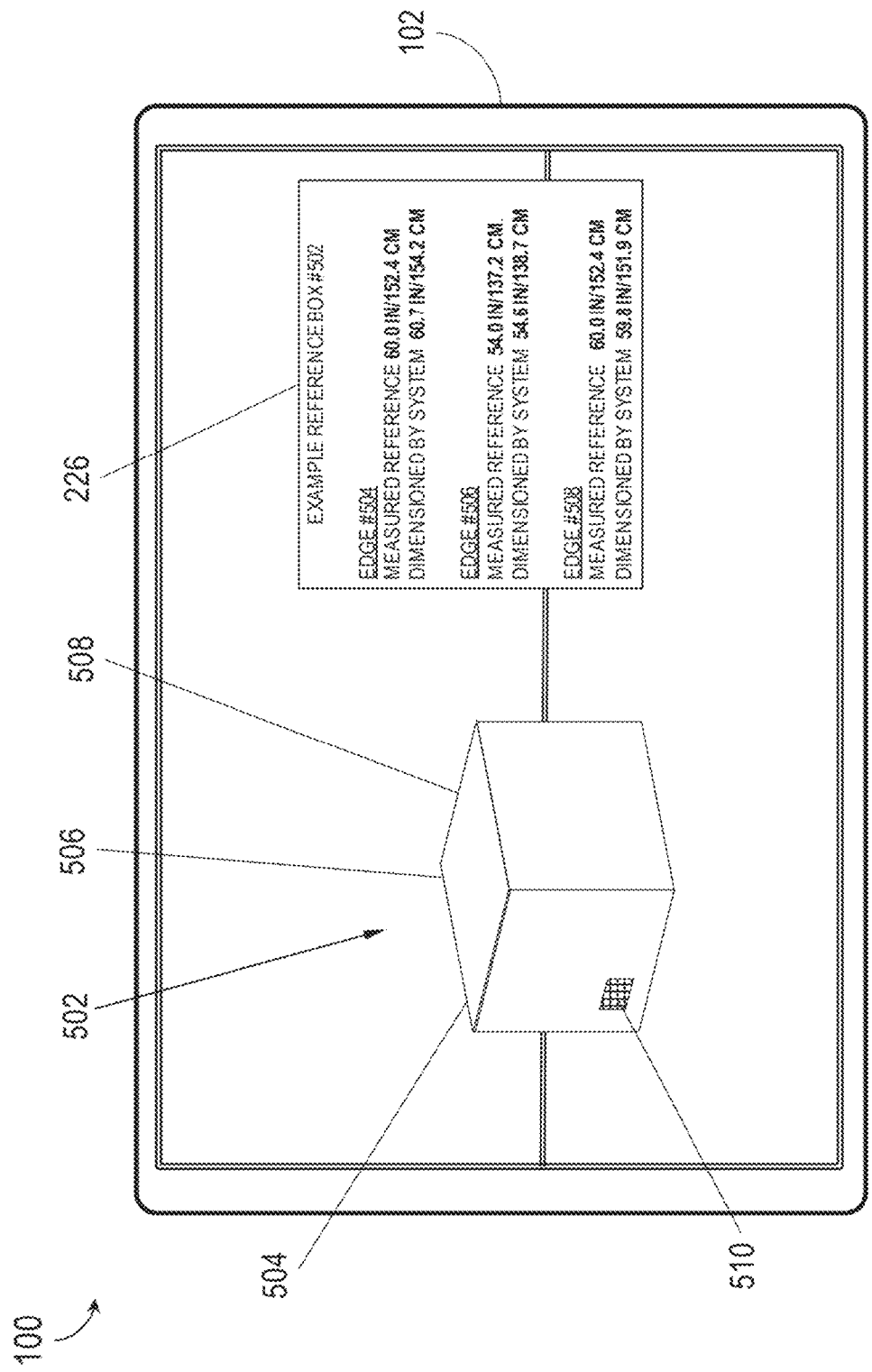

Referring to FIG. 5A, in embodiments the system 100 may be configured to dimension a target object 502 with edges 504, 506, and 508. For example, the system 100 may be configured to determine one or more dimensions of the target object 502 by plane segmentation and distance sampling (as discussed above). The determined dimensions may then be compiled in memory (226, FIG. 2) of the system 100. Similarly, one or more frames of image data captured by the 3D imager (e.g., an image stream) may be compiled with the determined dimensions in the memory 226. In this regard, the memory 226 may include captured images and dimensions determined based on the captured images.

In embodiments, the memory 226 may further include reference dimensions of the target object 502. Such reference dimensions may be the dimensions of the target object 502 which may be known or determined by a conventional measuring technique. For example, the system 100 may be tested according to machine learning techniques (e.g., via identifying reference objects and/or comparing test measurements to reference dimensions) to quickly and accurately (e.g., within 50 ms) dimension target objects (106, FIG. 1) according to National Type Evaluation Program (NTEP) accuracy standards.

In embodiments, the system 100 may then compare the determined dimensions and the reference dimensions to determine a difference between the determined dimensions and the reference dimensions. Such comparison may allow the system 100 to establish an accuracy of the determined dimensions. If the determined difference between the measured dimensions and the reference dimensions exceeds a threshold value, the system 100 may provide a notification to the user (104, FIG. 1). As may be understood, the threshold value can be any appropriate value (e.g., an absolute value, from 1 cm to 5 inches or more, or a relative value, e.g., ±2 percent of the total dimension of an edge 504-508). The threshold value may optionally be set by the user 104.

If the determined difference between the measured dimensions and the reference dimensions exceeds the threshold value, the user 104 may take appropriate action. When notified, the user 104 may be prompted to do any of the following: redo the dimension capture, enter notes explaining the difference in dimensions, notify an individual qualified to investigate the discrepancy, or the like. Additionally, the system 100 may also notify the user of a new TI-HI value to help determine how many of a particular target object 502 will fit on a pallet. This may support packaging processes in a warehouse by determining a better slot in a warehouse for the storing of the particular target object 502. This may also help recalculate the best shipping method (e.g., parcel or freight) for the particular target object 502.

As may be understood, the target object 502 may include an identifier, such as a Quick-Response (QR) code 510 or other identifying information encoded in 2D or 3D format. The system may be configured to scan the QR code 510 of the target object 502 and thereby identify the target object 502 as a reference object. Furthermore, the QR code 504 may optionally include reference data particular to the target object 502, such as the reference dimensions. Although the target object 502 is depicted as including a QR code 504, this is not intended to limit the encoded information identifying the target object 502 as a reference object. In this regard, the user 104 may measure the reference dimensions of the target object 502. The user 104 may then input the reference dimensions to the system 100, saving the target object 502 as a reference object or augmenting any information corresponding to the reference object already stored to memory 226.

In embodiments, referring also to FIG. 5B, the system 100 may compare a compilation 512 of data determined by the system 100 to reference data (e.g., stored to the memory 226, FIG. 2) in order to make additional determinations with respect to the target object 502. For example, the compilation 512 may include determined dimensions 514 and frame of image data associated with the target object 502 after the dimensions of the target object 502 which have been determined to a sufficient level of accuracy or confidence.

In embodiments, the system 100 may compare the determined dimensions 514 of the target object 502 to the dimensions of reference shipping boxes (516) or predetermined reference templates (518) corresponding to shipping boxes or other known objects having known dimensions (e.g., stored to memory 226 or accessible via cloud-based storage (220, FIG. 2) or remote databases stored on physical servers (218, FIG. 2)). For example, the system 100 may display for the user's selection (e.g., via a searchable menu 520) reference templates 518 corresponding to storage containers, storage bins, or storage locations and sublocations within racking, shelving or organizing systems of various sizes. In embodiments, the user may compare the determined dimensions 514 of the target object 502 to a predetermined template 518, e.g., to determine, whether the target object 502 corresponds to a reference template 518 (e.g., within an adjustable margin), whether the target object 502 will fit inside a larger object or within a given shipping space, to audit and/or certify a dimension measurement (e.g., to NTEP standards), or to calibrate or verify the accuracy of the system 100. For example, the user may manually enter reference dimensions to which the measured dimensions 514 of the target object 502 may be compared (e.g., if the orientations of a template 518 do not precisely match a target object 502 to which the template dimensions may otherwise correspond). If insufficient information about the target object 502 is known (e.g., guidelines for storage, transport, or perishability), the system 100 may infer this information from what is known about similarly sized shipping boxes 516 or their contents. Similarly, the user may fill in the dimensions 514 of the target object 502 based on a corresponding template 518 that approximates or matches the dimensions of the target object 502. The user may create a new template by measuring a target object 502 and adding its dimensions 514 as a new known reference object. For example, the user 104 may create a template called "SMALL BOX" having predefined dimensions (e.g., 8.00 in×11.50 in×6.75 in), measuring a target object 502 corresponding to these dimensions via the system 100 to calibrate the system and "learn" the new template for future reference (or, e.g., determine if further training of the system is necessary).

In embodiments, the system 100 may employ machine learning techniques to determine dimensions 514 of a new known reference template. For example, the system 100 may determine dimensions 514 of a new known reference template by averaging dimensions of target objects 502 having the same shop keeping unit (SKU). Further, the system 100 may determine dimensions 514 of a new known reference template by using the last measured dimensions 514 by the system 100.

In embodiments, the system 100 may include a server for collecting information on the target object 502 being scanned by the system 100. The server may collect information on the target object 502 including: 3D/2D dimensions, a weight, the identified shop keeping unit (SKU), captured images that are associated with a same SKU, and a QR code. The collected information may be uploaded from the server to a larger database (e.g., eCommerce listings or product databases) for further use.

Referring generally to FIGS. 6A-6C, the system 100 may be configured to segment one or more background planes within the point cloud 300, e.g., a floor 108, flat surface, or wall 302. For example, it may not be possible to accurately identify or segment the three prominent planes (312, 314, 316; FIGS. 3A-F) and thus a plane segmentation may be augmented by inferring a prominent plane from the floor 108, flat surface, or wall 302.

In embodiments, referring in particular to FIG. 6A, a plane of the floor 108 (e.g., a floor plane) is to be segmented. For example, the 3D image sensors 204 may ray cast (304) directly ahead of the image sensors to identify a corner point 602. The corner point 602 may be disposed between the floor 108, the left-side prominent plane 314, and the right-side prominent plane 316. The corner point 602 may be determined by any suitable method, such as, but not limited to, the ray cast 304 based on a depth value of the corner point 602. For example, the left-side prominent plane 314 and the right-side prominent plane 316 may have depth values which converge on the corner point 602.

In embodiments, referring also to FIG. 6B, the system 100 may perform a radius search to determine a point segmentation 604 of neighboring points within a predetermined radius 606 from the corner point 602, in accordance with one or more embodiments of the present disclosure.

In embodiments, referring also to FIG. 6C, the system 100 may determine planes associated with the point segmentation 604, such as a floor plane 608, a left-side plane 610, and a right-side plane 612. The system 100 may further determine the edge 326 disposed between the left-side plane 610 and the right-side plane 612, an edge 614 disposed between the left-side plane 610 and the floor plane 608, and an edge 616 disposed between the right-side plane 612 and the floor plane 608, by an intersection of the planes 608, 610, 612. The system 100 may further perform an additional segmentation to refine the corner point 602 and iteratively determine the edges 326, 614, 616 as described above (see, e.g., FIGS. 3C/D and accompanying text). In embodiments, the ability to segment edges 614, 616 from the floor 108 may aid in addressing artifacts associated with a high reflectivity of the floor 108 or flat surface, e.g., especially near the edges 614, 616. For example, reflective artifacts may create a curl in the depth data reducing an accuracy of points in the point cloud (300, FIGS. 3C/D) near the edges 614, 616. Accordingly, the system 100 may compensate for curl artifacts by determining the edges 604, 606.

Referring generally to FIG. 7A-D, the system 100 may be configured to segment the floor 108 or the wall 302 when only two planes of the target object (106, FIG. 1) are visible to the 3D image sensors (204, FIG. 2). This may be beneficial where imaging three planes of a target object 700 via the 3D image sensors 204 is difficult (e.g., for an upright refrigerator or other tall object not compatible with the ideal orientation of mobile device (102, FIG. 1) to target object 106 shown by FIG. 1).

Figure 7A:
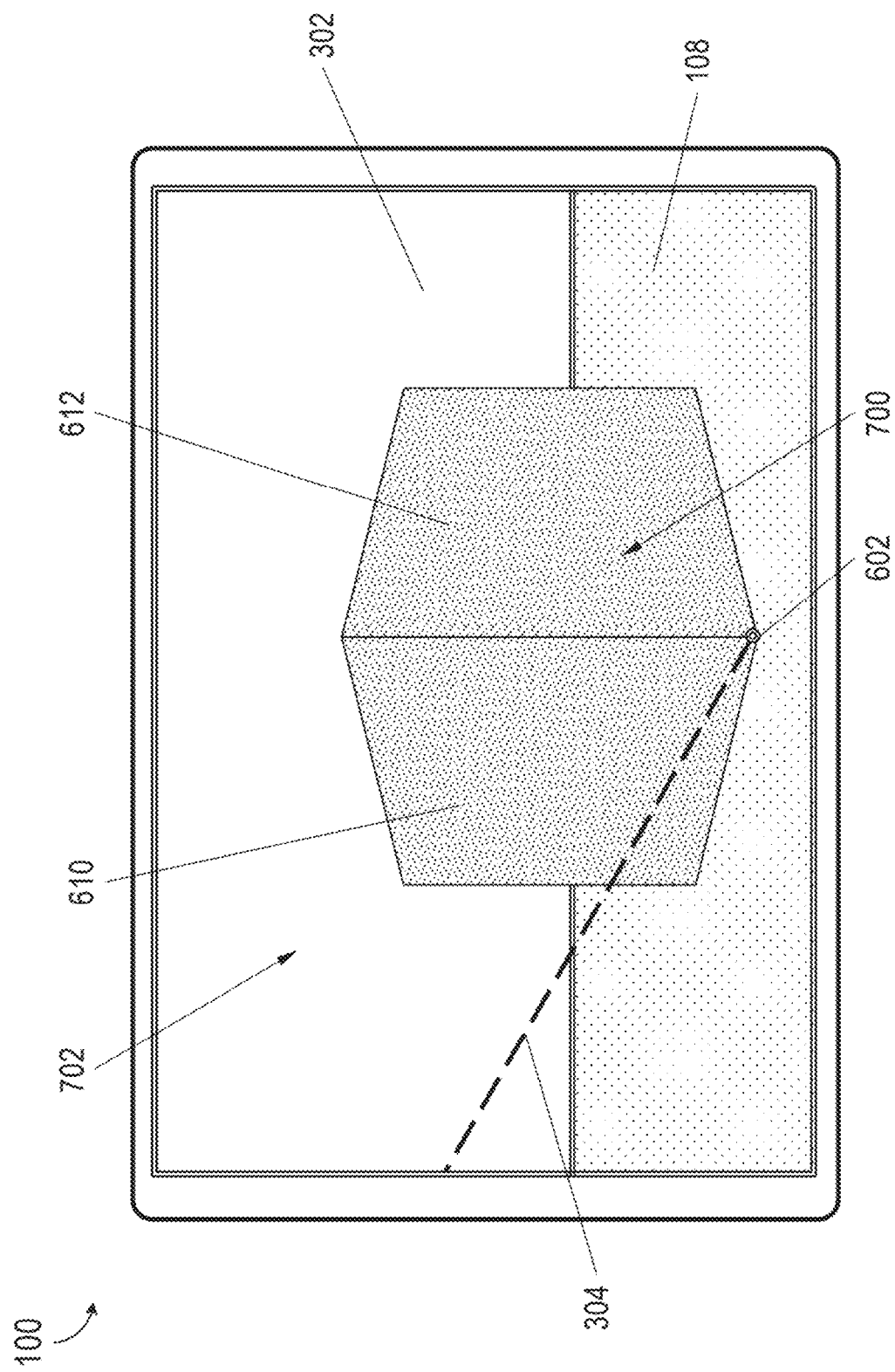

In embodiments, referring in particular to FIG. 7A, the system may obtain a point cloud 702 of the target object 700 when only the left-side plane 610 and the right-side plane 612 of the target object 106 are visible. For example, the 3D image sensors 204 may ray cast 304 directly ahead of the image sensors to identify a corner point 602, as discussed above in one or more embodiments.

In embodiments, referring also to FIG. 7B, the system 100 may perform radius searching based on a radius 703 from the corner point 602 to determine a point segmentation 604 as discussed above in one or more embodiments.

Figure 7C:
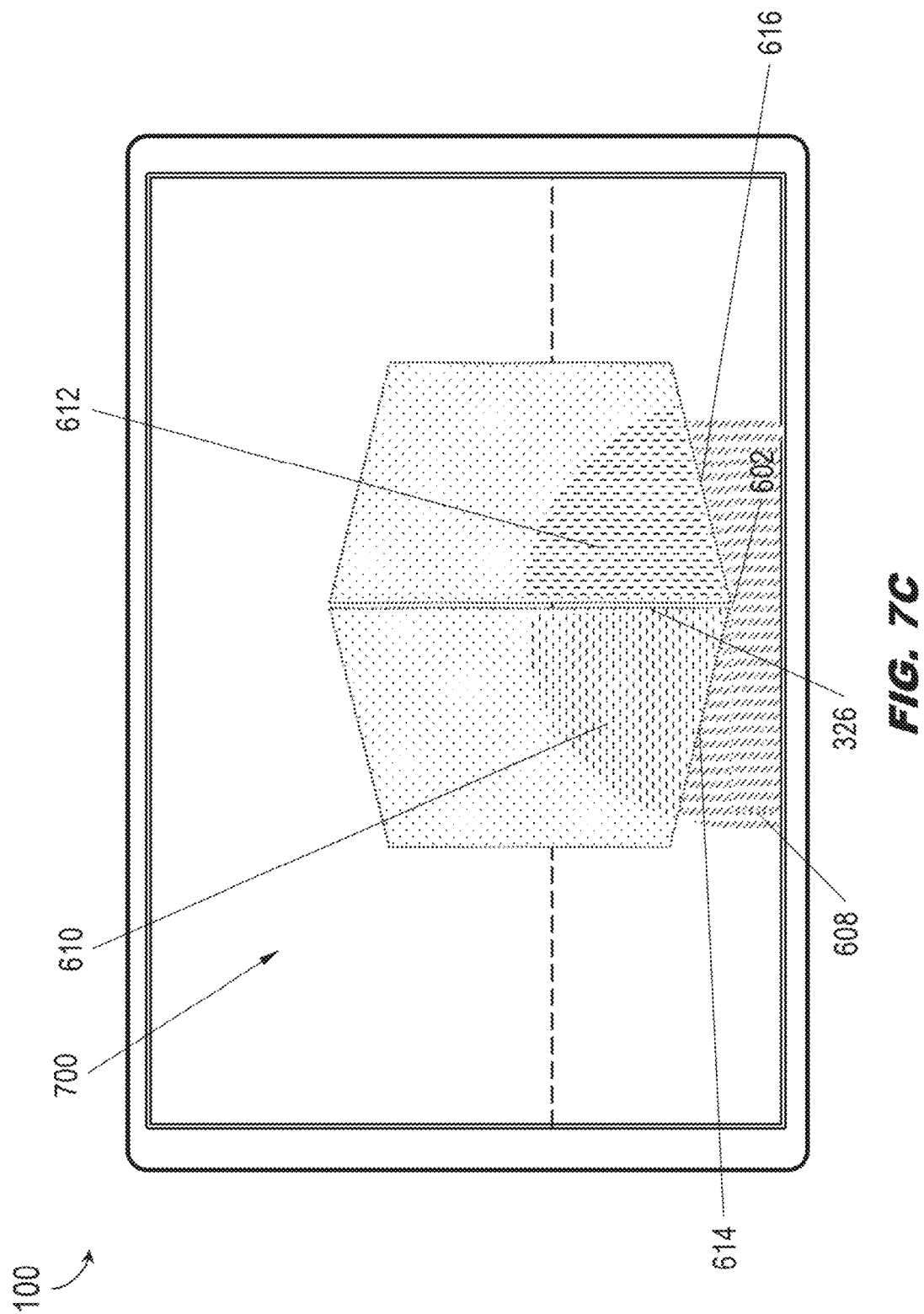

In embodiments, referring also to FIG. 7C, the system 100 may determine one or more segmented planes e.g., a floor plane 608, the left-side plane 610, and a right-side plane 612. The system 100 may further determine the edge 326 disposed between the left-side plane 610 and the right-side plane 612, the edge 614 disposed between the left-side plane 610 and the floor plane 608, and the edge 616 disposed between the right-side plane 612 and the floor plane 608, by an intersection of the planes 608, 610, 612.

Figure 7E:
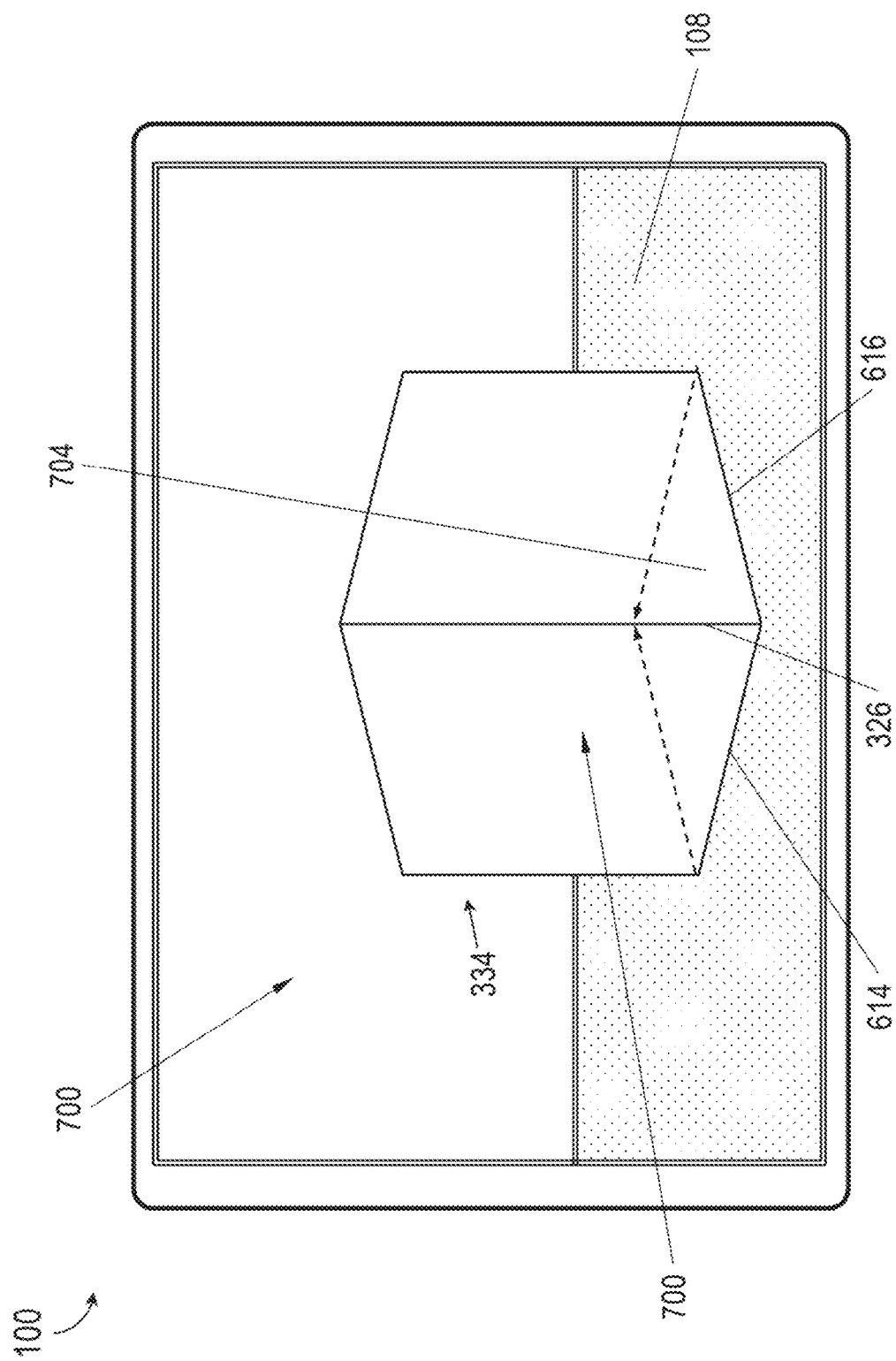

In embodiments, referring also to FIGS. 7D and 7E, a plurality of distances 334 associated with the edges 326, 614, and 616 may be determined, in accordance with one or more embodiments. Based on these distances 334, dimensions for edges 326, 614, and 616 may be determined (e.g., via a median value). Further, by dimensioning the edges 614 and 616, the system 100 may accurately dimension the top plane or surface (see, e.g., 312, FIGS. 3A-F) of the target object 700 (and substantially parallel both to the floor 108 and to a bottom surface 704 adjacent to the floor) although the top plane or surface may not be visible to the 3D image sensors 204.

Figure 8:
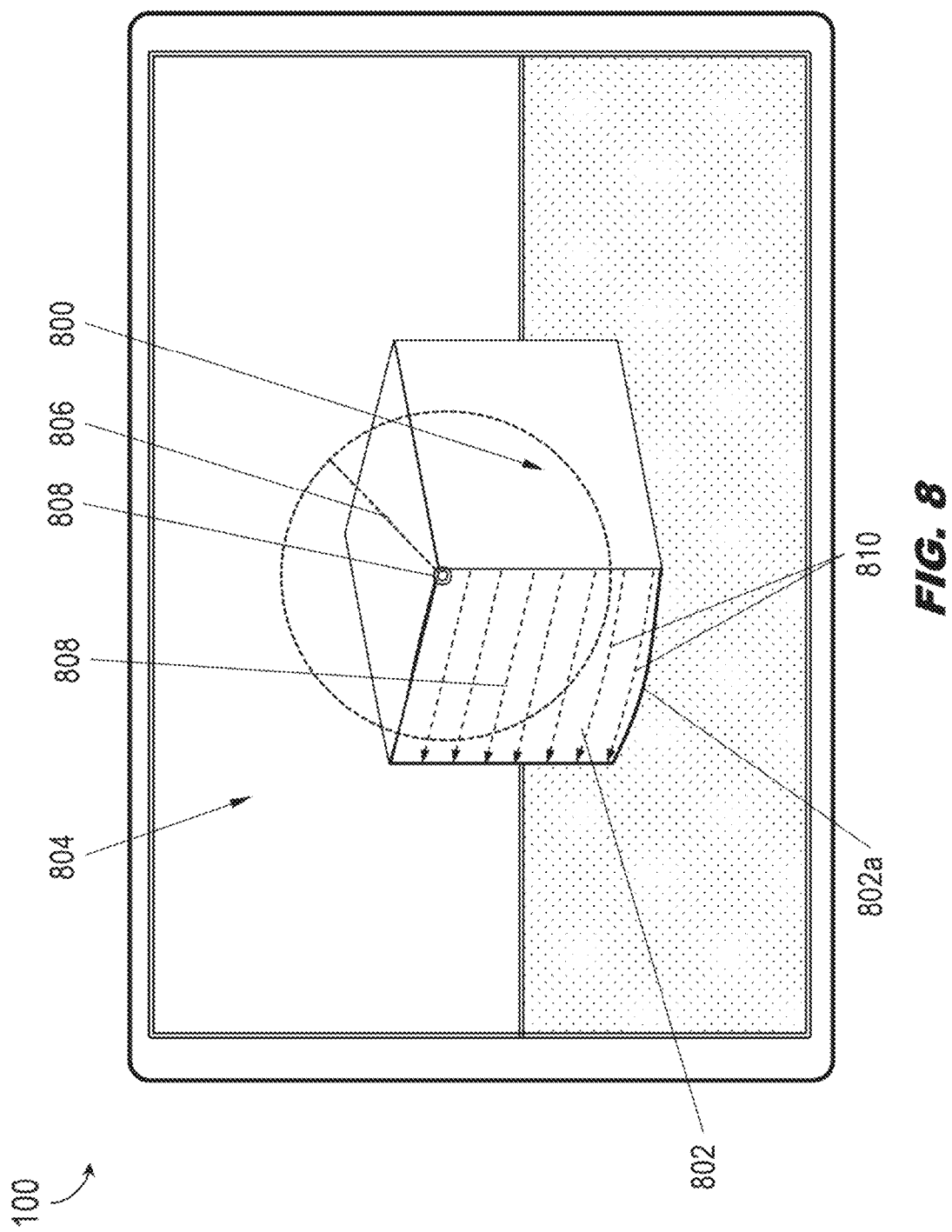
FIG. 8 is a diagrammatic illustration of the mobile device of the volume dimensioning system of FIG. 1.

Referring to FIG. 8, the system 100 may be configured to dimension a target object 800 with an anomalous plane 802 (e.g., and/or anomalous edge 802a). For example, the system 100 may generate a point cloud 804 and perform a radius search and a plane segmentation (604, FIGS. 6A-C) of the target object 800, as discussed previously. The plane segmentation 604 may attempt to determine three prominent planes (312, 314, 316; FIGS. 3A-G) typical to a cuboid object. The system 100 may further include a check to determine whether the plane segmentations determined are sufficiently in accordance with a target object having a substantially cuboid shape. In this regard, depth values associated with the points of the point cloud in the plane segmentation are expected to decrease, e.g., as a radius 806 increases from an origin point 808 corresponding to an intersection of prominent planes 312-316. However, a target object 800 with an anomalous plane 802 may have depth values which do not follow this trend (e.g., due to a bulge (anomalous edge 802a) in a wall of a box). Upon determining the presence of the anomalous plane 802, the system 100 may adjust a sampling of edge distances 334 based on the anomalous plane 802 (e.g., to identify and eliminate outlying or inconsistent edge distances 810).

Figure 9A:
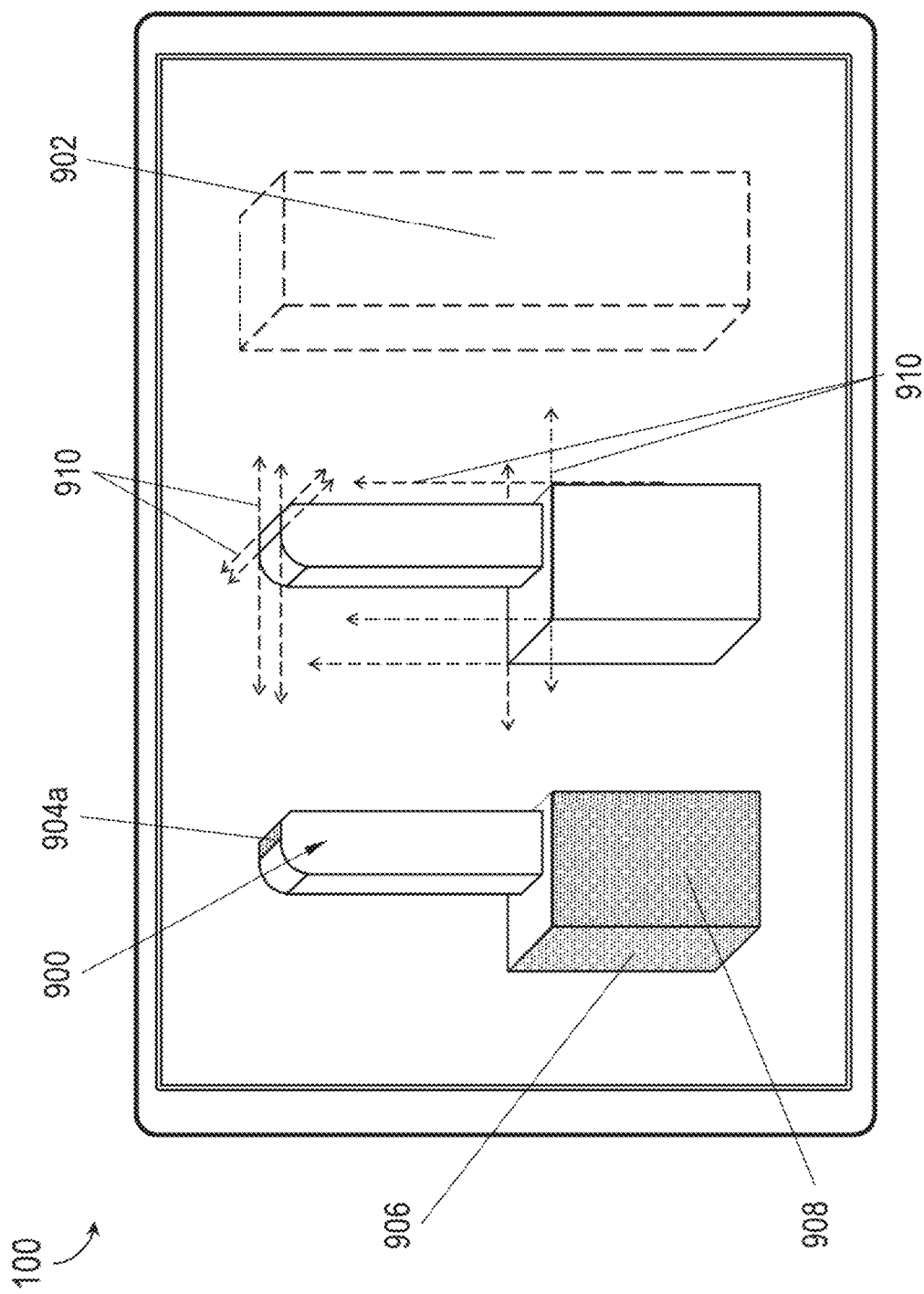
FIGS. 9A through 9C are diagrammatic illustrations of the mobile device of the volume dimensioning system of FIG. 1.
Figure 9B:
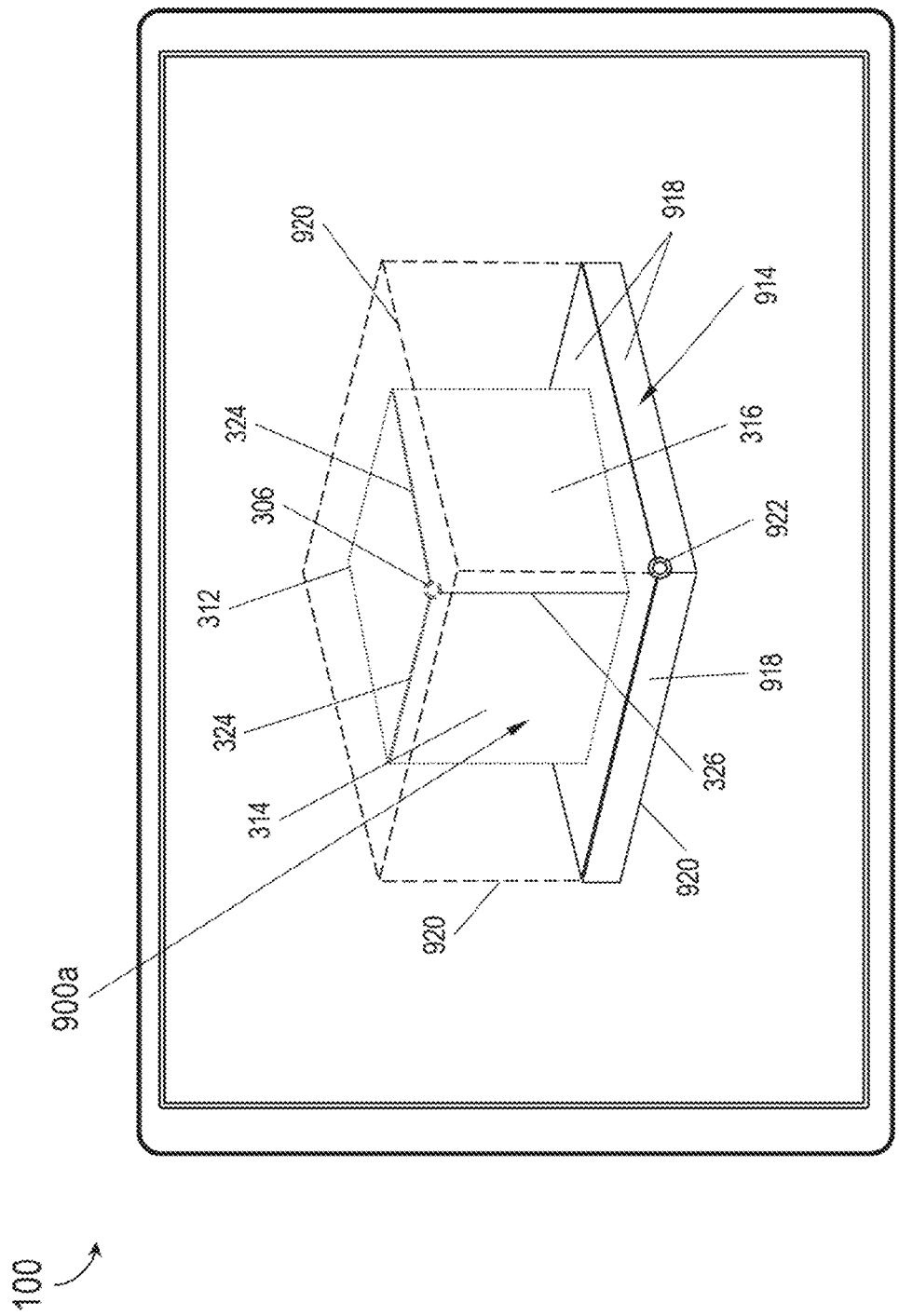
Figure 9C:
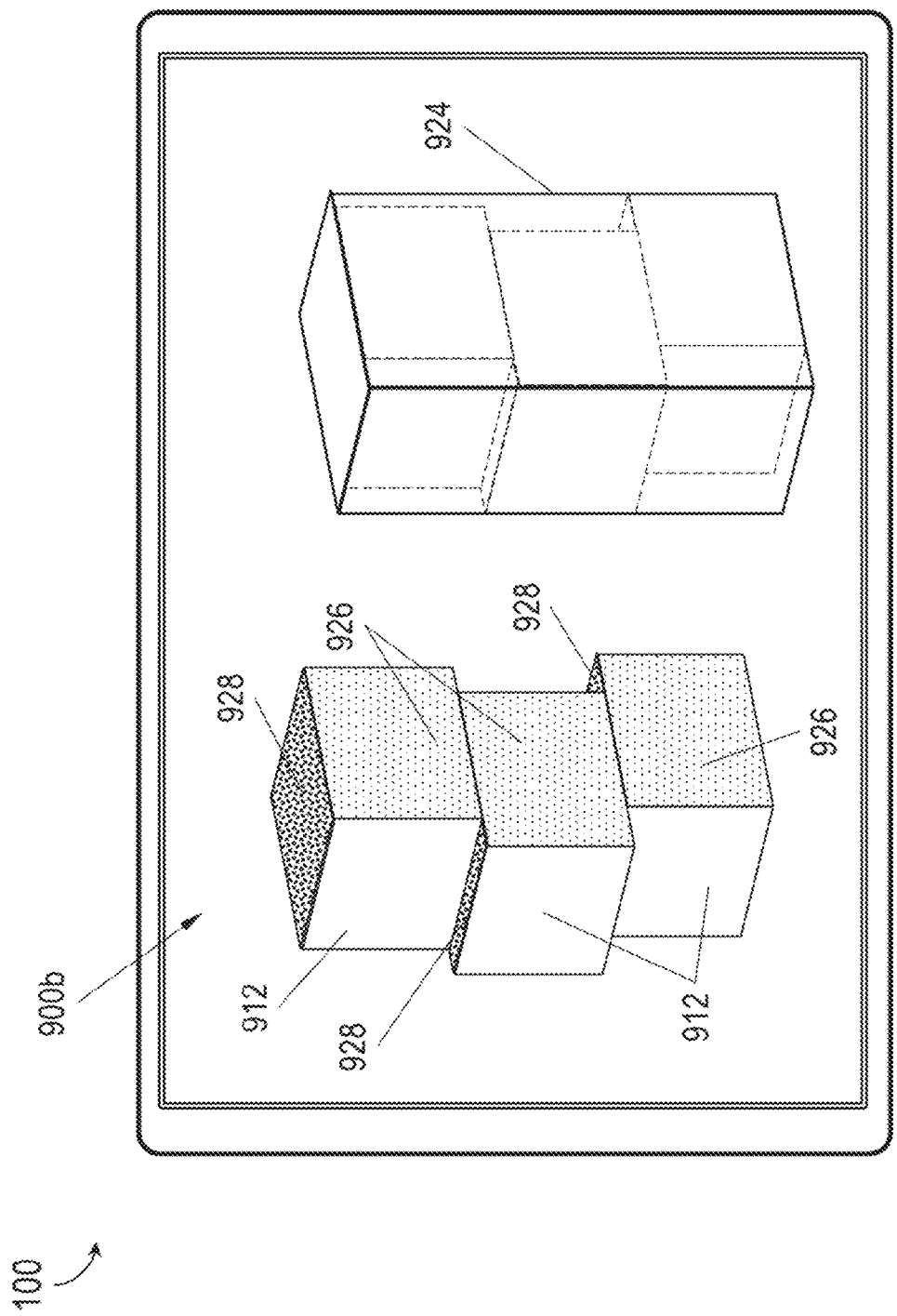

Referring generally to FIG. 9A through 9C, the system 100 may be configured to dimension a nonstandard target object 900, e.g., target objects having a substantially non-cuboid shape, collections of objects stacked upon either other, or objects positioned upon a pallet or like shipping structure. For example, the system 100 may be trained according to machine learning techniques, and based on example templates, to identify and dimension particular types of nonstandard target objects (e.g., or groups thereof, as described below). In some embodiments, a neural network may be trained to detect and/or measure points of the target object.

In embodiments, referring in particular to FIG. 9A, the target object 900 may have a substantially non-cuboid shape, e.g., a shipping container for a chainsaw or similar object in a non-cuboid container. For example, the target object 900 may present inconsistent planes and edges through several iterations of ray casting, radius searching, and plane segmentation (see, e.g., FIGS. 3A-G and accompanying text above). In embodiments, the system 100 may fit the target object 900 into a bounding box 902 by segmenting extreme planes 904, 906, 908 (e.g., based on extreme depth values and/or distance information) and extending the edges 910 of the extreme planes. For example, the system 100 may determine (e.g., which determination may include additional user input or may be taught to the system according to machine learning techniques and common nonstandard objects) that the bounding box 902 is the minimum bounding box, e.g., the smallest possible bounding box capable of completely enclosing the target object 900.

Referring now to FIGS. 9B and 9C, the nonstandard target objects 900a-b may be implemented similarly to the nonstandard target object 900 of FIG. 9A, except that the nonstandard target object 900a may be positioned on/attached to a pallet 914 or other similar shipping structure or foundation, and the nonstandard target object 900b may consist of two or more stacked sub-objects 912.

In embodiments, referring in particular to FIG. 9B, the system 100 may account for any pallets 914 or other shipping structures/foundations 820 to which the nonstandard target object 900a is attached, determining the minimum possible dimensions 916 (e.g., a minimum bounding box) of the palleted nonstandard target object 900a (e.g., based on the minimum possible amount of shelf space the nonstandard target object 900a attached to the pallet 914 would occupy in a vehicle, in a warehouse, or elsewhere in the supply chain) in addition to the dimensions of the nonstandard target object 900a without the pallet 914. For example, the system 100 may account for the pallet 914 by distinguishing segments consistent with the pallet (e.g., plane segments 918, edges 920) from plane segments, most prominent planes 312, 314, 316 and/or edges 322, 324, 326 consistent with the target object 900a (e.g., unpalleted box) itself. Accordingly, the system 100 may determine a corner point 306 associated with the target object 900a proper, and a corner point 922 associated with the pallet 914. Such plane and edge segmentation operations may be assisted by input from the user (104, FIG. 1); e.g., the system 100 may prompt the user that a palleted target object 900a has been identified and request the user affirm that this is the case, whereby the system 100 may proceed with pallet-focused radius searching and plane segmentation operations.

Referring now to FIG. 9C, the nonstandard target object 900b and the nonstandard target object 900b may consist of two or more stacked identical sub-objects 912. In embodiments, the system 100 may generate a minimum bounding box 924 enclosing the stacked sub-objects 912 according to one or more dimensioning operations as disclosed above. In some embodiments, the system 100 may further analyze the point cloud including the nonstandard target object 900b to distinguish common or shared prominent planes (926) from inconsistent prominent planes (928). For example, the system 100 may prompt the user 104 to affirm that the target object 900b is a stack of sub-objects 912, and may further prompt the user to identify boundaries 930 between the sub-objects, such that an accurate dimension of each individual sub-object may be measured.

Figure 10A:
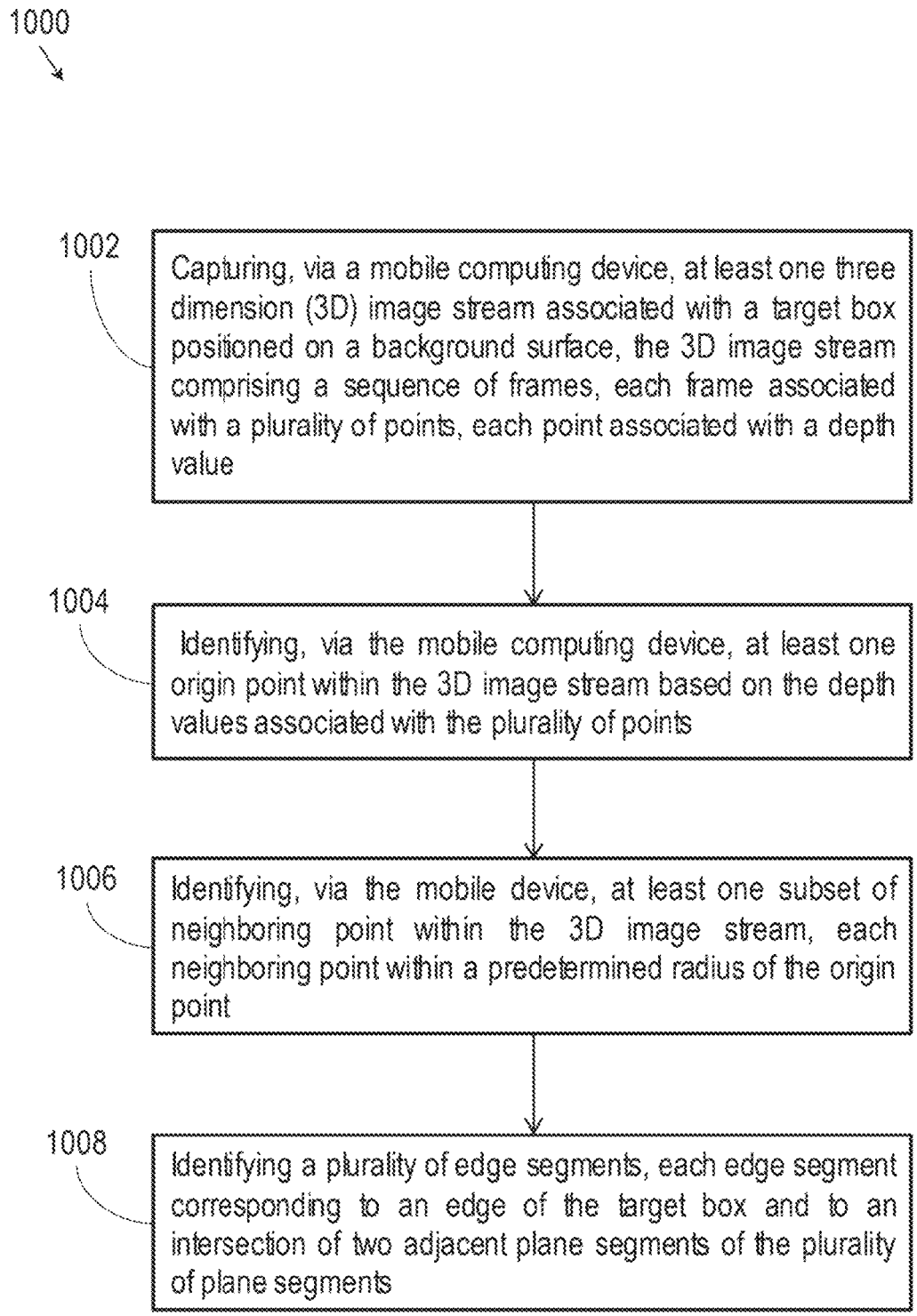

Referring to FIG. 10, a method 1000 for dimensioning an object may be implemented by embodiments of the system 100.

At a step 1002, a three-dimensional (3D) image stream of a target box positioned on a background surface may be obtained. The 3D image stream may be captured via a mobile computing device. The 3D image stream may include a sequence of frames. Each frame in the sequence of frame may include a plurality of points (e.g., a point cloud). Each point in the plurality of points may have an associated depth value.

At a step 1004, at least one origin point within the 3D image stream may be determined. The origin point may be identified via the mobile computing device. The origin point may be determined based on the depth values associated with the plurality of points. In this regard, the origin point may have a depth value indicating, of all the points, the origin point is closest to the mobile computing device.

At a step 1006, at least three plane segments of the target object may be iteratively determined. The at least three plane segments may be determined via the mobile computing device. Furthermore, step 1006 may include iteratively performing steps 1008 through 1014, discussed below.

At a step 1008, a point segmentation may be acquired. The point segmentation may include at least one subset of points within a radius of the origin point. The subset of points may be identified via the mobile computing device. The radius may also be predetermined.

At a step 1010, a plurality of plane segments may be identified. For example, two or three plane segments may be acquired. The plurality of plane segments may be identified by sampling the subset of neighboring points via the mobile computing device. Each of the plurality of plane segments may be associated with a surface of the target box. In some embodiments, three plane segments are determined, although this is not intended to be limiting.

At a step 1012, a plurality of edge segments may be identified. The plurality of edge segments may be identified via the mobile computing device. The edge segments may correspond to an edge of the target box. Similarly, the edge segments may correspond to an intersection of two adjacent plane segments of the plurality of plane segments. In some embodiments, three edge segments are determined, although this is not intended to be limiting.

At a step 1014, an updated origin point of may be determined. The updated origin point may be based on an intersection of the edge segments or an intersection of the plane segments. Steps 1008 through 1014 may then be iterated until a criterion is met. In some instances, the criterion is a number of iterations (e.g., 2 iterations).

At a step 1016, the edge segments may be measured from the origin point along the edge segments to determine a second subset of points. Each point in the second subset of points may include a depth value indicative of the target object. In this regard, the edge segments may be measured to determine an estimated dimension of the target object. However, further accuracy may be required.

At a step 1018, one or more edge distances are determined by traversing each of the at least three edge segments over at least one interval. The interval may be based in part by the measured edge segments from step 1016. Furthermore, the edge distances may be determined by sampling one or more distances across the point cloud, where each sampled distance is substantially parallel to the edge segment.

At a step 1020, one or more dimensions corresponding to an edge of the target box may be determined based on the one or more edge distances. The determination may be performed via the mobile computing device. The determination may be based on a median value of the one or more edge distances.

Referring generally to FIGS. 1A-10B, the system 100 is described herein. In some embodiments, the system 100 may account for imperfect data sets, e.g., gaps or holes in the point cloud, via plane identification. For example, the system may analyze 3D spatial information to infer the planes of the target object 106, e.g., on the basis of a sufficient number of identified points aligned in a plane or nearly enough aligned (e.g., within a predetermined range) to derive the existence of a plane. By utilizing plane identification based solely on 3D spatial information collected by the 3D image sensors 204, the system 100 may identify the target object 106 and its component planes quickly enough, or to a sufficient level of confidence, to meet user 104 needs. In this regard, system 100 must be faster than manually measuring the target object 106.

In embodiments, the system 100 may be trained via machine learning to recognize and lock onto a target object 106, positively identifying the target object and distinguishing the target object from its surrounding environment (e.g., the field of view of the 2D image sensors 202 and 3D image sensors 204 including the target object as well as other candidate objects, which may additionally be locked onto as target objects and dimensioned). For example, the system 100 may include a recognition engine trained on positive and negative images of a particular object specific to a desired use case. As the recognition engine has access to location and timing data corresponding to each image or image stream (e.g., determined by a clock 212/GPS receiver 214 or similar position sensors of the embodying mobile device 102 or collected from image metadata), the recognition engine may be trained to specific latitudes, longitudes, and locations, such that the performance of the recognition engine may be driven in part by the current location of the mobile device 102a, the current time of day, the current time of year, or some combination thereof.

A holographic model may be generated based on edge distances determined by the system. Once the holographic model is generated by the system 100, the user 104 may manipulate the holographic model as displayed by a display surface of the device 102. For example, by sliding his/her finger across the touch-sensitive display surface, the user 104 may move the holographic model relative to the display surface (e.g., and relative to the 3D image data 128 and target object 106) or rotate the holographic model. Similarly, candidate parameters of the holographic model (e.g., corner point 306; edges 322, 324, 326; planes 312, 314, 316; etc.) may be shifted, resized, or corrected as shown below. In embodiments, the holographic model may be manipulated based on aural control input submitted by the user 104. For example, the system 100 may respond to verbal commands from the user 104 (e.g., to shift or rotate the holographic model, etc.)

In embodiments, the system 100 may adjust the measuring process (e.g., based on control input from the operator) for increased accuracy or speed. For example, the measurement of a given dimension may be based on multiple readings or pollings of the holographic model (e.g., by generating multiple holographic models per second on a frame-by-frame basis and selecting "good" measurements to generate a result set (e.g., 10 measurement sets) for averaging). Alternatively or additionally, a plurality of measurements over multiple frames of edges 322, 324, 326 may be averaged to determine a given dimension. Similarly, if edges measure within a predetermined threshold (e.g., 5 mm), the measurement may be counted as a "good" reading for purposes of inclusion within a result set. In some embodiments, the confirmation tolerance may be increased by requiring edges 322, 324, 326 to be within the threshold variance for inclusion in the result set.

In some embodiments, the system 100 may proceed at a reduced confidence level if measurements cannot be established at full confidence. For example, the exterior surface of the target object 106 may be matte-finished, light-absorbing, or otherwise treated in such a way that the system may have difficulty accurately determining or measuring surfaces, edges, and vertices. Under reduced-confidence conditions, the system 100 may, for example, reduce the number of minimum confirmations required for an acceptable measure (e.g., from 3 to 2) or analyze additional frames per second (e.g., sacrificing operational speed for enhanced accuracy). The confidence condition level may be displayed to the user 104 and stored in the dataset corresponding to the target object 106.

The system 100 may monitor the onboard IMU (216, FIG. 2) of the mobile device 102 (e.g., or inertial/orientation sensors integrated into the 3D image sensors (204, FIG. 2) to detect difficulty in the identification of candidate surfaces, candidate edges, and candidate vertices corresponding to the target object 106. For example, the IMU 216 may detect excessive shifts in the orientation of the mobile device 102 as the user 104 moves the mobile device around and the system 100 attempts to lock into the parameters of the target object. Similarly, the IMU 216 may notice rotational movement by the user 104 around the target object 106 and take this movement into account in the generation of the 3D holographic model.

The three-dimensional methods described previously herein utilize a point cloud with 3D depth data on a frame-by-frame basis from a stream of frames. The point cloud is generated with each frame. As the number of frames-per-second increases, the amount of data processed in the three-dimensional methods increases. The processing time of the three-dimensional methods may be hindered by the size of the 3D depth data. For example, current generation processors may use the three-dimensional methods to determine the lengths of the edges on the order of several seconds.

Embodiments of the present disclosure are also directed to a two-dimensional method. The two-dimensional method utilizes a depth map (e.g., depth matrix) on a frame-by-frame basis. The depth map is generated with each frame. The depth map includes significantly less data than the point cloud utilized in the three-dimensional method. The depth map is a two-dimensional (e.g., xy) pixel by pixel matrix with a depth value associated with each pixel. In this regard, the two-dimensional method may process significantly less data and may perform the calculations with an order of magnitude twice as fast or more as the three-dimensional methods. For example, current generation processors may use the two-dimensional method to determine the lengths of the edges in less than a second.

Figure 11:
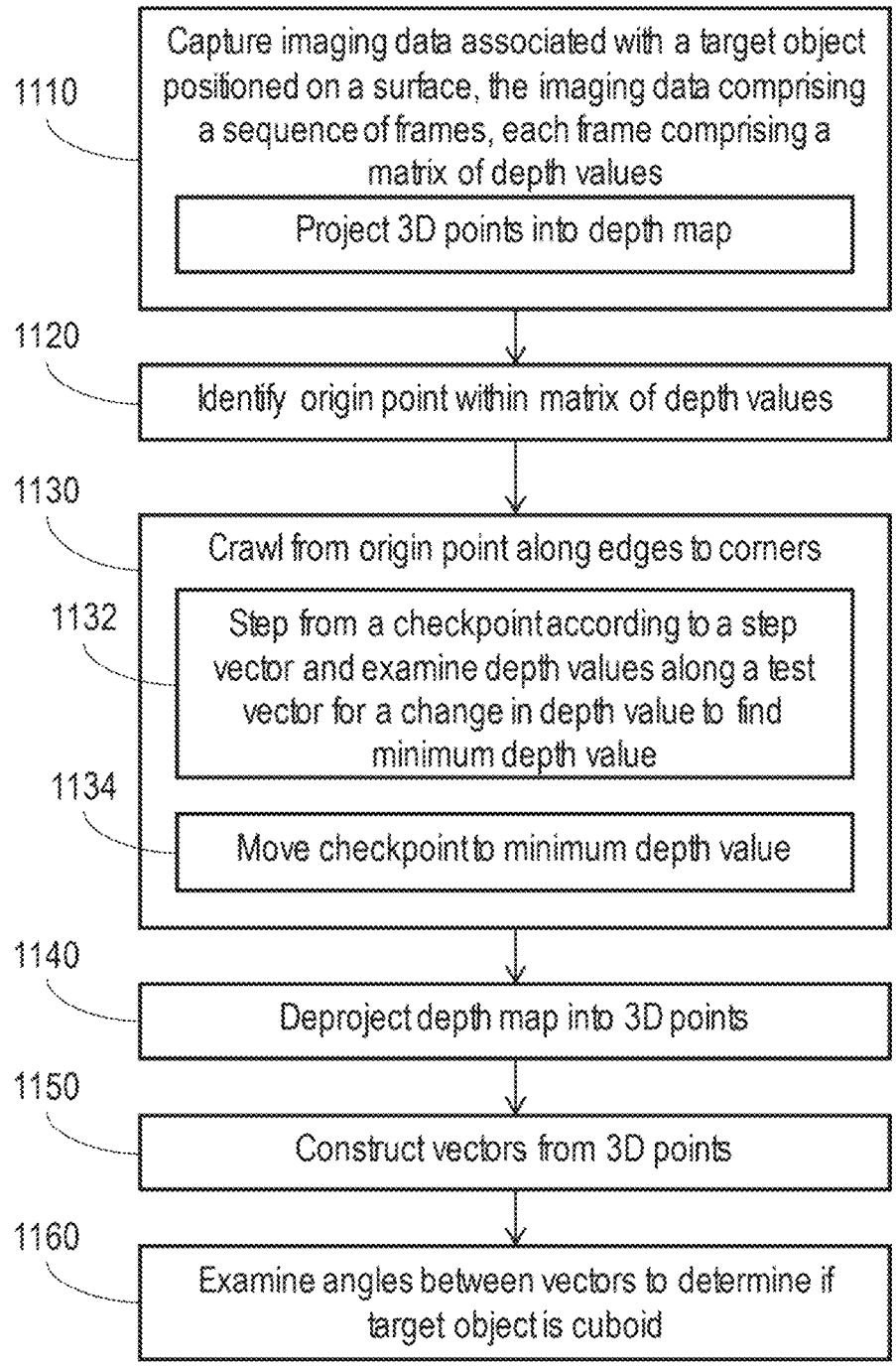
FIG. 11 is a flow illustrating a method for volume dimensioning, in accordance with one or more embodiments of the present disclosure.

Referring now to FIG. 11, a flow diagram of a method 1100 is described, in accordance with one or more embodiments of the present disclosure. The method 1100 may refer to a method of box key-point recognition and measurement. The applicant has dubbed the method 1100 as CORNR 2D, although this is not intended to be limiting. The embodiments and enabling technology described previously herein in the context of the system 100 and the mobile device 102 should be interpreted to extend to the method 1100. For example, the method 1100 may be implemented by the system 100 and/or the mobile device 102. It is further recognized that the method 1100 is not limited by the system 100 and/or the mobile device 102. The method 1100 may be further understood with reference to the exemplary illustrations in FIGS. 12A-12D.

In a step 1110, imaging data is captured by an imaging sensor. For example, the image sensor may be the 2D image sensors 202 and/or the 3D image sensors 204, which may be different capture systems within the same 2D/3D camera device integrated or attached to the mobile device 102. The imaging data is associated with a target object positioned on a surface. For example, the target object may be the target object 106. The imaging data includes a sequence of frames, e.g., a video stream incorporating one frame after another. Each frame includes a depth map. Every frame includes a new depth map 1202. The depth map 1202 is a projection of real 3D space. The depth map 1202 is a matrix with x-coordinates, y-coordinates, and depth values associated with coordinate pairs of the x-coordinates and y-coordinates. In some instances, the depth map may be illustrated to indicate the depth values (e.g., using different or gradient colors to represent different depth values), although this is not depicted in the present application. Each pixel in the frame may be defined by its x and y-coordinates and may include the depth value. The depth values indicate the distance of the pixel to the image sensor. For example, the distance may be the distance between the image sensor and one of the target object or the surface on which the target object is positioned.

In some embodiments, the image sensor captures 3D image data. The image sensor then projects the 3D image data to generate the depth map. The 3D image data includes three-dimensional points 1201 (FIG. 12F). The three-dimensional points 1201 include point coordinates [x', y', z']. The point coordinates [x', y', z'] are provided relative to the image sensor used to generate the frame. In this regard, the point coordinate [0, 0, 0] is disposed at the image sensor. The depth map 1202 (FIGS. 12D-E) includes two-dimensional pixel coordinates [x, y] and a depth channel. The pixel coordinate [x, y] indicate the row and column of the pixel. In this regard, the pixel coordinate [0, 0] is a pixel in a first row and first column of the frame. The three-dimensional points 1201 are projected into 2D pixel location each with an associated depth value.

In a step 1120, an origin point 1204 (FIGS. 12B-D) within the matrix of depth values is identified. The origin point 1204 may also be referred to as a primary point. Similarly, the step 1120 may also be referred to as primary corner estimation. The origin point 1204 may be associated with a corner of the target object. For example, the origin point 1204 may be associated with the top corner 122 of the target object 106. The depth values may be examined for a local minimum to identify the origin point 1204. The local minimum represents the closest pixel in the imaging data (e.g., shortest distance to the image sensor), which may or may not exclude the ground plane surface. Assuming the target object is positioned with the top corner facing the image sensor, the local minimum will be the approximately the tip of the corner.

The imaging data may also include a cursor 1206. In some embodiments, the origin point 1204 is a local minimum of the depth values within the cursor 1206 of the imaging data. The cursor 1206 indicates a search area for a corner of the target object. The imaging sensor is manually aligned such that the corner of the target object is within the cursor 1206. For example, the operator may position and orient the mobile device 102 relative to the target object so that the entire object is within the field-of-view of the imaging sensor and the top corner 122 is within the cursor 1206. The cursor 1206 may be a two-dimensional shape such as a bracket, a rectangle, a circle, and the like. In some embodiments, the program instructions may display a prompt to guide the operator to adjust the target position and orientation by repositioning the imaging sensor until the origin point 1204 is disposed within the cursor 1206.

In some embodiments, the cursor 1206 is disposed in a center of the imaging data. In some embodiments, the cursor 1206 is offset from a center of the imaging data. For example, the cursor 1206 may be offset from the center where the target object is a cuboid which is substantially longer in one dimension. The closest corner of the cuboid which is substantially longer in one dimension may be offset to enable capturing the corner within the cursor 1206 and capturing the entire target object within the imaging data. In some embodiments, the position of the cursor 1206 relative to the center of the imaging data may be adjustable in response to an input. For example, the mobile device 102 may receive an input to manually reposition the cursor 1206. In some embodiments, the system may automatically sense a long target object, as described, and automatically adjust and reposition the cursor for the operator to better able to get the entire long target object into the viewscreen.

In some embodiments, the size of the cursor 1206 may be adjusted. Adjusting the size of the cursor 1206 may then adjust the size of the search area. The user of the mobile device 102 may more easily capture the origin point within the cursor 1206 as the size of the cursor is increased. Increasing the cursor may allow the mobile device to search for an origin point associated with the corner in a larger area at an expense of increased search time. Similarly, decreasing the search area may improve the search time at the expense of a searching for the origin point in a smaller area. In some embodiments, the size of the cursor 1206 may be adjusted in response to an input. For example, the mobile device 102 may receive an input to manually reposition the cursor 1206. In some embodiments, the size of the cursor 1206 may be automatically adjusted based on a confidence level.

In a step 1130, the volume dimensioning system 100 crawls from the origin point 1204 along edges of the target object to the far corners of the target object. The step 1130 may also be referred to as edge contour crawling and key-point estimation. Starting at the origin point 1204 calculated in the previous step, the left, right, and vertical edges of the target object are crawled to their respective far corners. The goal is to determine the two points to define lines to measure for each of the three edges emanating from the origin point 1204. The volume dimensioning system 100 may crawl from the origin point along the edges via an edge crawling algorithm. For example, the edge crawling algorithm crawls from the origin point 1204 along a first edge 1208*a* to a first corner 1210*a*, a second edge 1208*b* to a second corner 1210*b*, and a third edge 1208*c* to a third corner 1210*c* of the target object.

The edge crawling algorithm of the volume dimensioning system 100 may include one or more inputs, such as, the depth map 1202, the origin point 1204, a step vector 1212, and a test vector 1214. The checkpoint is initially the origin point 1204 and is updated upon detecting minimum depth values which correspond to a minimum distance away from the camera. The step vector 1212 may refer to a direction in the depth map 1202 in which to step from a checkpoint 1216. The test vector 1214 may refer to a direction in the depth map 1202 in which to examine for minimum depth values. The step vector 1212 and test vector 1214 may include one or more step vectors depending upon which of the edges 1208 is being evaluated. For example, the step vector 1212 may include a step left value (−1, 0) to evaluate the edge 1208*a*, a step right value (1, 0) to evaluate the edge 1208*b*, or a step vertically down value (0, −1) to evaluate the edge 1208*c*. By way of another example, the test vector 1214 may include a test up vector (0, 1) to evaluate the edge 1208*a* and/or the edge 1208*b*, test left vector (−1, 0) to evaluate the edge 1208*c*, and/or a test right vector (1, 0) to evaluate the edge 1208*c*. As may be understood, the specific values for the step vector 1212 and the test vector 1214 are not intended to be limiting and are merely exemplary.

The edge crawling algorithm determines the checkpoints 1216. The checkpoints 1216 may also be referred to as edge points. The checkpoints 1216 define the edges 1208 and the corners 1210.

The volume dimensioning system 100 may iteratively perform one or more steps using the edge crawling algorithm. In a step 1132, the one or more processors step from a checkpoint according to a step vector and examine depth values along a test vector for a change in depth value to find a minimum depth value. In a step 1134, the checkpoint 1216 is moved to the minimum depth value. The edge crawling algorithm implement crawling logic according to the step vector 1212 and the test vector 1214. The edge crawling algorithm steps in the direction of the step vector 1212. The edge crawling algorithm then steps in the direction of the test vector 1214 to determine if the next value is less than or equal to the current cell value. If the next value is less than or equal to the current cell value, continue moving in the direction of the test vector 1214. If the next value is greater than the current cell value not, move in the direction of the step vector then iterate. The edge crawling algorithm may be generic to either of the three directions/dimensions-left, right, or vertical (down) from the origin point 1204 depending upon the values of the step vector 1212 and the test vector 1214.

The step 1132 and step 1134 are iteratively repeated to determine the checkpoints 1216 defining the edges 1208. The number of the checkpoints 1216 may be based on a resolution of the depth map 1202 and a size of the target object within the depth map 1202. It is contemplated that each of the edges 1208 may be defined by several hundred or thousands of the checkpoints 1216.

Figure 12A:
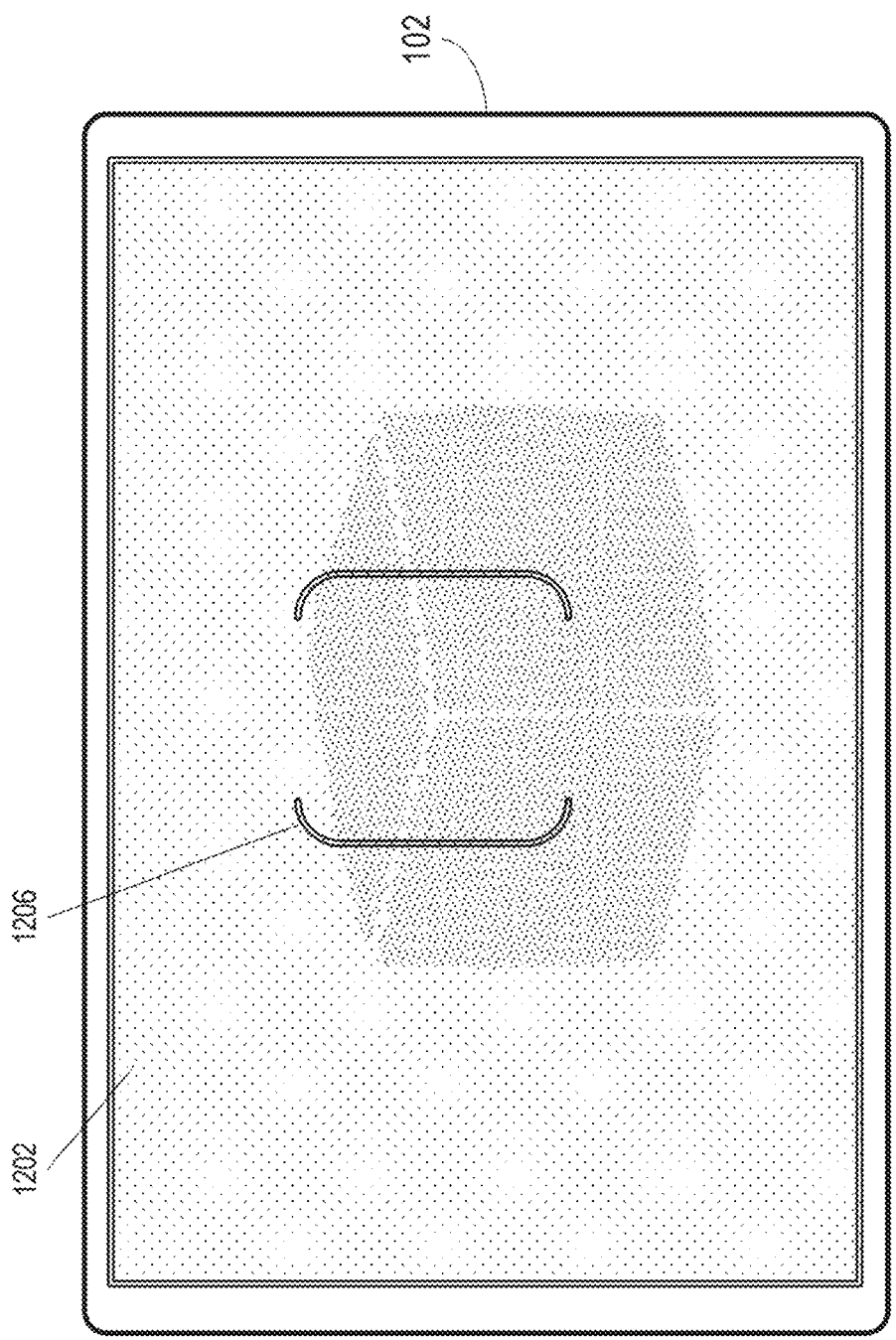
Figure 12B:
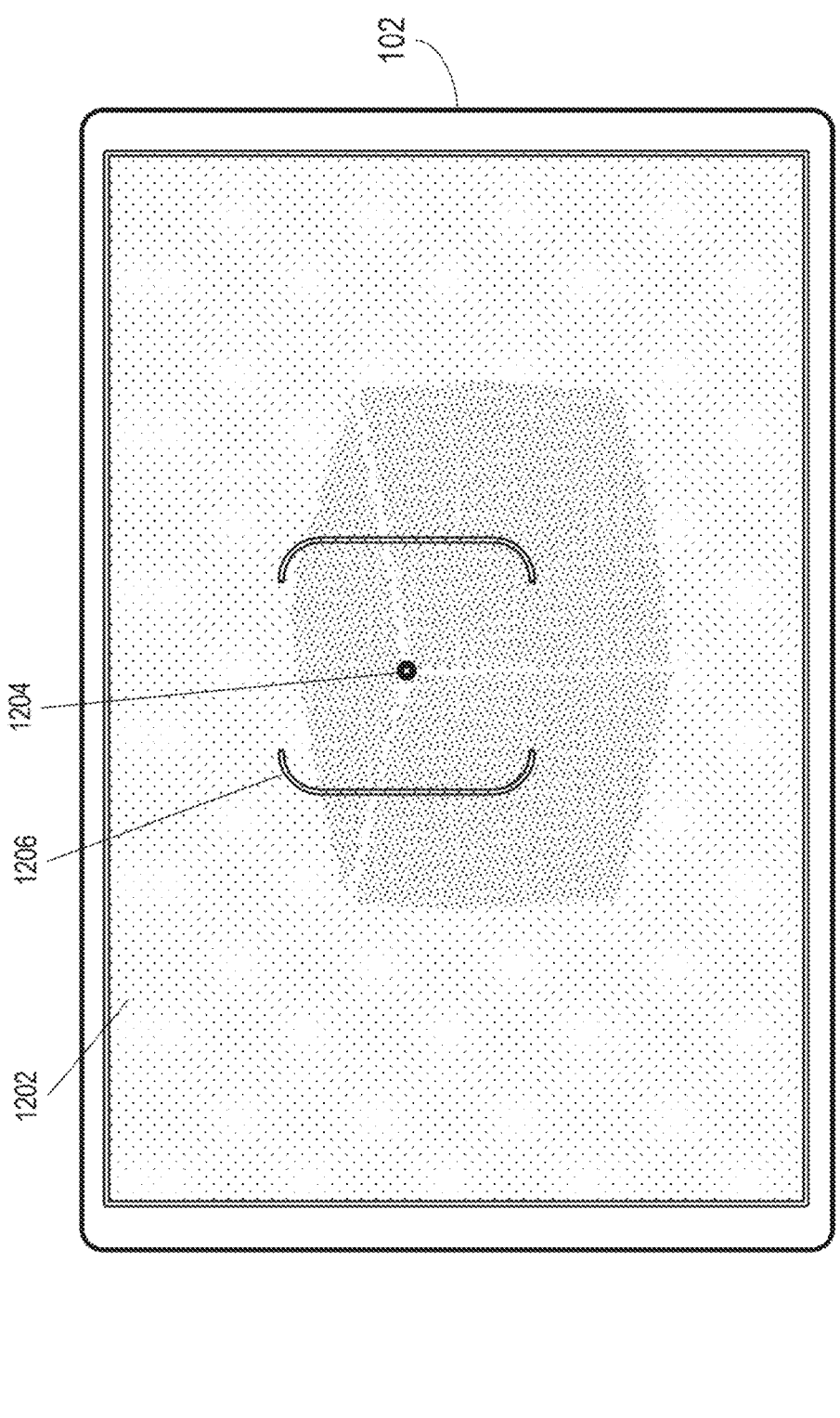
Figure 12D:
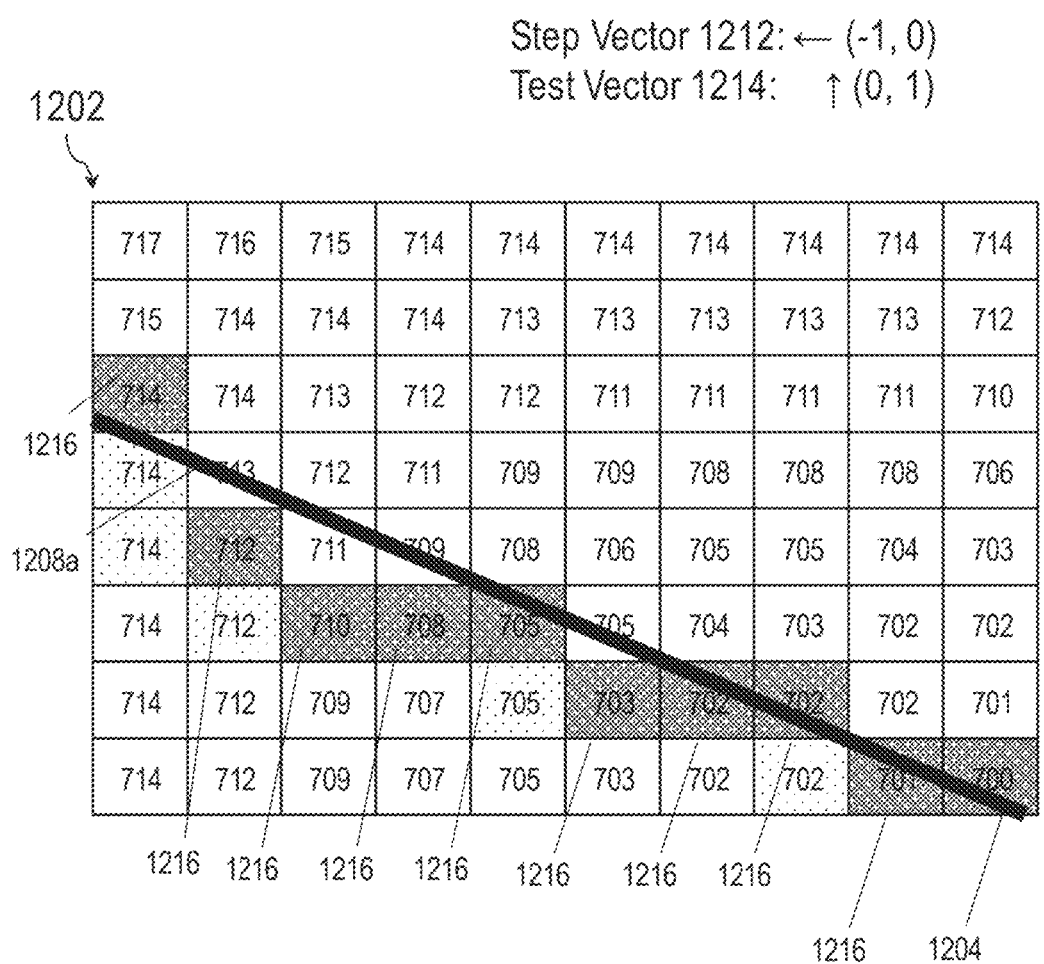

For example, FIG. 12D depicts a portion of the depth map 1202. In this example, the origin point 1204 is 700 mm from the image sensor. As depicted, the depth value is measured in millimeters, although this is not intended to be limiting. The step vector 1212 is set to a value of (−1,0) and the test vector 1214 is set to a value of (0, 1). In this regard, the checkpoint 1216 is stepped one to the left and then each point above the stepped value in the depth map 1202 is examined for the change in depth value. Multiple checkpoints 1216 are determined. In this example, nine of the checkpoints are determined from the origin point 1204. This example is not intended to be limiting.

The step 1132 and step 1134 may be iteratively repeated until one or more conditions are met. The conditions may include a detecting a directional change and/or detecting a continuous segment of empty depth values.

The volume dimensioning system 100 may be iteratively repeat the edge crawling algorithm until a directional change is detected. For example, FIG. 12E depicts a portion of the depth map 1202. In this example, the corner 1210*a* is 929 mm from the image sensor. The volume dimensioning system 100 has detected the corner 1210*a* by detecting a directional change 1218. The directional change 1218 may be due to a second target object adjacent to the first target object (e.g., multiple boxes on a pallet). The last point of the vector before the point of the origin of the directional change 1218 may be set as the corner 1210*a* (illustrated as 929 mm) of the 1208*a*.

The volume dimensioning system 100 may iteratively repeat the edge crawling algorithm until continuous segments of empty depth values are detected. Zeros in the depth values may cause the method 1100 to erroneously stop crawling. In some embodiments, the method 1100 may skip over one or more empty or null depth values when crawling the edges. The number of holes which are skipped over before determining the change in distance may be configured as a maximum empty threshold or the like. The edge crawling algorithm includes the maximum empty threshold as a number of the empty matrix entries to skip over when crawling the edges 1208. The edge crawling algorithm ignores empty depth values in the depth map 1202 until the maximum empty threshold is exceeded in a row. The method 1100 may stop crawling when the maximum empty threshold is exceeded.

In a step 1140, the depth map 1202 is deprojected into three-dimensional points 1201. The depth map 1202 is deprojected into the three-dimensional points 1201 using the depth values of the pixels and intrinsic parameters of the image sensor used to generate the depth map 1202. Deprojection is the process of transforming 2D depth coordinates into 3D space. Deprojecting simulates a 3D image from the depth values. A deprojection module may take the two-dimensional pixel location and the depth, and map to the three-dimensional point location. The three-dimensional points 1201 may include three-dimensional points associated with the origin point 1204 and/or the corner 1210 which are in the depth map 1202. For example, the three-dimensional points 1201 include a three-dimensional origin point associated with the origin point 1204, a first three-dimensional corner point associated with corner 1210*a*, a second three-dimensional corner point associated with corner 1210*b*, and a third three-dimensional corner point associated with corner 1210*c*.

In a step 1150, edge vectors are constructed from the three-dimensional points 1201. The 3D points are used to construct edge vectors 1220 representing the edges 1208 of the target object. A first edge vector 1220*a* may represent the left edge 1208*a* between the origin point 1204 and the corner 1210*a*, a second edge vector 1220*b* may represent the right edge 1208*b* between the origin point 1204 and the corner 1210*b*, and a third edge vector 1220*c* may represent the vertical edge 1208*c* between the origin point 1204 and the corner 1210*c*. The edge vectors 1220 are directional from the three-dimensional origin point. The edge vectors 1220 may be determined from the three-dimensional origin point to each of the three-dimensional corner points. For example, the first, second, and third three-dimensional corner points may each be subtracted from the three-dimensional origin point to find the respective first, second, and third edge vectors.

Advantageously, the edge vectors 1220 are determined without having to perform a crawling method in three-dimensional space. Rather, the crawling is performed on the depth map in two-dimensional space. Performing the computations in two-dimensional space may be require significantly less processing power than performing the computations in three-dimensional or higher space. The various points in two-dimensional space may then be deprojected back into three-dimensional space for one or more subsequent steps of validation and determining the lengths of the edge vectors.

In a step 1160, angles between the edge vectors are compared to determine the target object is a cuboid, e.g., a box or like hexahedral solid having three opposing pairs of quadrilateral faces. Angles 1222 between the vectors 1220 may be determined. For example, the angle 1222 include angle 1222*a* between the vector 1220*a* and the vector 1220*b*, angle 1222*b* between the vector 1220*a* and the vector 1220*c*, and angle 1222*c* between vector 1220*b* and vector 1220*c*. The angles 1222 may be determined using any suitable technique, such as, but not limited to, by a dot product or the like. The angles 1222 are then examined to determine whether the target object resembles a cuboid. For example, examining the angle 1222 may include determining the angle are within tolerance of ninety degrees. The angles 1222 being within tolerance of ninety indicates the angles 1222 are orthogonal and the target object is cuboid. The tolerance may include an angular tolerance, such as, but not limited to within one degree.

In a step 1160, distances of the edges 1208 are estimated using the vectors 1222. For example, the distance of edge 1208*a* from the origin point 1204 to the corner 1210*a* is estimated using the edge vector 1220*a*, the distance of edge 1208*b* from the origin point 1204 to the corner 1210*b* is estimated using the edge vector 1220*b*, and the distance of edge 1208*c* from the origin point 1204 to the corner 1210*c* is estimated using the edge vector 1220*c*. The distances are estimated using the lengths of the vectors 1222. The lengths of the vectors may be determined using any suitable approach, such as, but not limited to by the Pythagorean theorem. The lengths may then be maintained in memory, displayed on the mobile device 102, and the like as discussed previously herein.

It is contemplated that the method 1100 performed on frame-by-frame basis or combination of frames, may accurately estimate the lengths within some variation and tolerance. For example, the length of the edges 1208 may be estimated within 20 mm from actual physical length of the edge.

In some embodiments, the size of the cursor 1206, the angular tolerance of the angles 1222, the maximum empty threshold, a minimum size of the target object to be recognized and measured, and the like may be considered one or more hyperparameters of the method 1100. The hyperparameters may be adjusted to adjust a speed of the method 1100 and/or adjust an accuracy of the length estimation for the edges 1208.

In some embodiments, the method 1100 may be iteratively performed on subsequent frames, or on a combination of subsequent frames, to further improve the estimation of the length. For example, the method 1100 may be performed for each frame to determine the dimensions of the target object across multiple of the frames. In a final step, the edge lengths for each dimension from multiple frames are received and statistical methods are applied to reduce the mean error between each of the frames to produce a final and confident result.

In some embodiments, the method 1100 may include one or more additional steps wherein the measured dimensional values are corrected or adjusted (1225) to mitigate or eliminate error relative to the actual physical values of each dimension. For example, the end result of the method 1100 with statistical methods applied may still include error relative to the actual physical value, where the "actual physical value" is the length that is present in the target object (which length may also be measured using traditional physical methods such as a tape measure). For example, the error relative to actual physical value length may be predictable due to one or more of a variety of contributing factors, e.g., camera functionality, algorithms, length of dimensional vectors left 1220*a*, right 1220*b*, vertical 1220*c*, angle of attack (e.g., of the camera relative to the target object), box material, color, lighting condition, and/or object quality. By way of a non-limiting example, machine learning or otherwise statistical trendline algorithms may also be applied to adjust (1225) the resulting measurements 1220a-1220c achieved via method 1100 to reduce the error relative to actual physical value. In embodiments, subsequent algorithms may take the resulting value 1220a-1220c of each dimension as achieved via method 1100 and enter said resulting values into an adjustment algorithm 1225 with input and output, which may include, but is not limited to, a lookup table, a formula, or a machine learning produced model. For example, adjustment input may include the measured values 1220a, 1220b, and 1220c (e.g., achieved via method 1100), together or separately. Similarly, adjustment output may include one or more adjusted values 1230a, 1230b, and 1230c (e.g., also together or separately, depending upon the adjustment input). Further, the adjustment output may include a second value indicating the applied adjustment itself (e.g., positive adjustment, negative adjustment, zero adjustment) In embodiments, the adjusted value/s 1230a-1230c may provide a final estimated length of the corresponding dimension/s. In some embodiments, adjustment calculations 1225 may be based on predictable error levels determined via testing of a broad variety of possible target objects.

Figure 12G:
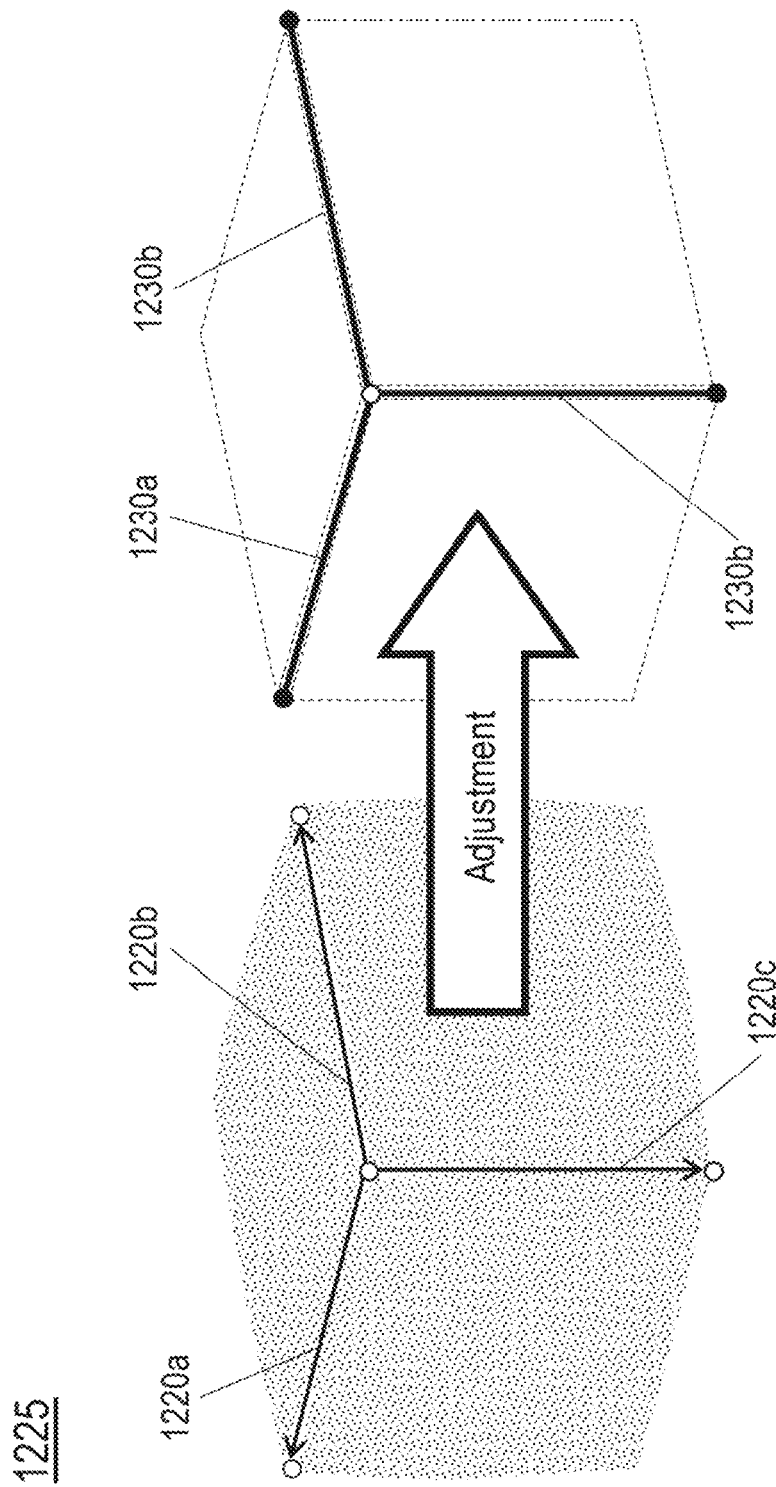
FIG. 12G is a view of measured values adjusted (e.g., adjusted to reduce error relative to actual physical values), by the volume dimensioning system of FIG. 1.
Figure 12H:
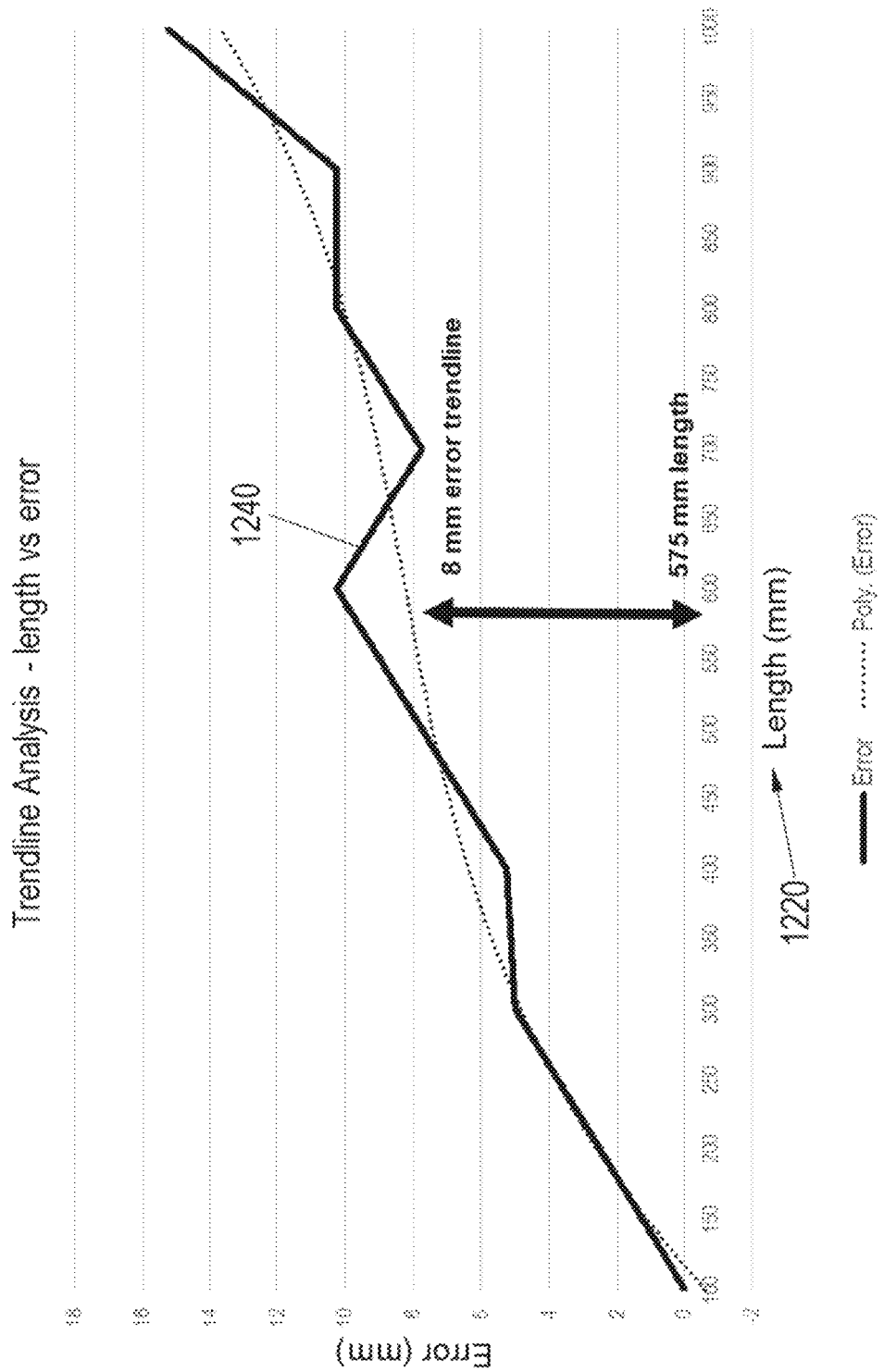
FIG. 12H is a graphical representation of trends in measured values and predicted errors (e.g., relative to actual physical values) with respect to the volume dimensioning system of FIG. 1.

Referring now to FIG. 12H, a sample trendline relationship 1240 is shown representing measured lengths 1220 (see, e.g., 1220a-1220c, FIG. 12G) compared to observed and/or predictable errors in testing. In embodiments, the observed/predictable error trendline (1240, broken line) relative to measured dimensional length (1220, solid line) may be based on observed, tested errors (e.g., with respect to a broad variety of potential target objects of various dimensions) and may include a straight linear representation, logarithmic representation, or polynomial representation of any of a number of possible orders. For example, the error trendline 1240 may be represented by a formula, data table lookup values, machine learning model, and/or other algorithm. Further, the error trendline 1240 may be representative of an adjustment value depending upon the observed length 1220 (e.g., via data entries, via calculation). In embodiments, with respect to the adjustment calculations 1225 shown above by FIG. 12G, measured values 1220 may be provided as input, and the resulting output used as adjustment to reduce trending error to zero (see, e.g., 1230a-1230c, FIG. 12G).

In embodiments, the adjustment calculations 1225 may apply the error trendline (1240) value for each measured length 1220 may be applied as a negative to offset error in the measured length. For example, a positive value on the error trendline 1240 may represent an overmeasure error with respect to the measured value 1220, so an adjustment 1225 would subtract the trendline value from the measured value to achieve an adjusted measurement value (1230a-1230c) which may better approximate zero error relative to the actual physical length of said dimension. Similarly, if the error trendline value 1240 is negative, the measured value 1220 may be associated with an undermeasure error; accordingly, the adjustment 1225 would effectively subtract the negative trendline value (which double negative would amount to adding the error value to the measured value 1220 to achieve the adjusted measured value (1230a-1230c) more closely approximating zero error relative to the actual physical length. By way of a non-limiting example, and as shown by FIG. 12H, a measured value 1220 of 575 mm would be associated with a predicted trendline error 1240 of +8 mm. Accordingly, adjustment 1225 to the measured value 1220 would subtract 8 mm from the measured value of 575 mm, resulting in an adjusted value (1230a-1230c) of 567 mm.

In some embodiments, the depth map 1202 may be scaled to estimate the primary box corner based on recent measurements. Scaling the depth map 1202 may make the method 1100 more tolerant aim of the origin point 1204 off-center from the cursor 1206.

In some embodiments, a downscaled depth map may be generated from the depth map 1202. Downscaling may refer to reducing the size of the depth map 1202. The downscaled depth map may then be crawled to estimate the length of the edges. Downscaling the depth map before crawling may be advantageous to reduce a processing time of the crawling. Progressively higher resolution downscaled depth maps may then be crawled to reduce overall steps.

In some embodiments, a temporal filter may be implemented within the method 1100. In some embodiments, one or more convolutional filters may be used to accentuate the edges 1208 and/or corners 1210. Accentuating the edges 1208 and/or corners 1210 may improve the accuracy when crawling the edges 1208.

Referring to FIGS. 13A through 13D, a system 1300 for 3D box segmentation and measurement is disclosed. The system 1300 may also be referred to as a volume dimensioning system. The discussion of the system 100 is incorporated herein by reference in the entirety as to the system 1300. The system 1300 may include a cart 1302. The cart 1302 may include one or more of the image and control processors 206, touch-sensitive display surface 208, and wireless transceiver 210. The system 1300 may also include a boom 1304. The boom 1304 may be pivotably coupled to the cart 1302. The boom 1304 may include the 2D image sensors 202 (e.g., a visible-light camera) and/or the 3D image sensors 204 (e.g., a 3D imager).

In embodiments, the boom 1304 is aimed at a target object 106 (e.g., a rectangular cuboid solid ("target box") or like object the user wishes to measure in three dimensions. The target item may be a target box or another object, such as an envelope or irregular shaped item. The target object 106 may also be in the hands of an operator, being carried from one location to another location. The operator's body, arms, hands, head, or clothing may obstruct the view of cameras. In this case, the obstruction may require one or multiple cameras that may move to see unobstructed views of the target object 106 behind held by the operator (e.g., as shown below by FIG. 13D). The system may be used to determine dimensions of the target object 106 and compare it to the pre-filled existing information of the dimensions in the logistics or shipping system. For example, the system 1300 may return dimensional information of the target object 106, e.g., a length 110, width 112, and depth 114 of the target object. In some embodiments, the system 1300 will characterize the greatest of the length 110, width 112, and depth 114 as the length of the target object 106; in some embodiments, the system 100 may derive additional information corresponding to the target object 106 based on the determined length 110, width 112, and depth 114 (or as disclosed in greater detail below).

In embodiments, the boom 1304 includes a head 1306. The head 1306 may include one or more of the 2D image sensors 202 and/or the 3D image sensors 204. The head 1306 may be considered to include an overhead camera that provides a top view of the target object 106. The head 1306 may also include lights illuminating an area below the head (e.g., illuminating the target object 106 when the target object 106 is disposed below the head 1306).

In embodiments, the boom 1304 may include an arm 1308. The arm 1308 may be configured to translate along the boom 1304 relative to the head 1306. The arm 1308 may include one or more image sensors 1310. The image sensors 1310 may include the 2D image sensors 202 and/or the 3D image sensors 204. In this regard, each of the image sensors 1310 may generate image data 1312 (e.g., 2D imaging data 126 and/or 3D imaging data 128).

In embodiments, the boom 1304 and/or image sensors 1310 may be optimally oriented to the target object 106 such that three mutually intersecting planes of the target object, e.g., a left-side plane 116, a right-side plane 118, and a top plane 120, are clearly visible within the image data 1312. The image sensor 1310 may be positioned nearest a top corner 122 of the target object (e.g., where the three planes 116, 118, 120 intersect) at an angle 124 (e.g., a 45-degree angle). In embodiments, the system 1300 may prompt the user 104 to reposition or reorient the boom 1304 and/or the target object 106 to achieve the optimal orientation described above. For example, the system 1300 may provide an audio tone or visual alert to reposition the target object 106. The system 1300 may also provide an audio tone or visual alert in response to dimensioning the target object 106.

In embodiments, the arm 1308 includes several of the image sensors 1310. For example, the arm 1308 may include three image sensors 1310. The image sensors 1310 provide stereo vision. In embodiments, the image sensors 1310 may be oriented toward the target object 106 in such a way that the image data 1312 includes separate field-of-view of the target object 106 (e.g., the stereo vision). The orientation of the image sensors 1310 may be individually calibrated by rotating (1310a) the image sensor/s 1310 relative to the arm 1308. In embodiments, rotation and movement of the cameras may be controlled by mechanical means or robotic arms, to move the cameras to a more ideal view of the target object 106. For example, control can be provided by a system that estimates the optimal view and subsequent movement to improve the field of view of the image sensors 1310/cameras (e.g., to mitigate or evade obstructions, as described below). The cameras and/or camera positions (1310b, 1310c) may be spaced apart with an angle defined between the image sensors 1310. In some embodiments, the angle between evenly spaced image sensors 1310 may be up to 15 degrees, up to 22.5 degrees, or more.

Figure 13A:
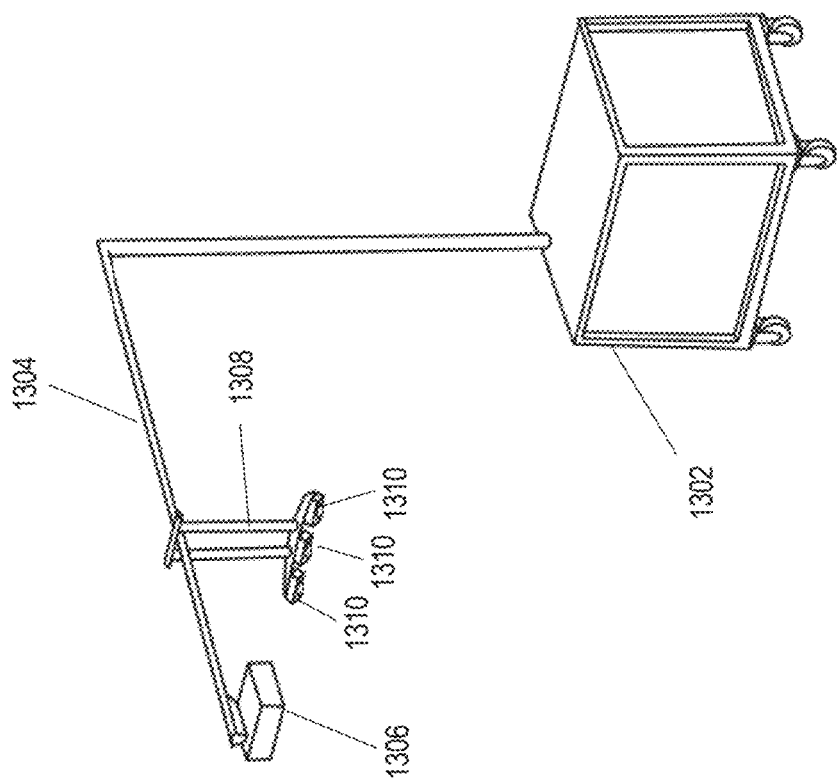
FIGS. 13A and 13B depict a volume dimensioning system, in accordance with one or more embodiments of the present disclosure.
Figure 13B:
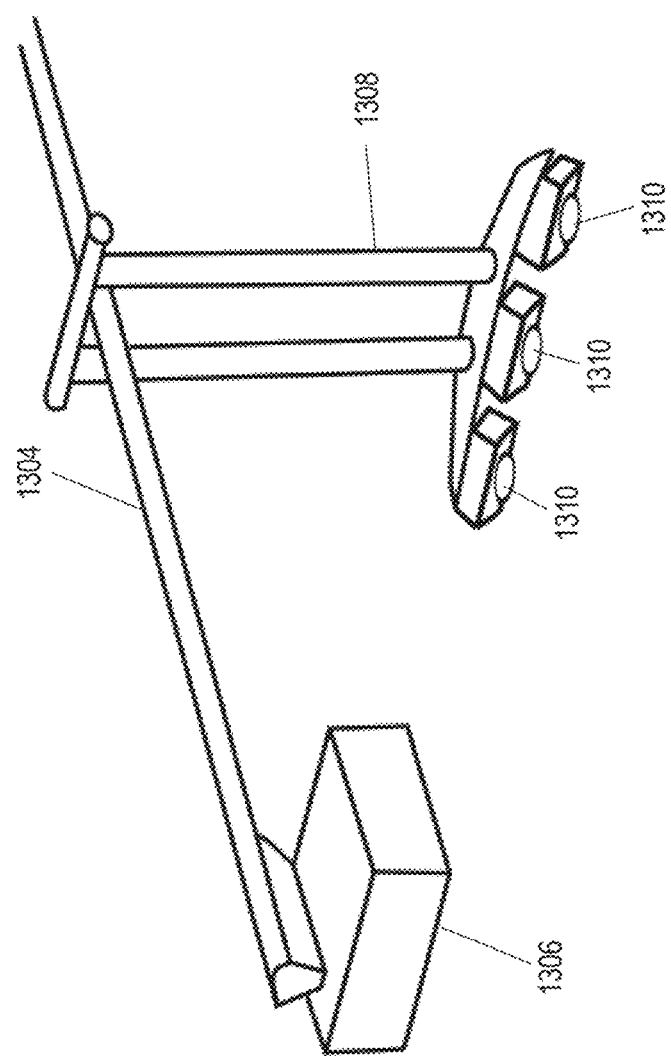
Figure 13D:
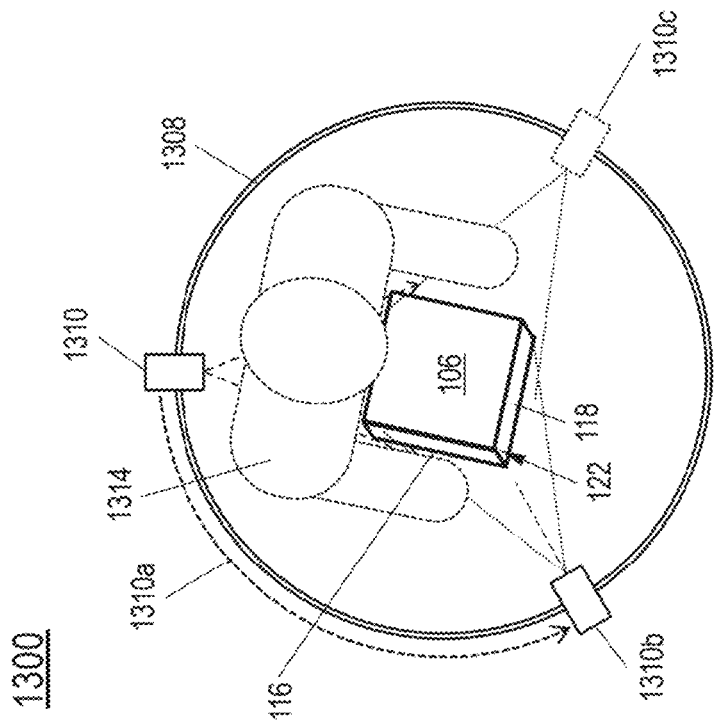
FIGS. 13C and 13D depict overhead views of a volume dimensioning system, in accordance with one or more embodiments of the present disclosure.
Figure 13C:
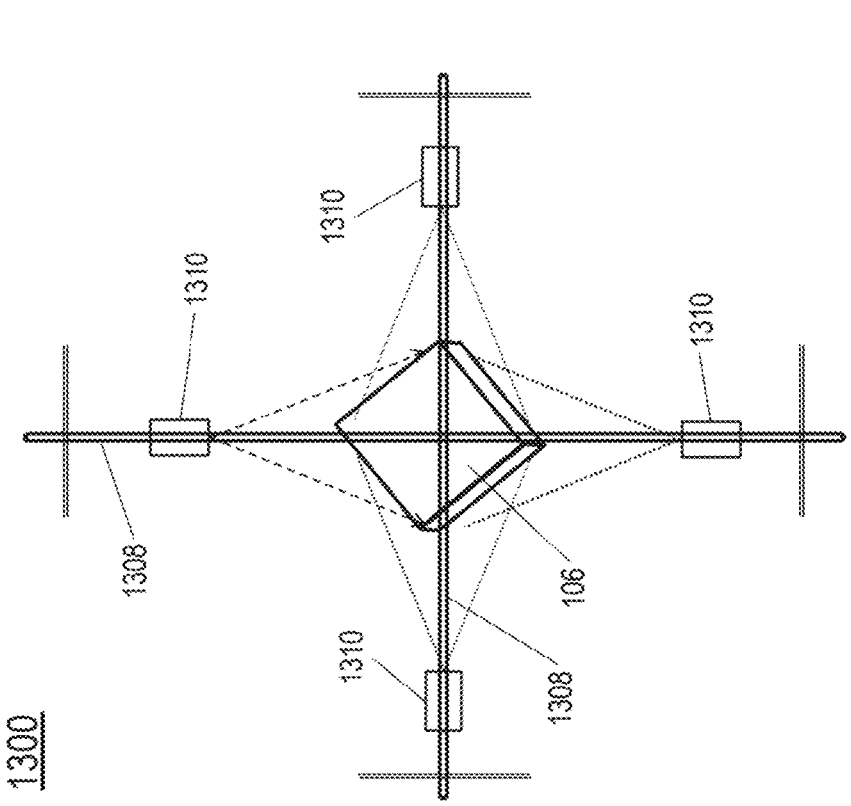

Referring also to FIGS. 13C and 13D, an overhead view of the system 1300 for 3D box segmentation and measurement is shown. For example, as shown by FIG. 13C, the system 1300 may include multiple image sensors 1310 or cameras fixed to arms 1308 at fixed angles and oriented toward a space where the target object 106 is presented for imaging, segmentation, and measurement. Alternatively, as shown by FIG. 13D, the system 1300 may include one or more image sensors 1310 attached to a circular or elliptical arm 1308 and capable of articulation around the arm 1308, such that each image sensor or camera may orient or be oriented toward the space where the target object 106 is presented from multiple angles or orientations.

In some embodiments, one or more image sensors 1310 may detect an obstruction 1314, e.g., an arm or body part belonging to a person holding or presenting the target object 106 for scanning or otherwise disposed between the image sensor and the target object. For example, if one or more image sensors 1310 are obstructed such that the system 1300 is not receiving sufficient image data 1312 (e.g., from an advantageous orientation 1310b, from enough different orientations) to perform accurate volume dimensioning on the target object 106, one or more image sensors may rotate relative to the arm 1308 to an orientation 1310b where the view of the target object is unobstructed and/or preferable to the prior orientation (1310, 1310c), e.g., with respect to the top corner 122 and/or mutually intersecting planes 116, 118, 120. In some embodiments, more than one image sensor 1310 may rotate relative to the arm 1308, e.g., either to evade a detected obstruction or in response to the rotation of another image sensor. For example, one or more image sensors 1310 may select one of a set of predetermined rotational orientations 1310b, 1310c; alternatively or additionally, the system 1300 may analyze image data 1312 captured by the obstructed image sensor and determine a more favorable rotational orientation wherefrom the image sensor may have an unobstructed view of the target object 106.

Referring now to FIG. 14, each of the image sensors 1310 may capture image data 1312 with a separate field-of-view of the target object 106. Any of the various algorithms described herein may be performed on the image data 1312 generated by the image sensors 1310. The multiple cameras provide algorithms with additional data to identify and measure the target object, as compared to a single of the image sensors 1310.

In embodiments, the volume dimensioning system 1300 may independently determine a set of dimensions of the target object 106 using the image data 1312 from each of the image sensors 1310. The set of dimensions may include dimensions of edges of the target object 106. The edges may include any of the length 110, width 112, and depth 114. The set of dimensions may include set of dimensions (x1, y1, z1), set of dimensions (x2, y2, z2), and set of dimensions (x3, y3, z3). The three sets of dimensions correspond to the respective image data generated by the three of the image sensors 1310 of the arm 1308.

Each of the set of dimensions may be combined together to generate a combined set of dimensions (x', y', z'). The combined set of dimensions may be generated by averaging (which may include, but is not limited to, other statistical calculations or algorithms as appropriate) each of the sets of dimensions (e.g., averaging x1, x2, and x3 to get x'; averaging y1, y2, and y3 to get y'; averaging z1, z2, and z3 to get z'). The combined set of dimensions may include an accuracy or confidence level which is improved over individual of the sets of dimensions. For example, the individual sets of dimensions may include error due to misalignment of the image sensors 1310 with the corner of the target object 106. The error is reduced in the combined set of dimensions.

In some embodiments, the set of dimensions are combined using one or more weights. The volume dimensioning system 1300 may determine that the image sensor 1310 has or does not have an ideal angle for a given edge of the target object 106. For example, image sensors 1310 which are steeply aligned or include a sharp angle relative to the edge may be unable to accurately detect the length of the edge. The volume dimensioning system 1300 may detect the angular alignment of the image sensor 1310 relative to the edge and then weight the set of dimensions based on the alignment. In this regard, the weight may be reduced where the edge is steeply angled relative to the image sensor 1310.

Referring to FIGS. 15A through 15F, the volume dimensioning system 1500 (VDS) and corresponding method may be implemented and may function similarly to previously disclosed volume dimensioning systems, except that the VDS 1500 may be trained (e.g., via machine learning algorithms) to distinguish payload objects 1502 from pallets 1504 on which the payload objects may be disposed. For example, referring in particular to FIG. 15A, the payload object 1502 may comprise a quantity of like smaller objects (e.g., packages stacked in a cuboid array of $x_1$ by $y_1$ by $z_1$ packages, where each individual package 1504 likewise has a cuboid dimension of $x_2$ by $y_2$ by $z_2$, and therefore the payload object 1502 as a whole may be expected to have a total volume dimension approximating $x_1*x_2$ by $y_1*y_2$ by $z_1*z_2$. Further, the VDS 1500 may be trained to distinguish the payload object 1502 from the pallet 1504 on which the payload object sits, as well as the orientation of the pallet (e.g., whether or not the image data 1506 indicates holes 1504b in the pallet whereby a forklift may capture and raise the pallet). In embodiments, the VDS 1500 may additionally incorporate color and depth data from within a captured set of image data 1506 portraying the payload object 1502 and pallet 1504 (as well as, e.g., additional proximate payload objects 1502a and/or pallets 1504a).

In embodiments, the VDS 1500 may include neural networks trained (e.g., via you-only-look-once (YOLO) object detection and/or other like machine learning algorithms) to predict, based on a set of image data 1506, instances of payload object segments 1502, 1502a and/or pallet segments 1504, 1504a. For example, as a first step the VDS 1500 may annotate image data 1506 to output predicted bounding boxes 1508, class probabilities (e.g., is a given pixel or image portion part of the payload object 1502 or part of the pallet 1504?), and/or segmentation masks corresponding to a set of instance segments, e.g., payload object segments 1502, 1502a and/or pallet segments 1504, 1504a. In some embodiments, the VDS 1500 may attempt to match pallet segments 1504, 1504a to pallet templates and/or reference pallets (e.g., via lookup, via scanning encoded information on a pallet surface) having known dimensions and/or other attributes.

Figure 15A:
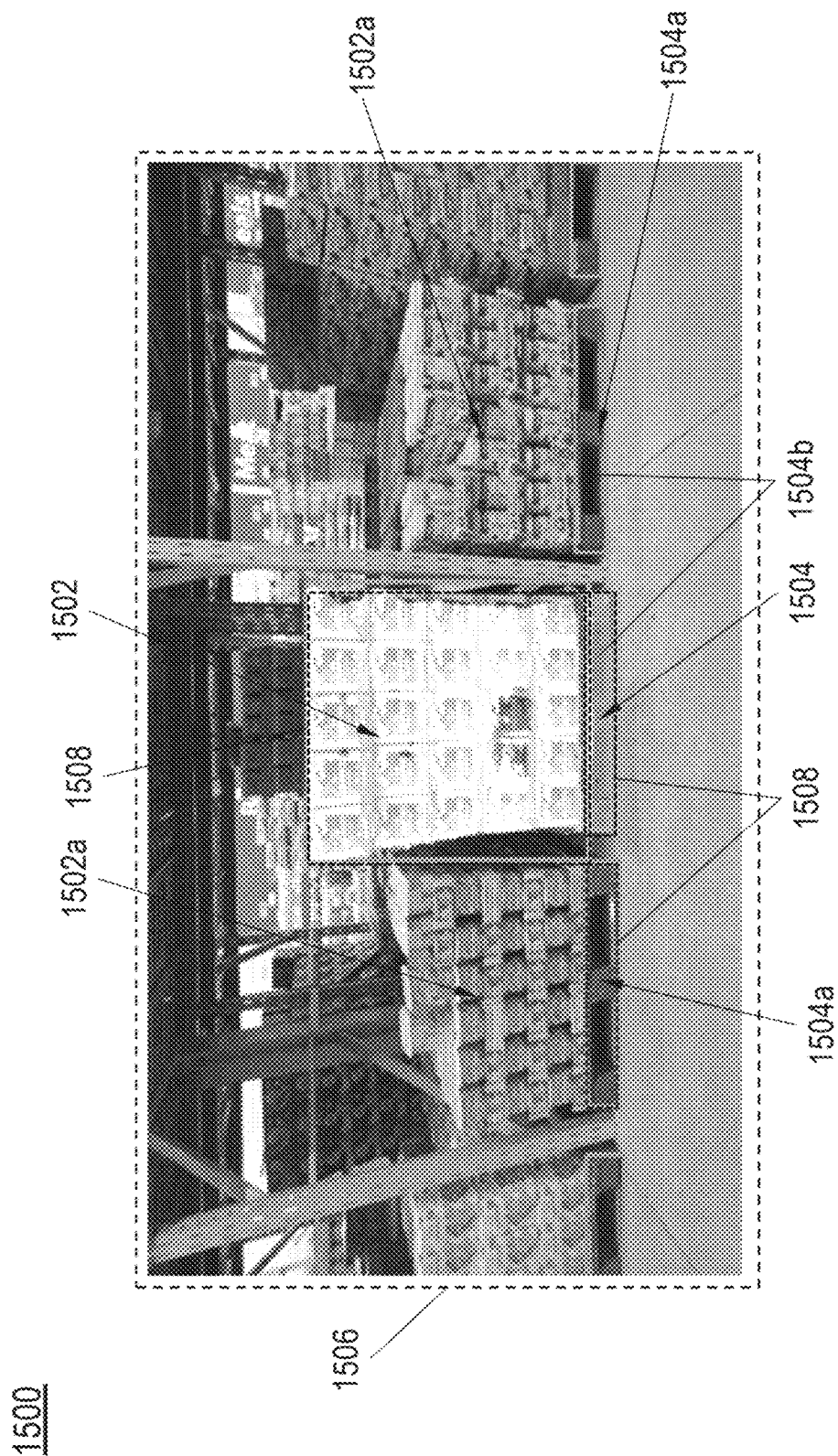
FIGS. 15A through 15F depict a volume dimensioning system including pallet segmentation and measurement, in accordance with one or more embodiments of the present disclosure.
Figure 15B:
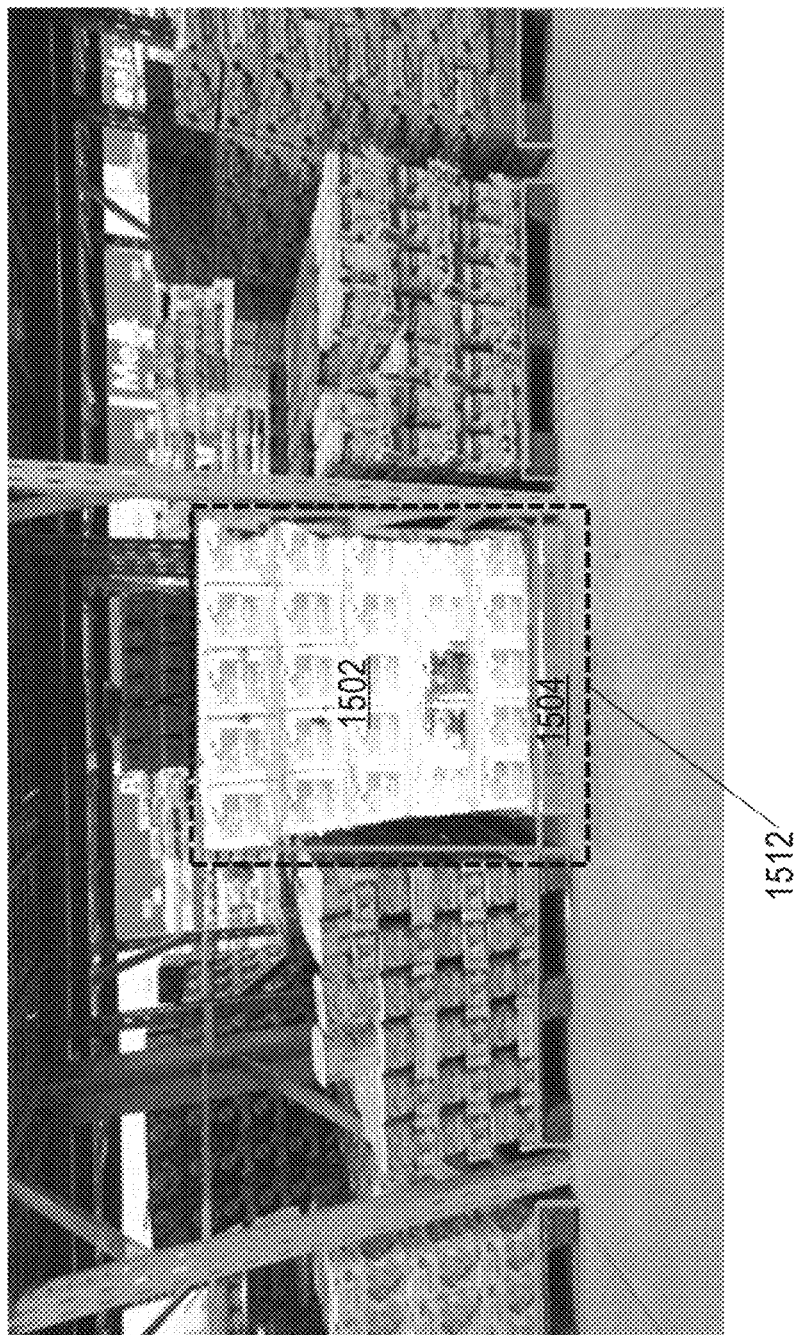

In embodiments, referring also to FIG. 15B, as a further step the VDS 1500 may select from the set 1510 the centermost payload object 1502 and corresponding payload 1504 as primary subjects for volume dimensioning. For example, the VDS 1500 may create a binary mask 1512 based on the selected centermost payload object 1502 and payload 1504, the binary mask 1512 serving to threshold depth data corresponding to the payload object 1502 and payload 1504.

Figure 15C:
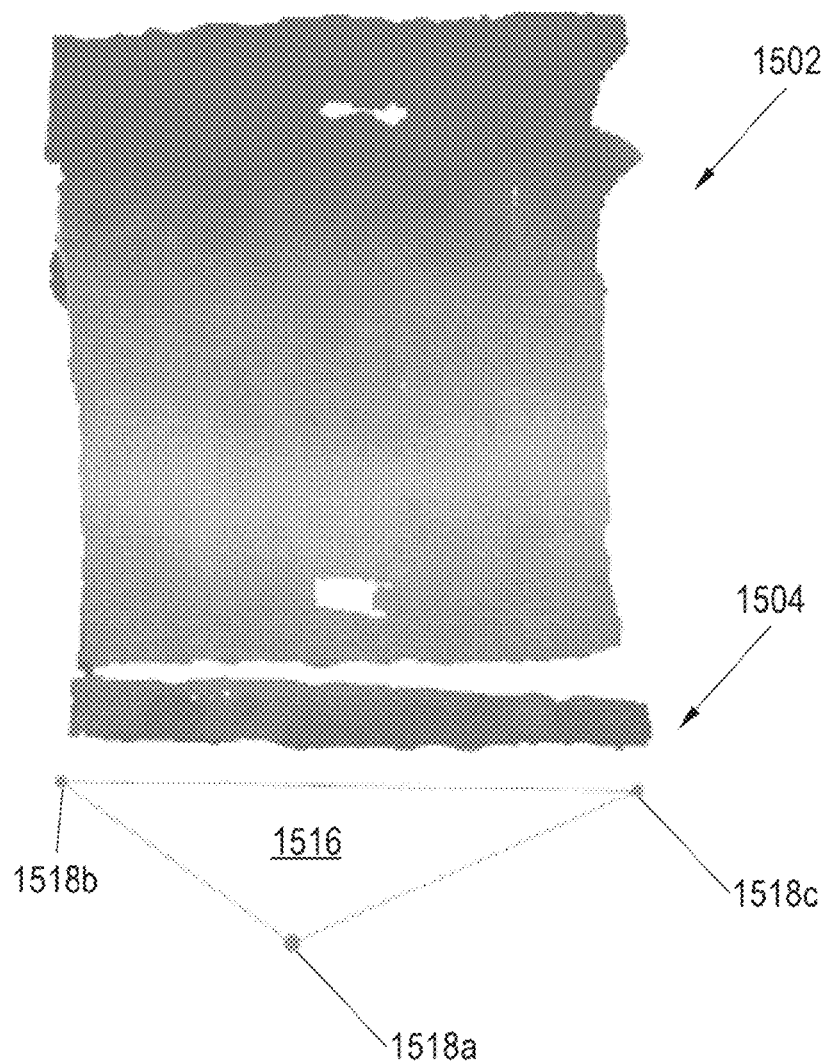

In embodiments, referring also to FIG. 15C, as a further step the VDS 1500 may deproject (1514) the depth data within the binary mask 1512 into 3D space, e.g., using camera intrinsics of the image sensors 1310. For example, based on the deprojected depth data 1514, the VDS 1500 may further sample points proximate to, but not part of, the payload object 1502 and pallet 1504. In embodiments, assuming the ground plane 1516 (e.g., floor) on which the payload object 1502 and pallet 1504 are disposed is clearly visible within the deprojected depth data 1514, three points 1518a-1518c proximate to the pallet may be sampled to estimate the ground plane.

Figure 15D:
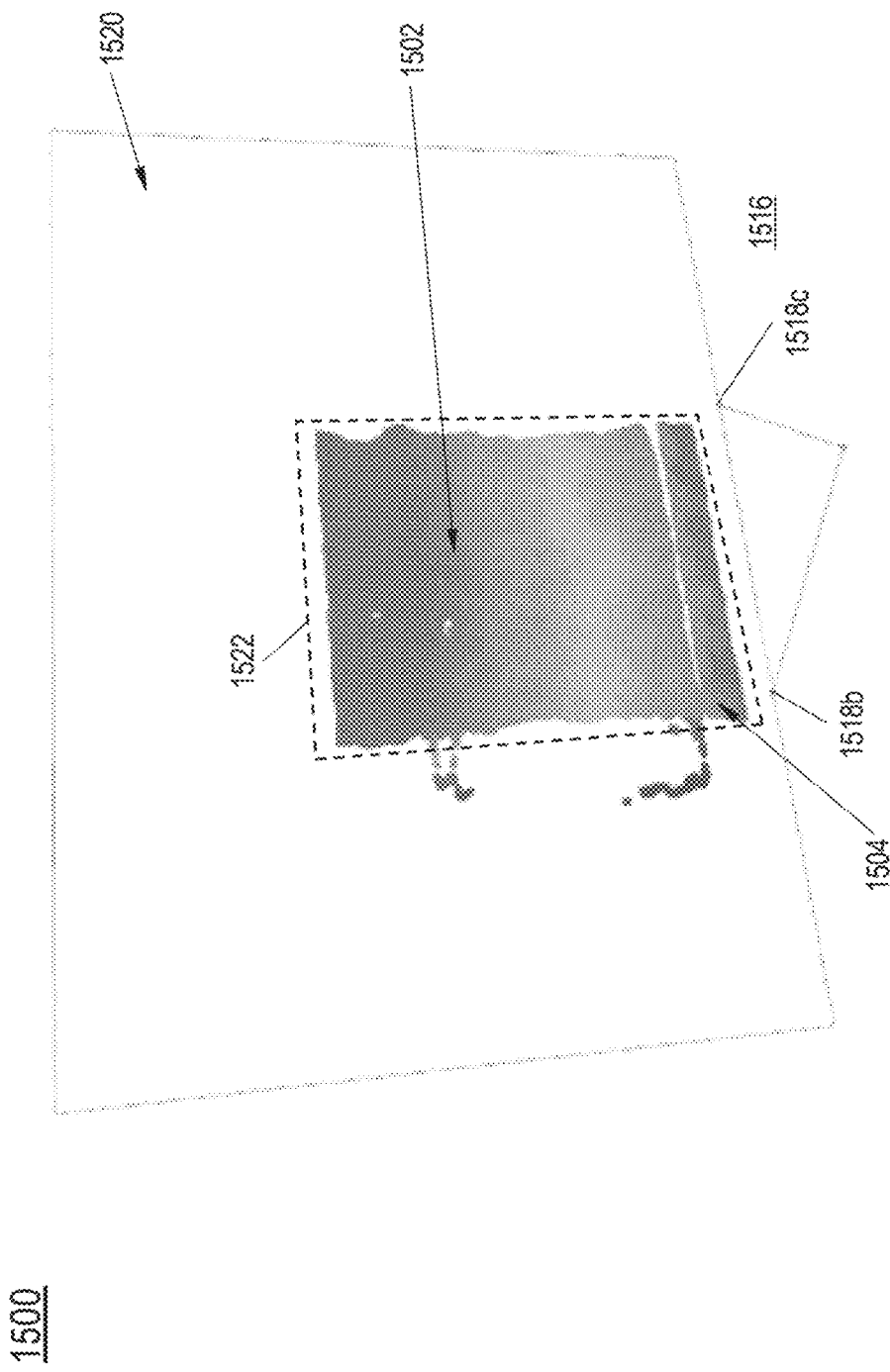

In embodiments, referring also to FIG. 15D, as a further step the VDS 1500 may determine a reference plane 1520 onto which any remaining points corresponding to the payload object 1502 and pallet 1504 may be projected (1522). For example, the reference plane 1520 may be calculated orthogonal to the ground plane 1516 and passing through two points 1518b, 1518c near the bottom of the pallet 1504 and from which the ground plane was estimated. Further, the VDS 1500 may determine any points more than a threshold distance away from the reference plane 1520 as outliers, removing these outlying points from the point projection 1522. The remaining projected points 1522 may be downsampled by the VDS 1500 to improve performance.

Figure 15E:
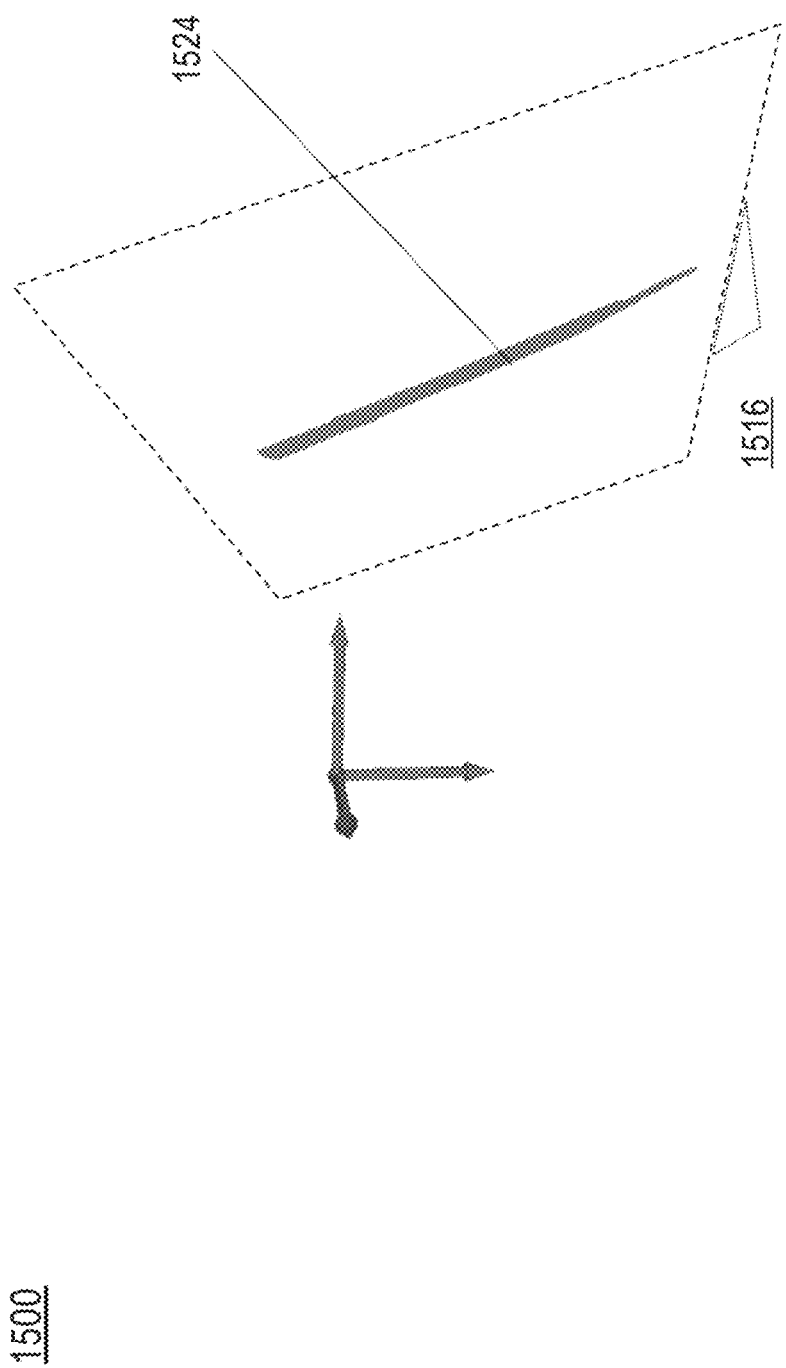

In embodiments, referring also to FIG. 15E, as a further step the VDS 1500 may transform (1524) the downsampled projected points to align the ground plane 1516 to the x-axis of the VDS' global coordinate system. For example, when the ground plane 1516 is properly aligned, any bounding boxes for the payload object 1502 and/or pallet 1504 may efficiently align with the ground plane.

Figure 15F:
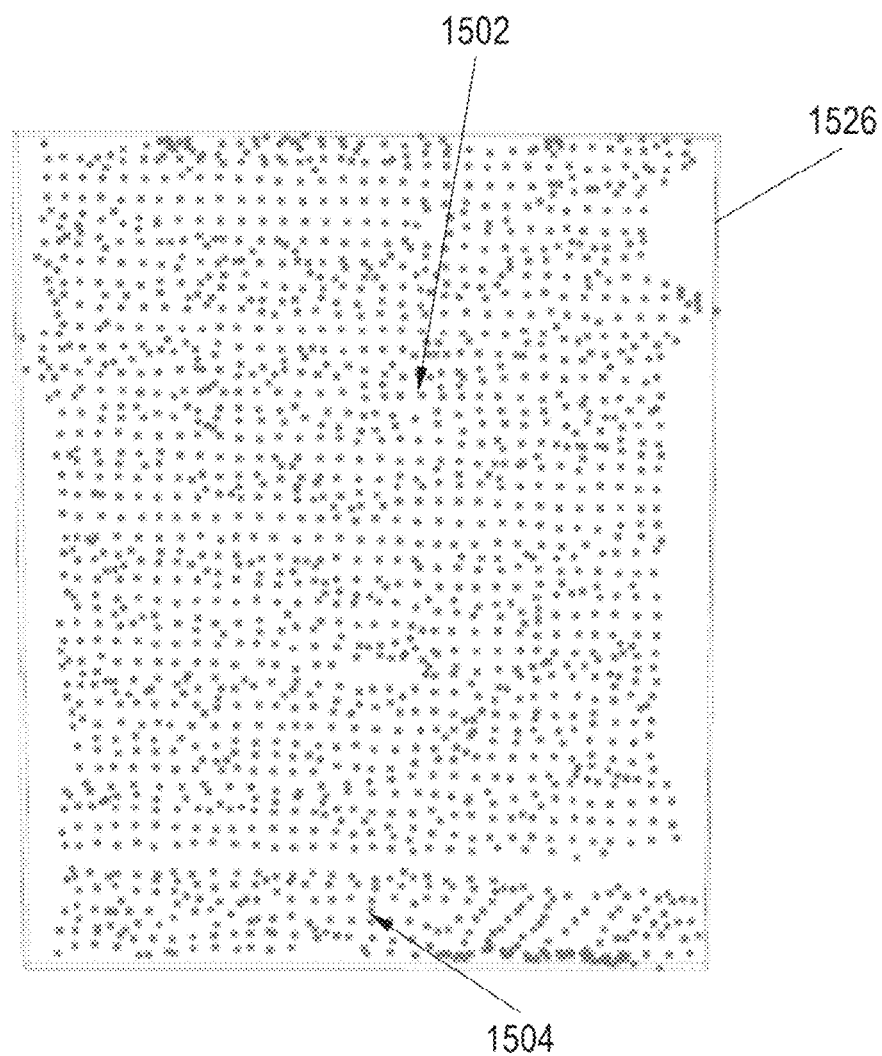

In embodiments, referring also to FIG. 15F, as a further step the VDS 1500 may calculate an oriented bounding box 1526 for volume dimensioning of the payload object 1502 and/or pallet 1504. For example, the oriented bounding box 1526 may correspond solely to the payload object 1502, solely to the pallet 1504, or to the payload object and pallet combined. Further, the VDS 1500 may calculate the oriented bounding box 1526 based on principal component analysis of the convex hull of the transformed downsampled projected points (1524). In embodiments, the axis alignment associated with the transformation 1524 may ensure that one face of the bounding box 1526 is anchored to the ground plane 1516. In embodiments, the VDS may perform volume dimensioning of the payload object 1502 and/or pallet 1504 based on the faces, edges, and/or vertices of the bounding box 1526.

Referring to FIGS. 16A through 16G, the volume dimensioning system 1600 (VDS) and corresponding method may be implemented and may function similarly to previously disclosed volume dimensioning systems, except that the VDS 1600 may perform accurate imaging-based volume dimensioning of an irregularly shaped target object 1602 is disclosed. For example, referring in particular to FIG. 16A, the target object 1602 may include any object of interest not corresponding to a cuboid or hexahedral solid, e.g., not having three linear dimensions x, y, z or three opposing pairs of quadrilateral faces xy, xz, yz.

In embodiments, the VDS 1600 may, broadly speaking, perform volume dimensioning of the target object 1602 by identifying and measuring a minimal bounding box 1604 that fully encloses the target object but minimizes excess volume, e.g., any space within the bounding box that is not occupied by the target object.

In embodiments, as a first step the VDS 1600 may deproject depth maps (e.g., x/y/depth values) extracted from image data 1606 into three-dimensional (3D) space (e.g., based on camera intrinsics). For example, via binary thresholding, dilation, and/or blurring operations, the VDS 1600 may perform rapid segmentation of the target object 1602 from its surroundings by accentuating gaps in depth data indicative of object boundaries, e.g., where the target object meets a ground plane 1608. Further, from a center 1610 of the thresholded depth map 1606, the VDS 1600 may crawl along a series of directional vectors until a nearest boundary is detected, flooding boundary gaps to create a more comprehensive subject boundary. Further, referring also to FIG. 16B, using the filled object boundaries, contours 1612 may be calculated and flooded to create a binary image mask 1614, which may be used for segmentation of any depth data within the image data 1606 determined to contain the target object 1602.

Figure 16D:
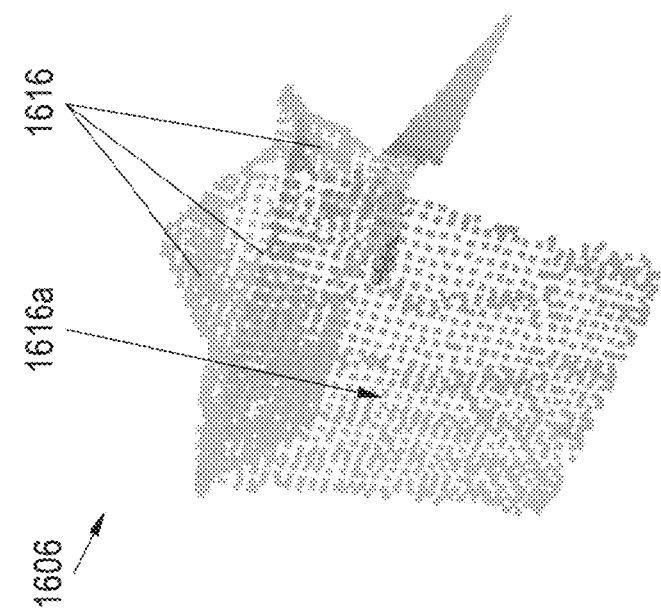
Figure 16C:
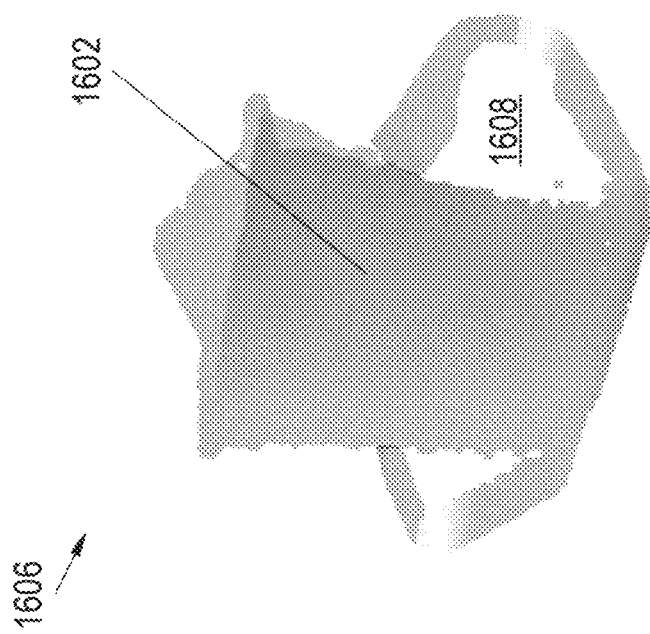

Referring also to FIG. 16C, the reprojected depth map may be downsampled (e.g., for enhanced processing performance) and the dominant plane within the image data 1606 estimated (e.g., via random sample consensus (RANSAC) or any appropriate like algorithm) and assumed to be the ground plane 1608. Further, any points determined to be within a threshold distance of the ground plane 1608 may be removed from the target object model, e.g., to emphasize the likely target object 1602.

In embodiments, referring also to FIG. 16D, as a further step the VDS 1600, once the ground plane 1608 is removed from the object model of the image data 1606, may isolate one or more point clusters 1616 corresponding to the target object 1602 (e.g., from any non-near objects remaining in the model but not to be included in volume dimensioning) via density-based spatial clustering (e.g., DBSCAN). If, for example, multiple clusters 1616 are identified, the centermost cluster 1616a may be assumed to correspond to the target object 1602.

In embodiments, referring also to FIG. 16E, as a further step the VDS 1600 may project (1618) point clusters 1616 (e.g., identified above as corresponding to the target object 1602) onto the ground plane 1608 as well as the top plane 1620. For example, the top plane 1620 may be determined by translating the calculated ground plane 1608 to a point within the point cluster 1616 having the highest y-coordinate. For example, horizontal plane projection 1618 may compensate for the limited capacity of the image sensors 1310 to capture useful depth data near edges and/or at acute angles to surfaces.

In embodiments, referring also to FIG. 16F, as a further step the VDS 1600 may fill out obstructed areas of the target object 1602 (e.g., those parts of the target object not directly shown by the image data 1606) by assuming the target object as generally symmetrical and rotating (1624) the horizontally projected point clusters 1618 180 degrees relative to a ground plane normal axis 1622 passing through a center of the convex hull of the horizontally projected point clusters.

Figure 16G:
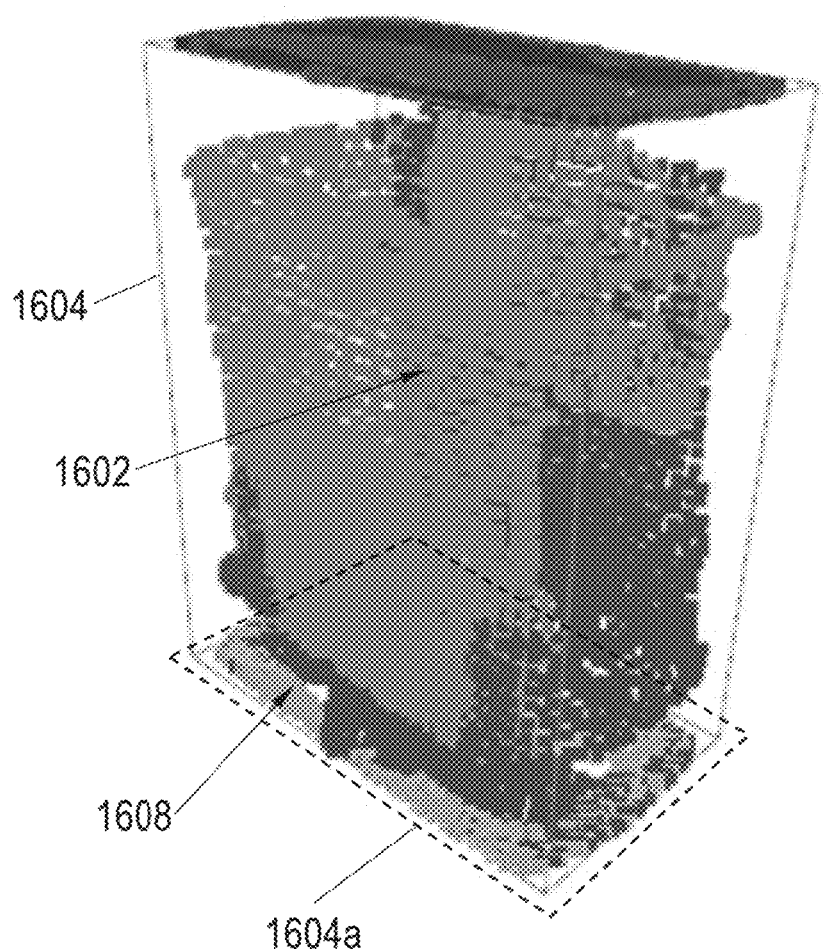

In embodiments, referring also to FIG. 16G, as a further step the VDS 1600 may calculate an oriented bounding box 1604 enclosing the updated depth model (e.g., the rotated and horizontally projected point clusters 1624 corresponding to the estimated target object 1602) and orienting one face (1604a) of the bounding box parallel to the ground plane 1608. For example, the VDS 1600 may calculate the oriented bounding box 1604 based on principal component analysis of the convex hull of the rotated and horizontally projected point clusters 1624, e.g., to ensure that the target object is fully enclosed within the bounding box and that unoccupied space within the bounding box is minimized. In embodiments, the VDS 1600 may proceed to volume dimensioning based on the edges, vertices, and/or faces of the bounding box 1604.

Figure 17:
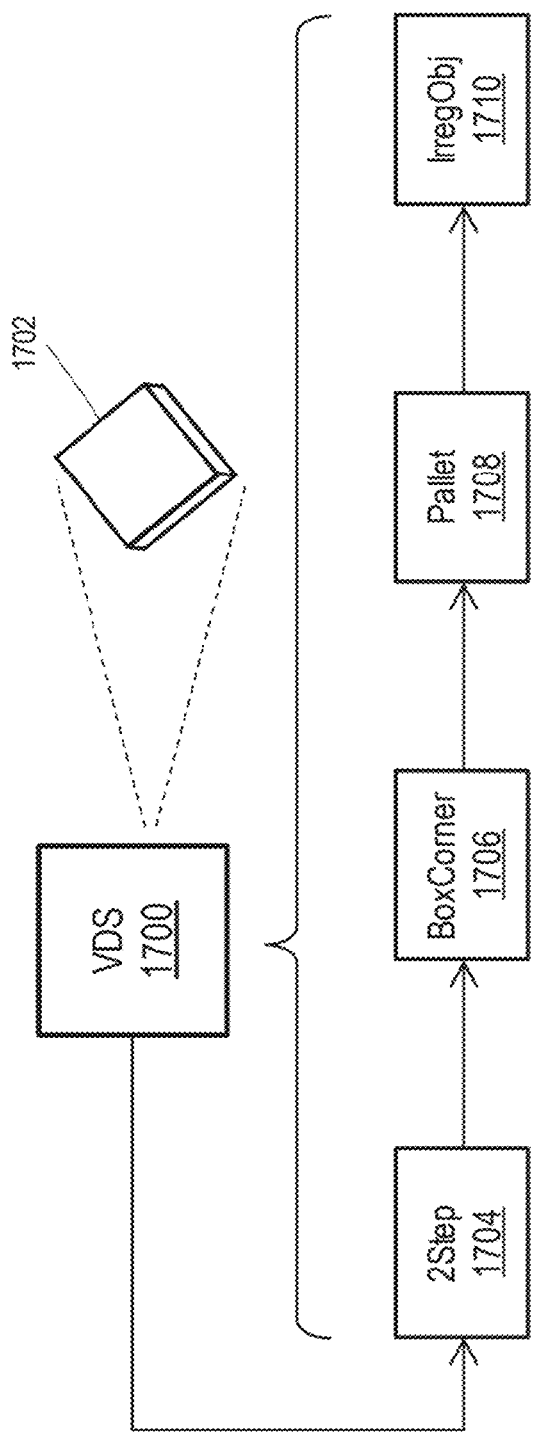
FIG. 17 depicts a multi-mode volume dimensioning system in accordance with one or more embodiments of the present disclosure.
Figure 18A:
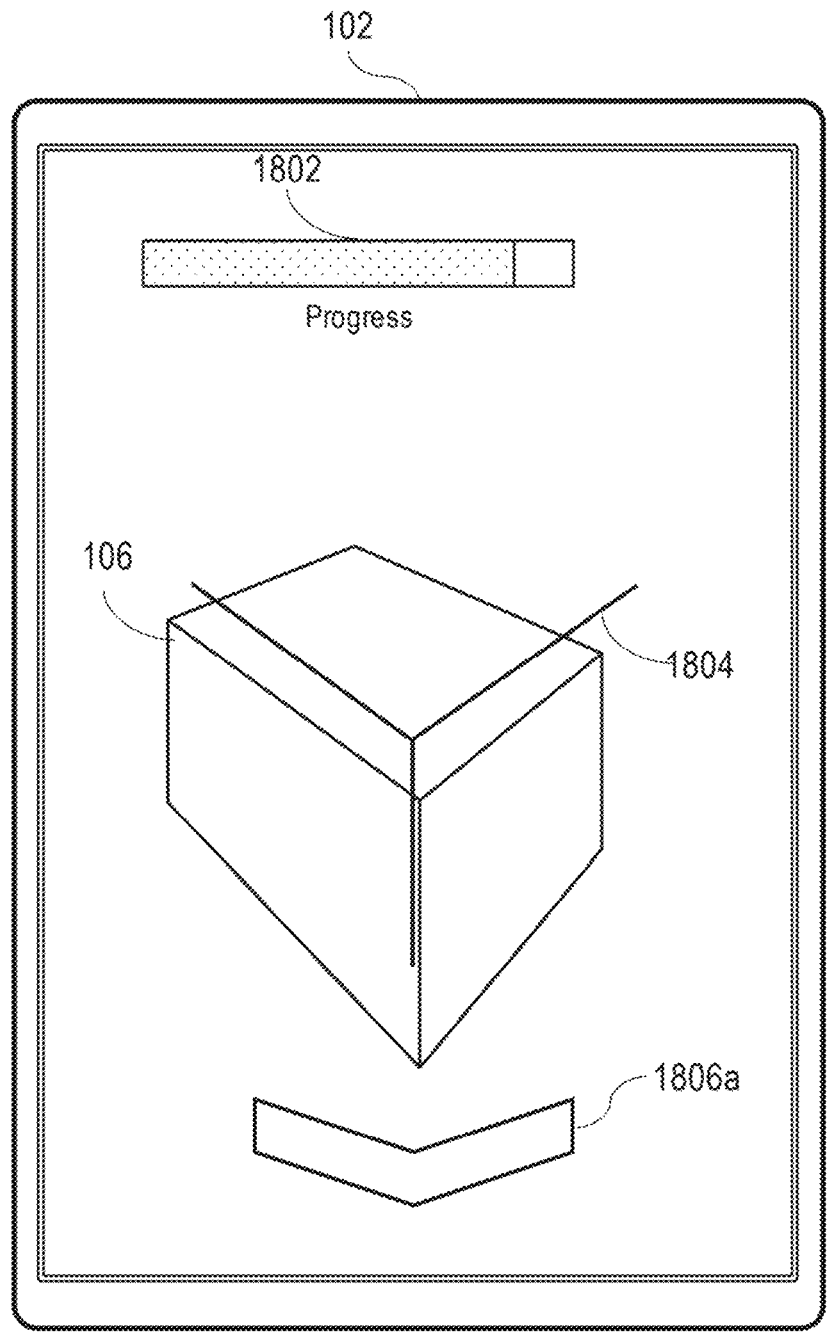
FIGS. 18A through 18F depict diagrammatic illustrations of the mobile device with three-dimensional guidance, in accordance with one or more embodiments of the present disclosure.
Figure 18B:
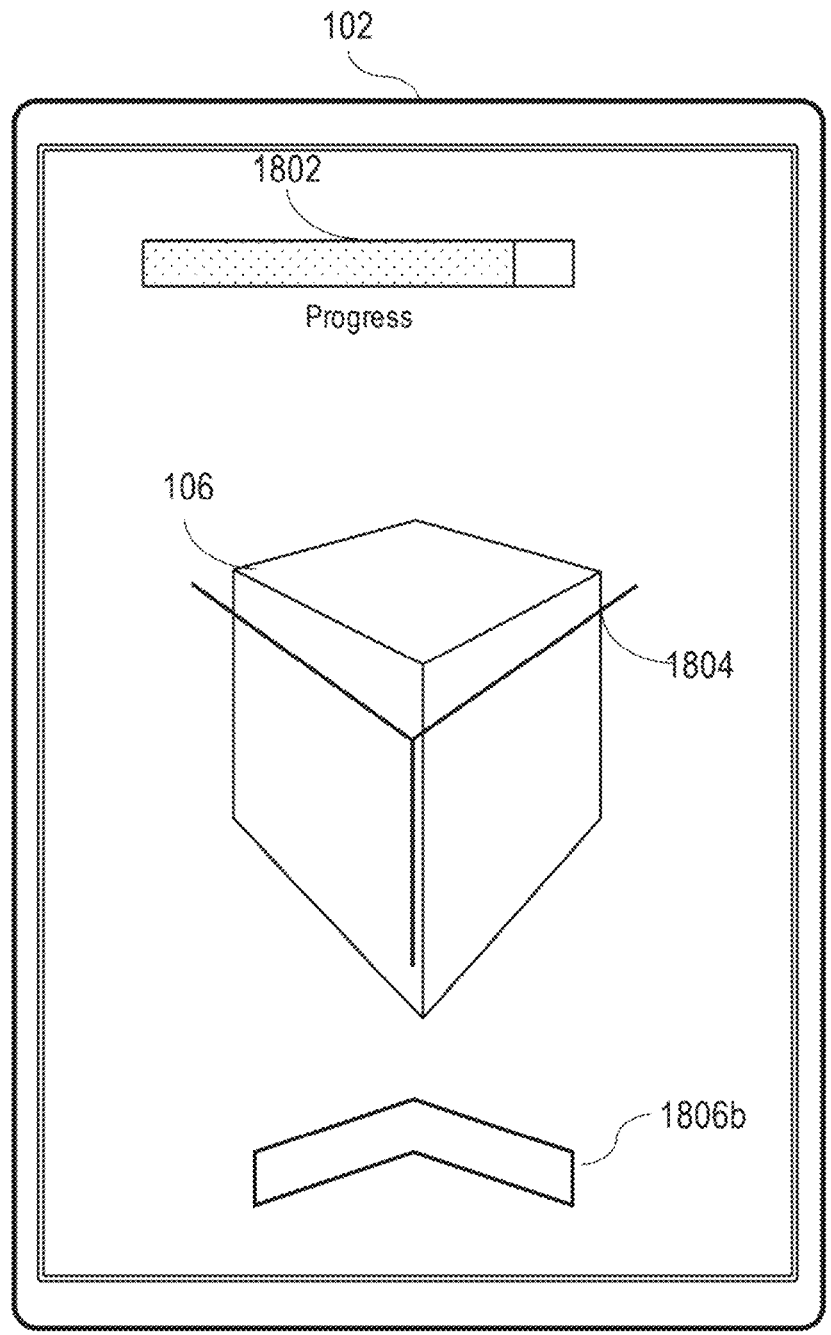
Figure 18C:
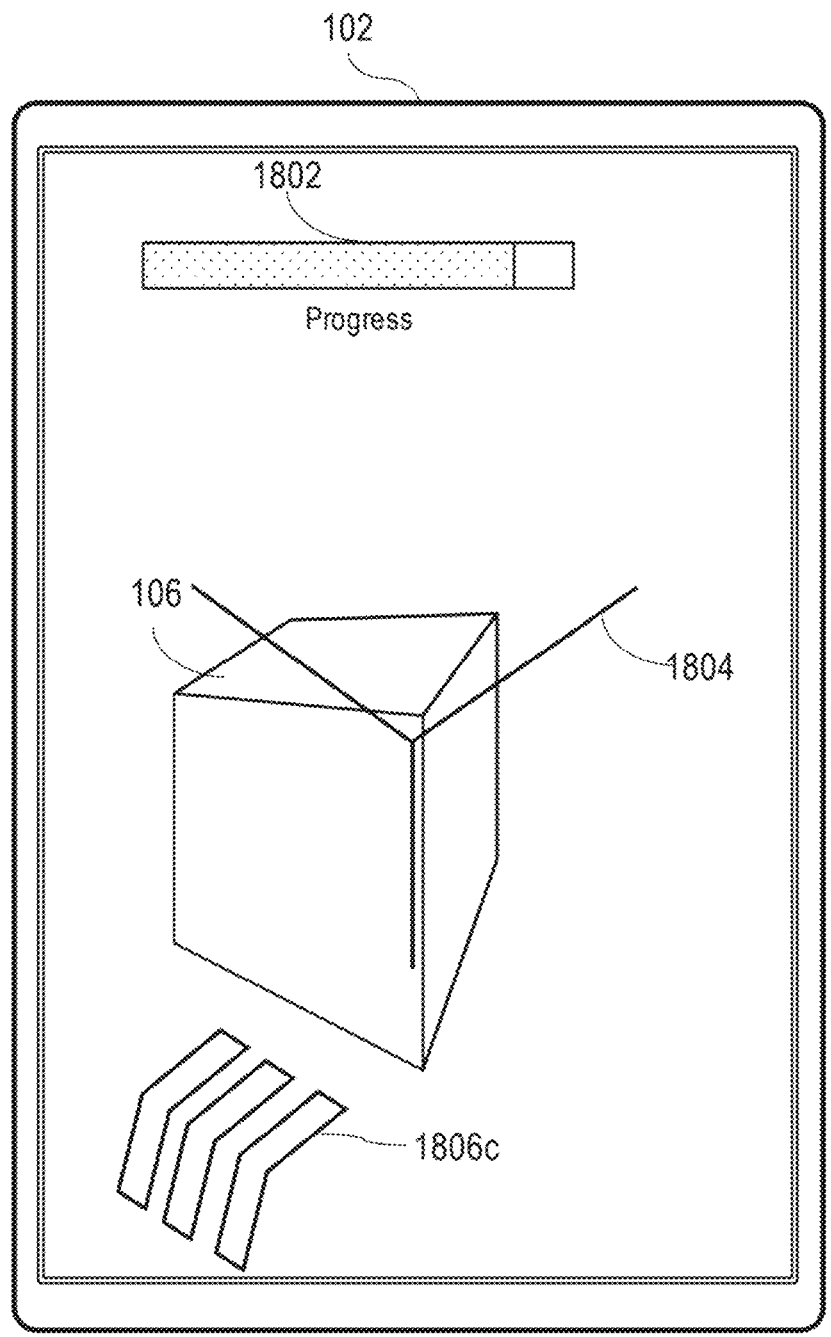
Figure 18D:
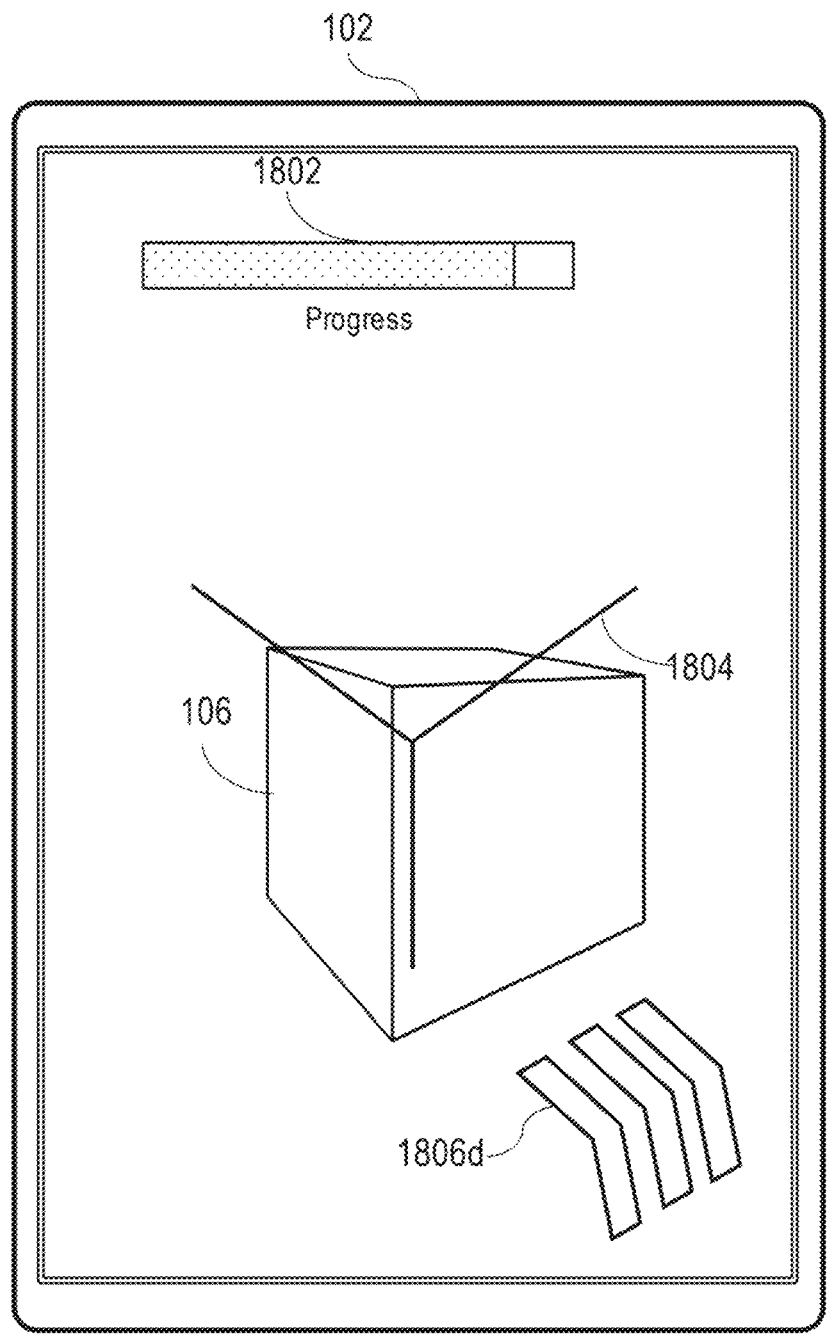
Figure 18E:
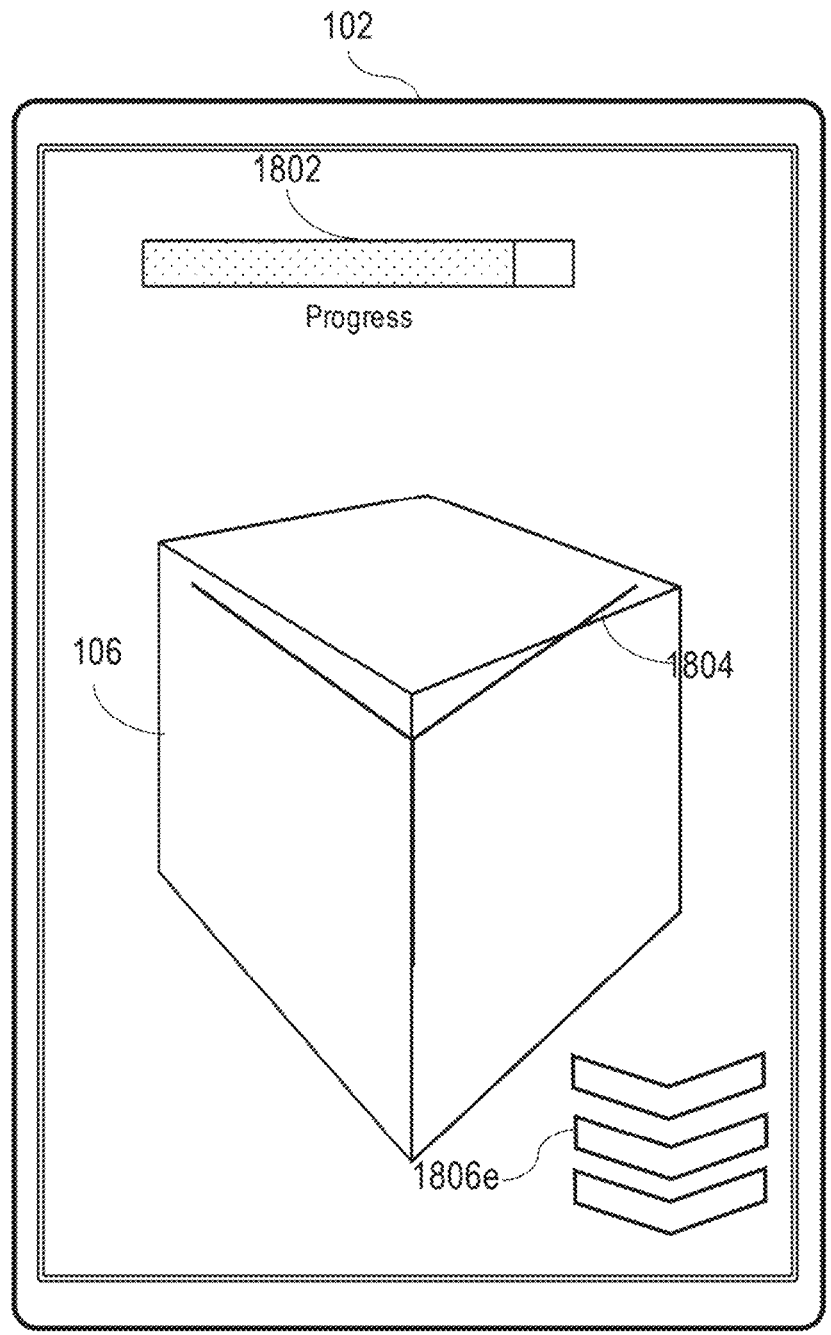
Figure 18F:
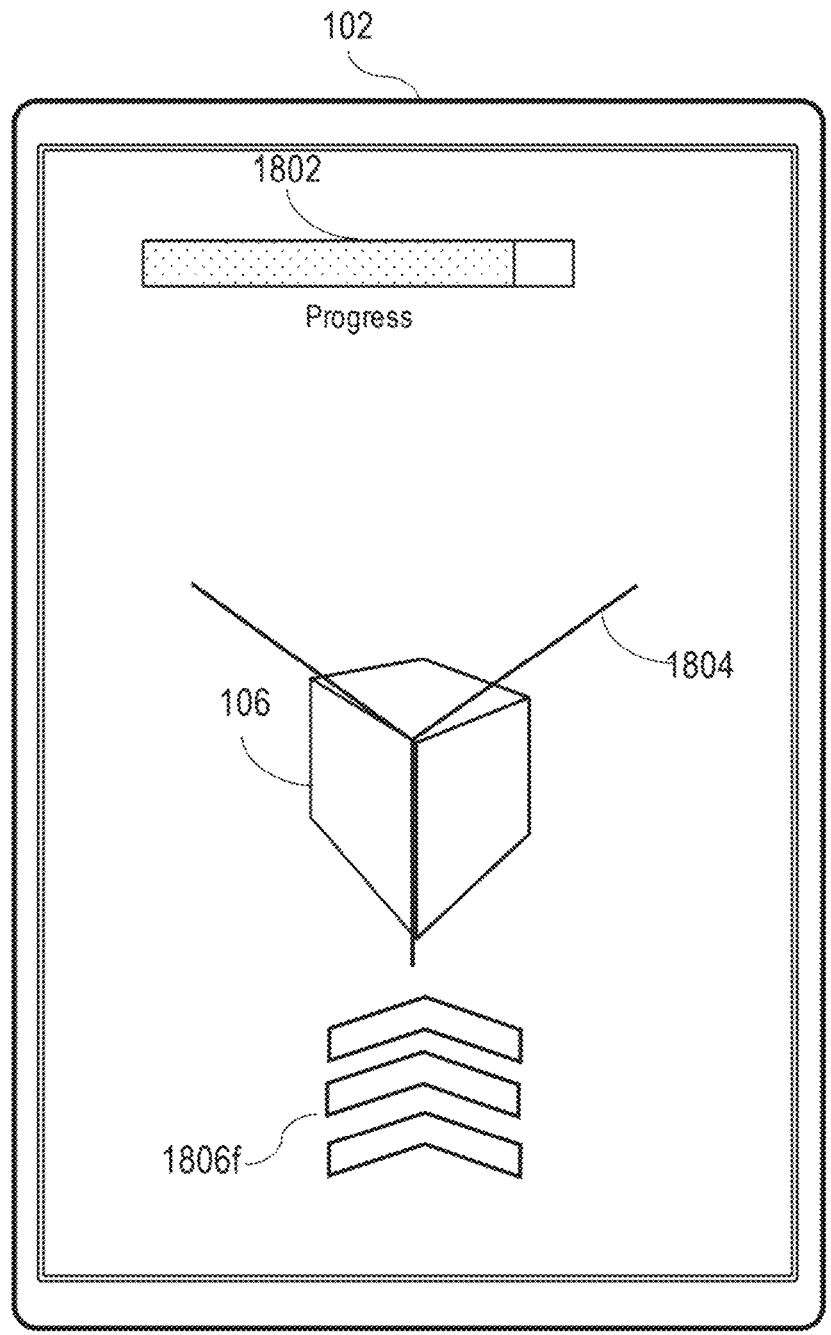

In embodiments, referring to FIG. 17, the VDS 1700 may be implemented and may function similarly to the VDS 1500, 1600 of FIGS. 15A through 16G, except that the VDS 1700 may provide manual or automatic selection of a particular volume dimensioning mode based on the target object 1702. For example, the VDS 1700 may first attempt to determine if the target object 1702 is a candidate for two-step-based volume dimensioning 1704 (see, e.g., FIGS. 3A through 3H and accompanying text above). Alternatively, a user may manually select two-step-based volume dimensioning 1704.

In embodiments, if the VDS 1700 determines that two-step-based volume dimensioning 1704 is inoptimal for the target object 1702, the VDS may next determine if box corner-based volume dimensioning 1706 is optimal (see, e.g., FIGS. 11 through 12E and accompanying text above). Alternatively, the user may manually select box corner-based volume dimensioning 1706.

In embodiments, if the VDS 1700 likewise determines that box corner-based volume dimensioning 1706 is inoptimal for the target object 1702, the VDS may next determine if pallet segmentation and volume dimensioning 1708 is optimal (see, e.g., FIGS. 15A through 15F and accompanying text above). For example, if the VSD 1700 determines that the target object 1702 includes, or is disposed upon, a pallet (1504, FIG. 15A), pallet segmentation and volume dimensioning 1708 may be selected. Alternatively, the user may manually select pallet segmentation and volume dimensioning 1708.

In embodiments, if the VDS 1700 likewise determines that pallet segmentation and volume dimensioning 1708 is inoptimal for the target object 1702, the VDS may next determine if irregular object segmentation and volume dimensioning 1710 is optimal (see, e.g., FIGS. 16A through 16G and accompanying text above). For example, if the VSD 1700 has difficulty identifying a cuboid or hexahedral structure with respect to the target object 1702, irregular object segmentation and volume dimensioning 1710 may be selected. Alternatively, the user may manually select irregular object segmentation and volume dimensioning 1710.

Referring now to FIGS. 18A-18F, diagrammatic illustrations 1800 of the mobile device 102 with three-dimensional user guidance is described, in accordance with one or more embodiments of the present disclosure. The mobile device 102 may provide the three-dimensional user guidance via the display 208 or the like.

The three-dimensional user guidance may include a progress indicator 1802. The progress indicator 1802 indicates that the target object 106 is recognized, the volume dimensioning system 100 is actively working, and a remaining percentage until the dimensions of the target object 106 have been determined. The progress indicator 1802 may be a progress indicator bar, progress indicator circle, or the like. The progress 1802 indicator indicates the percentage of completion towards detecting the dimensions of the target object 106.

The three-dimensional user guidance may include a guidance cursor 1804. The guidance cursor may be similar to the cursor 1206. The guidance cursor may be a y-shaped cursor disposed in the center of the display of the mobile device 102. The guidance cursor indicates a target for aiming the imaging sensors of the mobile device 102 at the corner point 306. The corner point 306 may be aligned with a vertex defined by the guidance cursor. The guidance cursor 1804 includes lines that are angled at 135 degrees. The target object 106 may be aligned at 45 degrees from each plane to perfectly line up to the guidance cursor 1804. In some embodiments, the guidance cursor 1804 may also assist a user in aligning the mobile device 102 to non-cuboid target objects, e.g., where the preferred acquisition alignment may not be obvious or apparent.

The three-dimensional user guidance may include a guidance indicator 1806. The guidance indicator 1806 may prompt the user or operator to move the imaging sensor and/or the mobile device 102 relative to the target object 106 (e.g., as seen via the display of the mobile device) in order to optimize the capacity of the mobile device to accurately view and measure the target object. The guidance indicator 1806 may include three-dimensional guidance in any of vertical directions (downwards 1806a, upwards 1806b), horizontal directions (leftwards 1806c, rightwards 1806d), and/or longitudinal directions (backward 1806e, forwards 1806f). The guidance indicators 1806 may be a visual guidance indicator, aural guidance indicators, textual guidance indicators, and the like. As depicted, the visual guidance indicators are chevrons, although this is not intended as a limitation of the present disclosure. In embodiments, the guidance indicators 1806 may appear for at least a minimum tolerance time to allow the user/operator adequate opportunity to both recognize the need for corrective action and execute said corrective action to shift the mobile device 102 away from the tolerance edge state triggering the prompt and toward a preferred acquisition view.

Figure 19A:
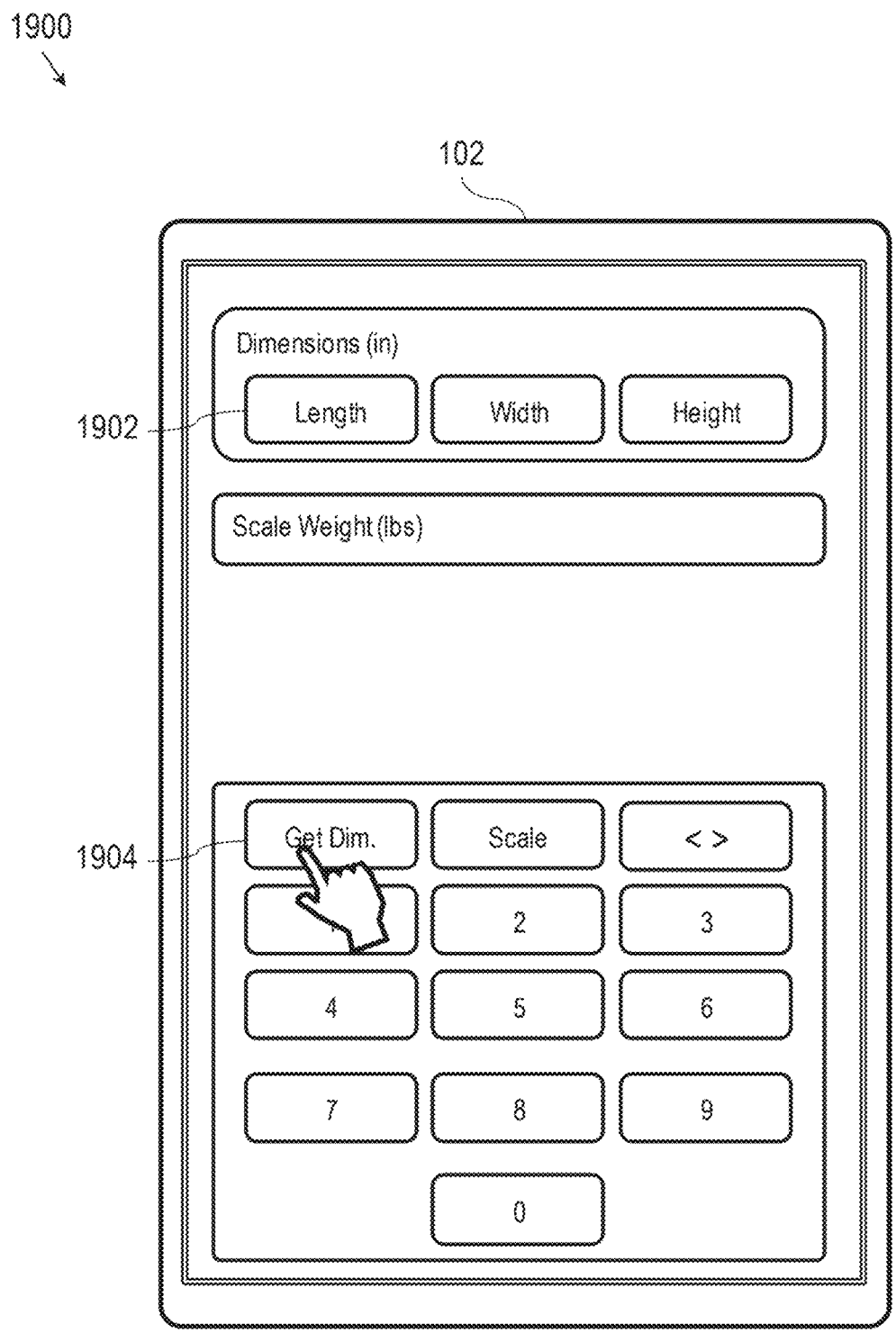
FIGS. 19A through 19C depict diagrammatic illustrations of the mobile device with a sensor fusion keyboard, in accordance with one or more embodiments of the present disclosure.
Figure 19B:
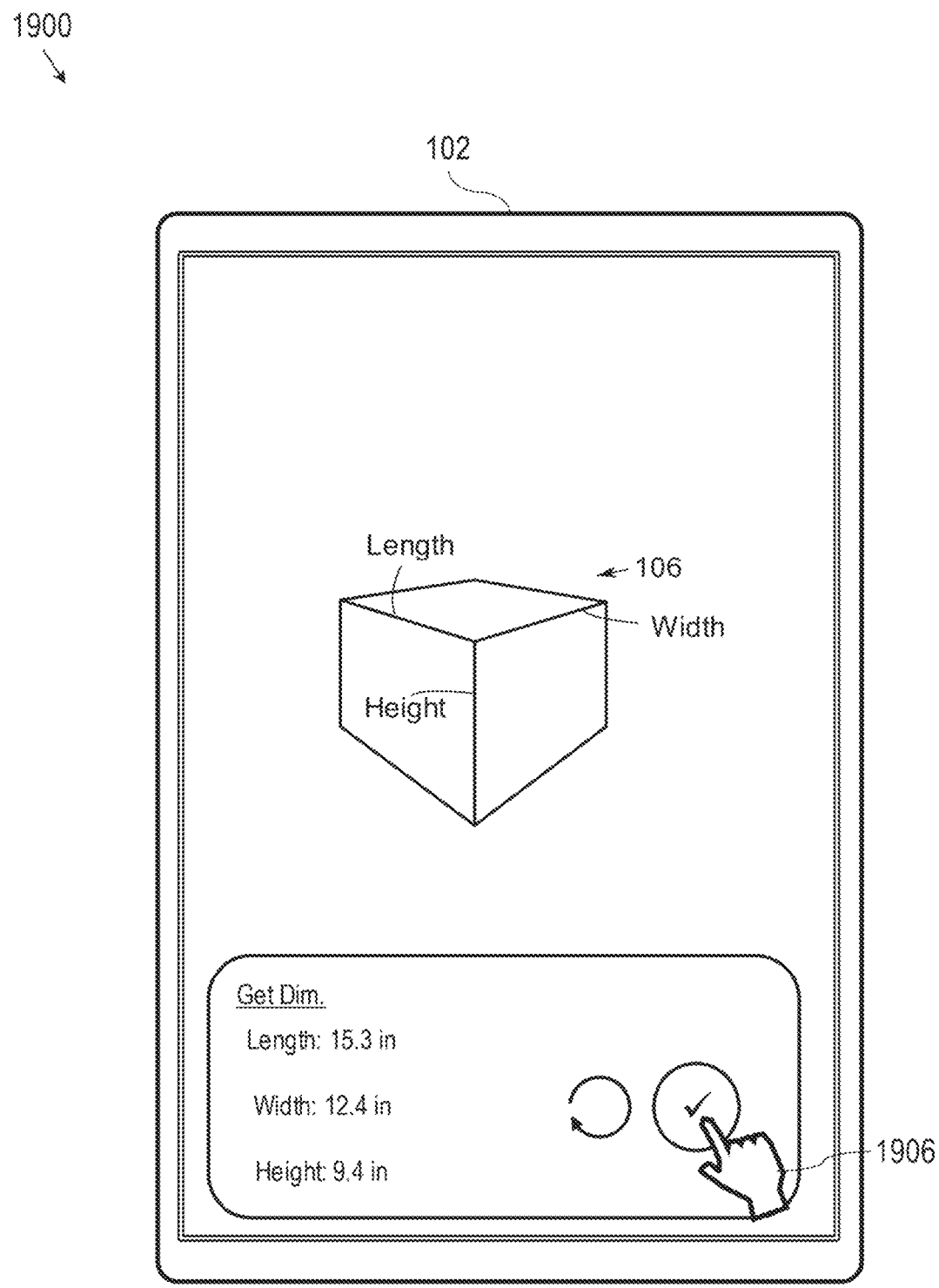
Figure 19C:
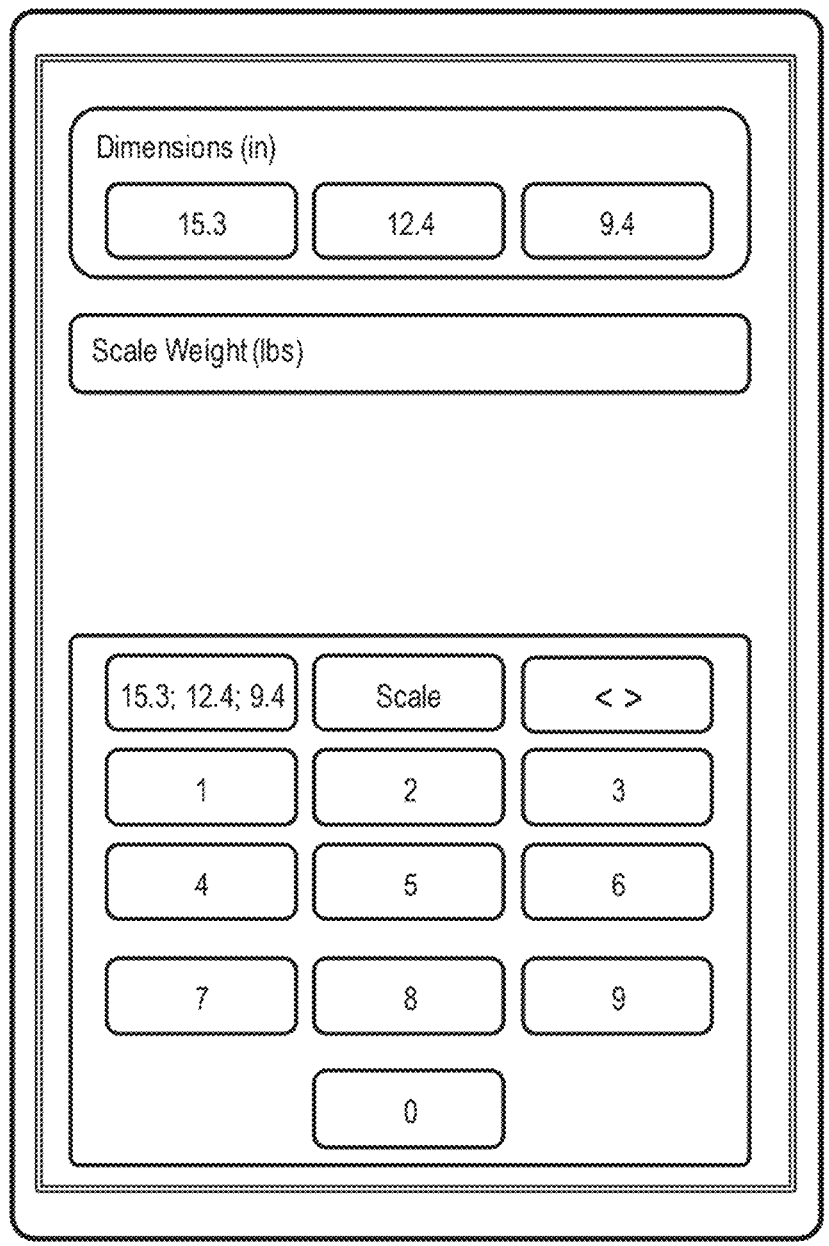

Referring now to FIGS. 19A-19C, a sensor fusion keyboard 1900 is described, in accordance with one or more embodiments of the present disclosure. The sensor fusion keyboard 1900 may also be referred to as a keyboard wedge, a keyboard interface, or the like. The sensor fusion keyboard 1900 may be implemented on the mobile device 102 and the like. The sensor fusion keyboard 1900 provides an alternate keyboard method of sensor data entry into an application. The application may include any supply chain management software applications or the like. The sensor fusion keyboard 1900 may be a pop-up keyboard. The sensor fusion keyboard 1900 may be chosen in configuration to be used all the time, for specific applications, and/or for specific data field types.

The sensor fusion keyboard 1900 simulates keyboard data entry into fields 1902. The fields 1902 may be fields of the various applications. The data field attributes may include attributes associated with sensor data. The system keyboard will appear onscreen when the mobile device 102 detects the attribute associated with the sensor data is displayed. The sensor fusion keyboard 1900 advantageously allow for getting the sensor data into the fields 1902 with reduced touches (e.g., one-touch data entry). The fields 1902 may include an attribute associated with the sensor data.

The sensor fusion keyboard 1900 may receive sensor input data from one or more sensors. The sensors may include wired or wireless sensors which are communicatively coupled to the mobile device 102. The sensors may include, but are not limited to, imaging sensor, volume dimensioning system, scale, bar code scanner, RFID reader, temperature sensor (e.g., thermometer, thermocouple, thermal camera), blood pressure sensors, light sensor, location sensor, and the like. The sensor input data may include dimensions (e.g., length, width, height), weight, mass, scanned bar code data, scanned RFID data (interrogated/read data), temperature values (human body temp, food temperature, machinery temperature), blood pressure values, lumens, location (e.g., (geolocation, GPS, coordinates, address), and the like. The dimensions may be in the form of delimited data. For example, the dimensions may be length, delimiter, width, delimiter, height, or some variation thereof. The dimensions may be in the chosen units (imperial or metric). The dimensions may be delimited in predetermined order set by a configuration on the mobile device 102 or in cloud account settings/configuration.

In some embodiments, the sensor fusion keyboard 1900 may populate the fields 1902 with the sensor data automatically.

In some embodiments, the sensor fusion keyboard 1900 may populate the fields 1902 with the sensor data in response to the mobile device 102 receiving one or more inputs. For example, the sensor fusion keyboard 1900 may include interfaces 1904 associated with the sensors. As depicted, the interfaces 1904 includes a dimensioning interface and a scale interface. The dimensioning interface may lead to an interface using any of the various dimensioning techniques described in the present application. The dimensioning interface may determine the dimensions (e.g., length, width, height) of the target object 106. The mobile device 102 may receive an input 1906 to confirm the dimensions. The mobile device 102 may also include an input to recalculate the dimensions.

In some embodiments, the interfaces 1904 may include an icon. In some embodiments, pressing the icon (FIG. 19A) may bring up a separate user interface (FIG. 19B) that may be required to capture the sensor's value. The separate user interface could be a view window that may partially or fully cover up the screen. Once data is acquired via the separate user interface, the separate user interface may automatically fill data into the fields and/or have the user press a button to "submit".

In some embodiments, the icon may include a notification indicator. The notification indicator may include a current value of a data input (FIG. 19C). Pressing the notification indicator with the current value may populate the fields 1902.

Another way to enter data into a data entry field is via multi-factor prompting. The application may ask for the data values upon entering the application. The sensor may send the mobile device 102 the data values via text and the like. The mobile device 102 may sense that the data value is received and also know an application is awaiting the data value for entry into the fields 1902. The data value can be popped up into the keyboard, such as where the sensor icons reside. Subsequent pressing of that prompt will auto fill that code into the data field expecting that code (having been pressed by user with blinking cursor).

Figure 20:
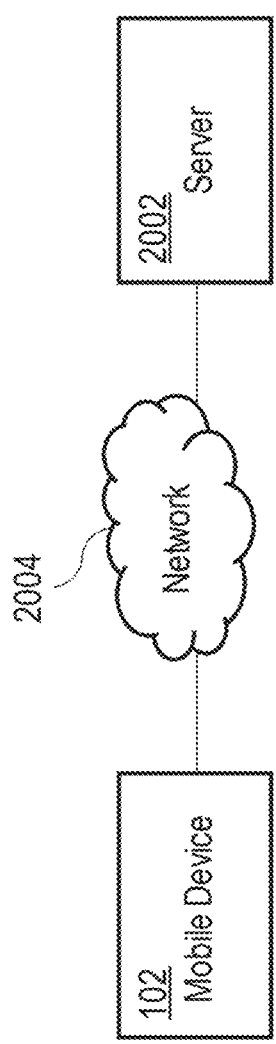
FIG. 20 depicts an edge computing system, in accordance with one or more embodiments of the present disclosure.

Referring now to FIG. 20, an edge computing system 2000 is described, in accordance with one or more embodiments of the present disclosure. The edge computing system 2000 may include the mobile device 102, a server 2002, and a network 2004.

The system 2000 may also include the server 2002. The server 2002 may include one or more processors and memory. The server 2002 may also include a cloud-based architecture. For instance, it is contemplated herein that the server 2002 may include a hosted server and/or cloud computing platform including, but not limited to, Amazon Web Services (e.g., Amazon EC2, and the like). In this regard, any of the various algorithms or dimensioning methods may include a software as a service (Saas) configuration, in which various functions or steps of the present disclosure are carried out by a remote server.

The server 2002 may be communicatively coupled to the mobile device 102 by way of a network 2004. The network 2004 may include any wireline communication protocol (e.g., DSL-based interconnection, cable-based interconnection, T9-based interconnection, and the like) or wireless communication protocol (e.g., GSM, GPRS, CDMA, EV-DO, EDGE, WIMAX, 3G, 4G, 4G LTE, 5G, Wi-Fi protocols, RF, Bluetooth, and the like) known in the art. By way of another example, the network 2004 may include communication protocols including, but not limited to, radio frequency identification (RFID) protocols, open-sourced radio frequencies, and the like. Accordingly, an interaction between the mobile device 102 and the server 2002 may be determined based on one or more characteristics including, but not limited to, cellular signatures, IP addresses, MAC addresses, Bluetooth signatures, radio frequency identification (RFID) tags, and the like.

The mobile device 102 may be considered an edge computing device. The mobile device 102 includes one or more models or algorithms saved in memory. The mobile device 102 may receive the models or algorithms from the server 2002 by way of the network 2004. The mobile device 102 may perform generate the sensor data and perform dimensioning on target objects within the sensor data using the various models or algorithms (which may be, e.g., trained machine learning or artificial intelligence generated models).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A volume dimensioning system, comprising:
    an image sensor configured to capture imaging data associated with a target object positioned on a surface, the imaging data comprising a sequence of frames, each frame comprising a depth map with two-dimensional (2D) pixel coordinates and a plurality of depth values; and
    one or more processors in communication with the image sensor, the one or more processors configured to:
    identify an origin point within the plurality of depth values; wherein the origin point is associated with a top corner of the target object; wherein the origin point is a local minimum of the depth values within a cursor of the imaging data; wherein the one or more processors are configured to examine the depth values for the local minimum to identify the origin point;
    crawl from the origin point along a first edge to a first corner, along a second edge to a second corner, and along a third edge to a third corner of the target object to detect the first edge, the first corner, the second edge, the second corner, the third edge, and the third corner;
    deproject the depth map into three-dimensional (3D) points;
    construct a first edge vector representing the first edge from the origin point to the first corner, a second edge vector representing the second edge from the origin point to the second corner point, and a third edge vector representing the third edge from the origin point to the third corner point using the 3D points;
    determine the target object is a cuboid by examining a first angle between the first edge vector and the second edge vector, a second angle between the first edge vector and the third edge vector, and a third angle between the second edge vector and the third edge vector; and
    estimate a first distance of the first edge using the first edge vector, a second distance of the second edge using the second edge vector, and a third distance of the third edge using the third edge vector.

2. The volume dimensioning system of claim 1, wherein the cursor is disposed in a center of the imaging data.

3. The volume dimensioning system of claim 1, wherein the crawling from the origin point along a first edge to a first corner, along a second edge to a second corner, and along a third edge to a third corner of the target object comprises iteratively:
    stepping from a checkpoint according to a step vector and examining one or more of the plurality of depth values along a test vector to find a minimum depth value, wherein the test vector is perpendicular to the step vector;
    and
    moving the checkpoint to the minimum depth value, wherein the checkpoint detects the first edge, the second edge, and the third edge.

4. The volume dimensioning system of claim 3, wherein the checkpoint is initially the origin point.

5. The volume dimensioning system of claim 3, wherein crawling from the origin point along the first edge to the first corner, along the second edge to the second corner, and along the third edge to the third corner of the target object includes:
    iteratively crawling along at least one of the first edge, the second edge, or the third edge until the one or more processors detect a directional change by which the first edge, the second edge, and the third edge are detected.

6. The volume dimensioning system of claim 3, wherein crawling from the origin point along the first edge to the first corner, along the second edge to the second corner, and along the third edge to the third corner of the target object includes:
    iteratively crawling along at least one of the first edge, the second edge, or the third edge until the one or more processors detect a continuous segment of empty depth data.

7. The volume dimensioning system of claim 6, wherein the one or more processors ignore one or more zero depth values when iteratively crawling along at least one of the first edge, the second edge, or the third edge until the one or more processors.

8. The volume dimensioning system of claim 1, wherein examining the first angle, the second angle, and the third angle comprises determining the first angle, the second angle, and the third angle are within tolerance of ninety degrees.

9. The volume dimensioning system of claim 1, wherein the one or more processors deproject the 2D pixel coordinates into the 3D points using the two-dimensional (2D) pixel coordinates and the plurality of depth values.

10. The volume dimensioning system of claim 1, comprising at least one display operatively coupled to the one or more processors, the display configured to display the imaging data and at least one of the first distance, the second distance, or the third distance.

11. The volume dimensioning system of claim 1, wherein the image sensor is a 3D image sensor; wherein the image data is 3D image data; wherein the one or more processors project the 3D image data into the depth map.

12. The volume dimensioning system of claim 11, further comprising:
    at least one memory operatively coupled to the one or more processors, the memory configured for storing one or more reference objects, each reference object corresponding to a set of reference dimensions.

13. The volume dimensioning system of claim 12, wherein the first distance, the second distance, and the third distance are determined dimensions of the target object; wherein the one or more processors are configured to:
   compile the one or more of the determined dimensions and the 3D imaging data corresponding to the target object;
   and
   store the compilation corresponding to the target object in the at least one memory as a reference object.

14. The volume dimensioning system of claim 12, wherein the one or more processors are configured to determine the dimension by comparing the target object to at least one reference object.

15. A method comprising:
   obtaining, via an image sensor of a mobile device, imaging data associated with a target object positioned on a surface, the imaging data comprising a sequence of frames, each frame comprising a depth map with two-dimensional (2D) pixel coordinates and a plurality of depth values;
   identifying, via a volume dimensioning system, an origin point within the plurality of depth values, wherein the origin point is associated with a top corner of the target object; wherein identifying the origin point includes identifying a local minimum of the depth values within a cursor of the imaging data; wherein the depth values are examined for the local minimum to identify the origin point;
   crawling, via the volume dimensioning system, from the origin point along a first edge to a first corner, along a second edge to a second corner, and along a third edge to a third corner of the target object to detect the first edge, the first corner, the second edge, the second corner, the third edge, and the third corner;
   deprojecting, via the volume dimensioning system, the depth map into three-dimensional (3D) points;
   constructing, via the volume dimensioning system, a first edge vector representing the first edge from the origin point to the first corner, a second edge vector representing the second edge from the origin point to the second corner point, and a third edge vector representing the third edge from the origin point to the third corner point using the 3D points;
   determining, via the volume dimensioning system, that the target object is a cuboid by examining a first angle between the first edge vector and the second edge vector, a second angle between the first edge vector and the third edge vector, and a third angle between the second edge vector and the third edge vector;
   and
   estimating, via the volume dimensioning system, a first distance of the first edge using the first edge vector, a second distance of the second edge using the second edge vector, and a third distance of the third edge using the third edge vector.

16. The method of claim 15, wherein crawling, via the volume dimensioning system, from the origin point along a first edge to a first corner, along a second edge to a second corner, and along a third edge to a third corner of the target object includes iteratively:
   stepping from a checkpoint according to a step vector and examining one or more of the plurality of depth values along a test vector to find a minimum depth value; wherein the checkpoint is initially the origin point, wherein the test vector is perpendicular to the step vector;
   and
   moving the checkpoint to the minimum depth value, wherein the checkpoint detects the first edge, the second edge, and the third edge.

17. The method of claim 15, wherein crawling, via the volume dimensioning system, from the origin point along a first edge to a first corner, along a second edge to a second corner, and along a third edge to a third corner of the target object includes:
   iteratively crawling along at least one of the first edge, the second edge, or the third edge until the volume dimensioning system detects at least one of a directional change or a continuous segment of empty depth data.

18. The method of claim 15, wherein examining the first angle, the second angle, and the third angle comprises determining the first angle, the second angle, and the third angle are within tolerance of ninety degrees.

* * * * *